United States Patent
Meardi et al.

(10) Patent No.: US 12,231,636 B2
(45) Date of Patent: Feb. 18, 2025

(54) QUANTIZATION OF RESIDUALS IN VIDEO CODING

(71) Applicant: V-NOVA INTERNATIONAL LIMITED, London (GB)

(72) Inventors: Guido Meardi, London (GB); Simone Ferrara, London (GB); Lorenzo Ciccarelli, London (GB)

(73) Assignee: V-NOVA INTERNATIONAL LIMITED (GB)

( * ) Notice: Subject to any disclaimer, the term of this patent is extended or adjusted under 35 U.S.C. 154(b) by 68 days.

(21) Appl. No.: 17/624,786

(22) PCT Filed: Jul. 6, 2020

(86) PCT No.: PCT/GB2020/051618
§ 371 (c)(1),
(2) Date: Jan. 4, 2022

(87) PCT Pub. No.: WO2021/005347
PCT Pub. Date: Jan. 14, 2021

(65) Prior Publication Data
US 2022/0360779 A1 Nov. 10, 2022

Related U.S. Application Data

(60) Provisional application No. 62/984,261, filed on Mar. 2, 2020.

(30) Foreign Application Priority Data

Jul. 5, 2019 (GB) ..................................... 1909701
Jul. 6, 2019 (GB) ..................................... 1909724

(Continued)

(51) Int. Cl.
H04N 19/124 (2014.01)
H04N 19/176 (2014.01)
(Continued)

(52) U.S. Cl.
CPC ......... *H04N 19/124* (2014.11); *H04N 19/176* (2014.11); *H04N 19/184* (2014.11);
(Continued)

(58) Field of Classification Search
CPC ........ H04N 19/33; H04N 19/39; H04N 19/44; H04N 19/124
See application file for complete search history.

(56) References Cited

U.S. PATENT DOCUMENTS

| 5,768,535 A | 6/1998 | Chaddha |
| 10,003,802 B1 | 6/2018 | Ostiguy et al. |

(Continued)

FOREIGN PATENT DOCUMENTS

| CN | 103179394 | 6/2013 |
| WO | 2004098198 A1 | 11/2004 |

(Continued)

OTHER PUBLICATIONS

International Search Report and Written Opinion for PCT/GB2020/051618 mailed Nov. 9, 2020.

(Continued)

*Primary Examiner* — David N Werner
(74) *Attorney, Agent, or Firm* — WORKMAN NYDEGGER

(57) ABSTRACT

A method of encoding an input signal is provided, the method comprising: quantizing a set of data based on temporal information associated with said set of data.

18 Claims, 20 Drawing Sheets

(30) Foreign Application Priority Data

| | | |
|---|---|---|
| Jul. 11, 2019 | (GB) | 1909997 |
| Jul. 25, 2019 | (GB) | 1910674 |
| Aug. 9, 2019 | (GB) | 1911467 |
| Aug. 12, 2019 | (GB) | 1911545 |
| Aug. 13, 2019 | (GB) | 1911546 |
| Oct. 2, 2019 | (GB) | 1914215 |
| Oct. 6, 2019 | (GB) | 1914413 |
| Oct. 6, 2019 | (GB) | 1914414 |
| Oct. 10, 2019 | (GB) | 1914634 |
| Oct. 25, 2019 | (GB) | 1915546 |
| Oct. 25, 2019 | (GB) | 1915553 |
| Nov. 5, 2019 | (GB) | 1916090 |
| Dec. 10, 2019 | (GB) | 1918099 |
| Jan. 12, 2020 | (GB) | 2000430 |
| Jan. 13, 2020 | (GB) | 2000483 |
| Jan. 15, 2020 | (GB) | 2000600 |
| Jan. 16, 2020 | (GB) | 2000668 |
| Jan. 31, 2020 | (GB) | 2001408 |
| Mar. 18, 2020 | (WO) | PCT/GB2020/050695 |
| Mar. 20, 2020 | (GB) | 2004131 |
| Apr. 18, 2020 | (GB) | 2005652 |
| Apr. 27, 2020 | (GB) | 2006183 |

(51) Int. Cl.
*H04N 19/184* (2014.01)
*H04N 19/30* (2014.01)
*H04N 19/31* (2014.01)
*H04N 19/33* (2014.01)
*H04N 19/39* (2014.01)
*H04N 19/44* (2014.01)

(52) U.S. Cl.
CPC .............. *H04N 19/30* (2014.11); *H04N 19/31* (2014.11); *H04N 19/33* (2014.11); *H04N 19/39* (2014.11); *H04N 19/44* (2014.11)

(56) References Cited

U.S. PATENT DOCUMENTS

| | | |
|---|---|---|
| 2003/0086622 A1 | 5/2003 | Klein Gunnewiek |
| 2004/0252900 A1 | 12/2004 | Bruls |
| 2005/0111541 A1* | 5/2005 | Hatabu ................. H04N 19/172 375/E7.181 |
| 2005/0259729 A1 | 11/2005 | Sun |
| 2006/0227867 A1* | 10/2006 | Winger ................. H04N 19/139 375/240.18 |
| 2007/0014481 A1* | 1/2007 | Kim ....................... H04N 19/61 375/E7.154 |
| 2007/0019871 A1* | 1/2007 | Kim ....................... H04N 19/60 375/E7.154 |
| 2011/0182359 A1* | 7/2011 | Chen .................... H04N 19/395 375/240.13 |
| 2013/0182971 A1* | 7/2013 | Leontaris .............. G06T 7/0002 382/275 |
| 2014/0198845 A1 | 7/2014 | Kalva et al. |
| 2015/0195528 A1* | 7/2015 | Wang .................... H04N 19/59 375/240.02 |
| 2015/0281693 A1 | 10/2015 | Okawa |
| 2015/0319437 A1 | 11/2015 | Zhang et al. |
| 2018/0007387 A1* | 1/2018 | Izumi ..................... H04N 19/39 |
| 2018/0109794 A1 | 4/2018 | Wang et al. |
| 2019/0007678 A1 | 1/2019 | Perez-Ramirez et al. |
| 2019/0104314 A1 | 4/2019 | Yonezawa |

FOREIGN PATENT DOCUMENTS

| | | | |
|---|---|---|---|
| WO | WO-2013057782 A1 * | 4/2013 | ........... H04N 19/105 |
| WO | 2018-012893 | 1/2018 | |

OTHER PUBLICATIONS

GB2320013.2 CSER dated Jan. 31, 2024.
GB2201448.0 Exam Report dated Nov. 3, 2023.
International Preliminary Report on Patentability received for PCT Patent Application No. PCT/GB2020/051618, mailed on Jan. 20, 2022, 12 pages.
International Search Report and Written Opinion received for PCT Patent Application No. PCT/GB2020/051618, mailed on Nov. 9, 2020, 16 pages.

* cited by examiner

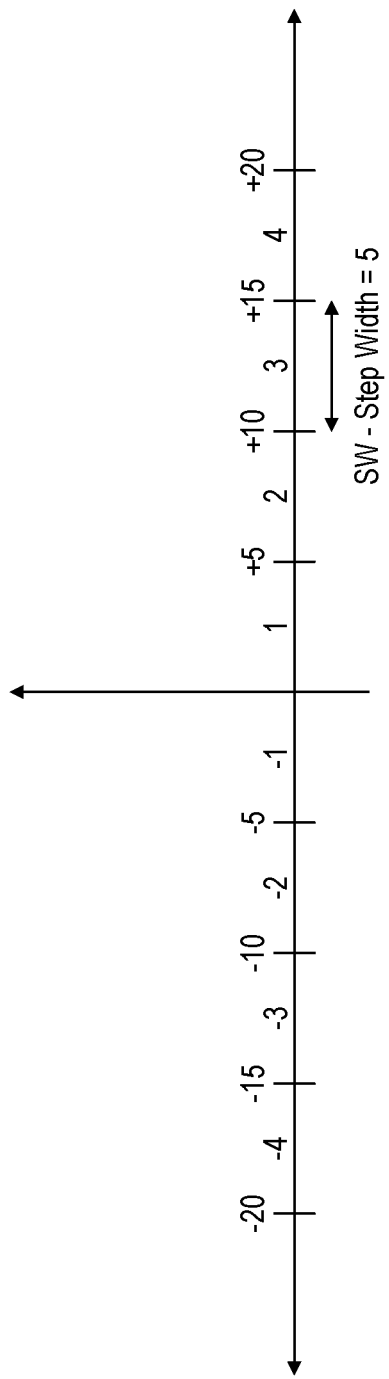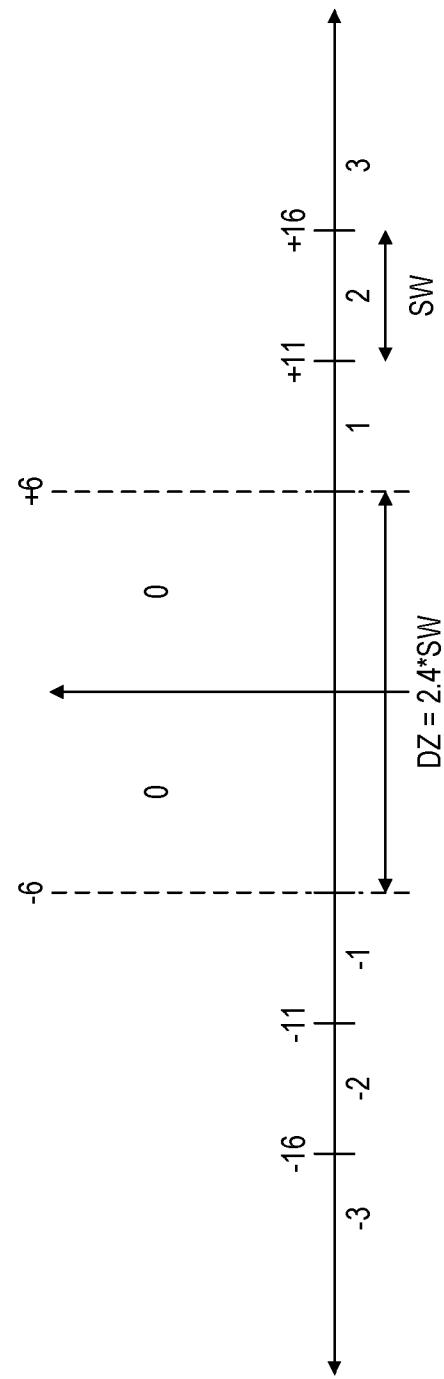

temporal_tile_intra_signalling [global]

temporal_enabled [global]

temporal_refresh [per frame/picture]

*temporal_mode [per unit]*

QUANTIZATION OF RESIDUALS IN VIDEO CODING

CROSS-REFERENCE TO RELATED APPLICATIONS

The present application is a 371 US Nationalization of International Patent Application No. PCT/GB2020/051618, filed Jul. 6, 2020, which claims priority to U.S. Patent Application No. 62/984,261, filed Mar. 2, 2020, and to UK Patent Application Nos: 1909701.3, filed Jul. 5, 2019, 1909724.5, filed Jul. 6, 2019, 1909997.7, filed Jul. 11, 2019, 1910674.9 filed Jul. 25, 2019, 1911467.7 filed Aug. 9, 2019, 1911545.0 filed Aug. 12, 2019, 1911546.8 filed Aug. 13, 2019, 1914215.7 filed Oct. 2, 2019, 1914413.8 filed Oct. 6, 2019, 1914414.6 filed Oct. 6, 2019, 1914634.9 filed Oct. 10, 2019, 1915546.4 filed Oct. 25, 2019, 1915553.0 filed Oct. 25, 2019, 1916090.2 filed Nov. 5, 2019, 1918099.1 filed Dec. 10, 2019, 2000430.5 filed Jan. 12, 2020, 2000483.4 filed Jan. 13, 2020, 2000600.3 filed Jan. 15, 2020, 2000668.0 filed Jan. 16, 2020, 2001408.0 filed Jan. 31, 2020, PCT/GB2020/050695 filed Mar. 18, 2020, 2004131.5 filed Mar. 20, 2020, 2005652.9 filed Apr. 18, 2020, and 2006183.4 filed Apr. 27, 2020. The entire disclosures of the aforementioned applications are incorporated herein by reference.

TECHNICAL FIELD

The present invention relates to methods for data compression, in particular compression and decoding of image and video signals. Data compression may include, but is not limited to, obtaining, deriving, encoding, outputting, receiving, decoding and reconstructing data that is encoded by means of hierarchical (tier-based) coding formats, where video signals are encoded in echelons (e.g., layers or tiers) of data and decoded in tiers at subsequently higher levels of quality. Different tiers of the signal may also be encoded according to different coding formats.

BACKGROUND

A hybrid backward-compatible coding technology has been previously proposed, for example in WO 2014/170819 and WO 2018/046940, the contents of which are incorporated herein by reference.

A method is proposed therein which parses a data stream into first portions of encoded data and second portions of encoded data; implements a first decoder to decode the first portions of encoded data into a first rendition of a signal; implements a second decoder to decode the second portions of encoded data into reconstruction data, the reconstruction data specifying how to modify the first rendition of the signal; and applies the reconstruction data to the first rendition of the signal to produce a second rendition of the signal.

An addition is further proposed therein in which a set of residual elements is useable to reconstruct a rendition of a first time sample of a signal. A set of spatio-temporal correlation elements associated with the first time sample is generated. The set of spatio-temporal correlation elements is indicative of an extent of spatial correlation between a plurality of residual elements and an extent of temporal correlation between first reference data based on the rendition and second reference data based on a rendition of a second time sample of the signal. The set of spatio-temporal correlation elements is used to generate output data. As noted, the set of residuals are encoded to reduce overall data size.

Encoding applications have typically employed a quantization operation. By way of this compression process, in which each of one or more ranges of data values is compressed into a single value, allows the number of different values in a set of video data to be reduced, thereby rendering that data more compressible. In this way, quantization schemes have been useful in some video for changing signals into quanta, so that certain variables can assume only certain discrete magnitudes. Typically a video codec divides visual data, in the form of a video frame, into discrete blocks, typically of a predetermined size or number of pixels. A transform is then typically applied to the blocks so as to express the visual data in terms of sums of frequency components. That transformed data can then be pre-multiplied by a quantization scale code, and then subjected to division element-wise by the quantization matrix, with the output elements of the division of each transformed, pre-multiplied element by the matrix element, then being rounded. The treatment of different transformed elements with divisors, namely different elements of a quantization matrix, is typically used to allow for those frequency elements that have a greater impact upon visual appearance of the video to a viewer to be effectively allotted more data, or resolution, than less perceptible components.

Optimisations are sought to further reduce overall data size while balancing the objectives of not compromising the overall impression on the user once the signal has been reconstructed; and, optimising processing speed and complexity.

Most data compression methods include a stage of quantization, typically applied in a domain of transformed coefficients, invertible with respect to display settings coordinates (e.g., luminance and chrominance values, RGB values, etc.).

In the following description we will discuss all embodiments by reference to video signal for simplicity. However, it is to be understood that the same embodiments apply also to other types of data mutatis mutandis.

Quantization—which can be performed in a number of different ways—is a so-called "lossy" operation, because it is most often used to reduce the information entropy of a signal, producing a compressed signal that, when decoded, is similar but not identical to the original signal. As such, it is useful to apply coarser quantization to areas of a signal deemed to be of lower priority (e.g., where fidelity to the original signal is less important) and a finer quantization to areas of a signal deemed to be of higher priority (e.g. where fidelity to the original signal is more important). Quantization is typically controlled by way of a quantization step-width, with a smaller quantization step-width corresponding to finer quantization and a larger quantization step-width corresponding to a coarser quantization.

Traditional DCT-based encoding formats address this issue by means of adaptive quantization: different coding units (e.g., blocks) in a same picture (or frame) may be coded according to different QP (Quantization Parameter) values, effectively driving a cascade of different quantization steps for each transformed coefficient for blocks with different QPs. These methods produced material improvements in compression, but they require to spend bits to signal a so-called "QP map".

Differently from DCT-based encoding formats, hierarchical tier-based coding formats are characterized by much smaller coding units, typically containing as little as 2×2 or 4×4 pixels (in contrast, for example, to the up to 128×128 pixels used for coding units of DCT-based codecs). As a consequence, signalling adaptive quantization information on a per-block basis would be more costly. In addition, tier-based coding methods are typically aimed at software applications, and decoding an additional layer of data would add additional processing to the encoding and decoding process, which would in many ways overshadow the compression benefits of such a method.

Methods described herein allow to efficiently drive a degree of adaptive quantization for tier-based encoding formats without requiring to signal a dedicated layer with an adaptive quantization map.

SUMMARY OF THE INVENTION

In accordance with an aspect, there may be provided a method of encoding an input signal into a plurality of encoded streams, wherein the encoded streams may be combined to reconstruct the input signal, the method comprising: receiving an input signal; downsampling the input signal to create a downsampled signal; instructing an encoding of the downsampled signal using a base encoder to create a base encoded stream; instructing a decoding of the base encoded stream using a base decoder to generate a reconstructed signal; comparing the reconstructed signal to the input signal to create a set of residuals; and, encoding the set of residuals to create an encoded stream, including: applying a transform to the set of residuals to create a set of transformed coefficients; applying a quantization operation to the set of transformed coefficients to create a set of quantized coefficients; and applying an encoding operation to the quantized coefficients.

In accordance with a further aspect, there may be provided a method of decoding an encoded stream into a reconstructed output signal, the method comprising: receiving a first output signal decoded from a first base encoded stream according to a first codec; receiving a level encoded stream; decoding the level encoded stream to obtain a set of residuals; and, combining the set of residuals with the first output signal to generate a reconstructed signal, wherein the decoding the level encoded stream comprises: decoding a set of quantized coefficients from the level encoded stream; dequantizing the set of quantized coefficients, wherein the dequantizing the set of quantized coefficients is based on temporal information associated with the level encoded stream. The combining may include combining with an upsampled version of the first output signal. The level encoded stream may be a first level encoded stream; the set of quantized coefficients may be a first set of quantized coefficients; and, the set of residuals may be a first set of residuals, and wherein the method may further comprise: receiving a second level encoded stream; decoding the second level encoded stream to obtain a second set of residuals; and combining the second set of residuals with an upsampled version of the reconstructed signal to generate a reconstruction of an original resolution input signal, wherein decoding the second level encoded stream comprises: decoding a second set of quantized coefficients from the second level encoded stream; dequantizing the second set of quantized coefficients.

The method may advantageously allow the efficiency of the encoding and decoding process to be improved, by way of altering the degree and/or manner of compression applied to the coefficients in the quantization process in dependence on any of a number of factors based upon the video data to be coded. Thus the way in which the typically lossy procedure of quantization is performed during encoding a video stream can be adapted in such a way that an appropriate balance between encoding or compression efficient and visually perceptible compression of the input video, which is a relation that may vary greatly across different video frames and streams, may be applied depending upon the nature and content of the input video. This adaptable form of quantization may be used in cooperation with a de-quantization process at a receiving decoder for instance, by way of signalling to the decoder the manner in which the quantizing has been performed, or the degree to which it has been altered from a default mode, for example, through transmission of parameters having values that represent or indicate that information. In particular, an applied offset can advantageously be used to modify entropy of residual data during encoding to improve compression efficiency.

Using the quantization offset, in some embodiments, comprises applying the quantization offset to a plurality of quantization bins having a defined step width so as to adjust each of the values to which one or more of the said plurality of quantization bins correspond by, or based upon, the value of the quantization offset.

In such embodiments the value to which each of the plurality of quantization bins corresponds may be adjusted. Alternatively, either or both of the value corresponding to the start of the first bin of the plurality of bins and the value corresponding to the end of the last bin of the plurality of bins is not adjusted by, that is it remains unadjusted by, the value of the quantization offset. The fist bin may be understood as corresponding to the numerically lowest value, or the minimum of the range. Likewise the last bin may be understood as representing the maximum of the range or the numerically greatest value. These adjustments and lack thereof may be applied in combination with quantization operations involving a dead zone and bin folding as described later in this disclosure.

Typically the value of the quantization offset is adjustable, or configurable. The value of the quantization offset may, in some embodiments, be varied based upon data indicating operating conditions under which the encoding is being performed In some embodiments the method further comprises signalling the quantization offset value to a decoder at which the encoded stream is to be received. This signalling may for example be performed in implementations wherein the quantization offset value is dynamically varied during the encoding.

The quantization operation typically comprises subtracting the quantization offset value from a residual or coefficient value before quantization based on a quantization step width.

In some embodiments the value of the quantization offset is adjusted based on a sign of the residual or coefficient. This may be effected so as to allow for symmetrical operations about a zero value.

The method may be performed such that, when the value of the quantization offset is set to a first predetermined value, the application of the offset to the bin values is disabled. For instance this may be done by setting a quantization or dequantization offset value to zero.

In some embodiments the value of the quantization offset is adjusted based on a defined width of a dead zone. In such embodiments, the quantization operation may be performed using a dead zone, as detailed later in disclosure. The quantization offset can be configured or adjusted based on a defined width of the dead zone It has also been realised that temporal information may be advantageously used to improve the quantization process further. Residual data pertaining to "temporally stable" areas are more likely to be leveraged for multiple frames in the video sequence, and thus their entropy cost can be "amortized" over multiple frames. Also, they are also more likely to be appreciated by a viewer (who would have more time to assess their fidelity with respect to more "ephemeral" areas of the video sequence).

For example, "temporally stable" areas in a video comprise those portions of a frame which are static and/or quasi-static with respect to one or more previous frames and/or one or more following frames. By way of a non-limiting example, a background scene in a news-reporting video may be relatively temporally stable across multiple frames. "Temporal stable" may also include portions of a frame which are easy to predict using motion compensation between frames. For example, a portion of a frame which translates between frames without changing too much in its shape/form may also be "temporally stable". "Temporal stable" areas typically can be temporally predicted from one or more previous and/or subsequent frames. On the other hand, "ephemeral" areas in a video comprise those portions of a frame which are not "temporally stable" and change between frames (e.g., dynamic). These changes can be substantial or not. "Ephemeral" areas typically cannot be temporally predicted from one or more previous and/or subsequent frame.

Temporal signalling may be efficiently used in order to drive additional coding efficiency and improve visual quality: although a single master quantization step-width is signalled for each enhancement level, or "echelon" of residual data, the decoder typically produces a different (e.g., larger) quantization step width for areas of the picture that are not temporally predicted. In this way, without any bits or processing spent on additional signalling, less bits are spent on ephemeral residuals, and consequently relatively more bits are spent on residuals that are leveraged/reused (and appreciated by a viewer) for multiple frames.

In some embodiments, a map of temporal correlation information between one or more preceding frames and the current frame is leveraged in order to increase the quantization step-width for coefficients corresponding to non-temporally predicted (e.g., by way of non-limiting example, non-static) areas of the picture—or, similarly, to decrease the quantization step-width for coefficients corresponding to temporally predicted (e.g., by way of a non-limiting example, static or quasi-static) areas of the picture. In a non-limiting embodiment, a temporal data layer signals the areas of the echelon of residual data that are to be predicted based on previous corresponding areas, for example by means of producing them based at least in part on the content of a temporal buffer. In this way, areas that are non-temporally predicted use a different quantization step-width with respect to areas that are temporally predicted, according to a relationship (e.g., a formula) that is known to both encoder and decoder.

In some embodiments, temporally predicted areas are static, quasi-static or motion-compensated areas, and a residual data for a temporally predicted area is obtained by combining the corresponding value of a corresponding area in one or more of the preceding frames (e.g., stored in a temporal buffer) with the value obtained by dequantizing a corresponding quantized coefficient from the encoded data stream, wherein the dequantization process is based on the master step-width for the echelon of residual data; conversely, a residual data for an area that is not temporally predicted is obtained by dequantizing a corresponding quantized coefficient from the encoded data stream, wherein the dequantization process is based on a step-width obtained from the master step-width for the echelon of residual data modified according to a formula known to both encoder and decoder.

In some embodiments, temporally predicted areas are static, quasi-static or motion-compensated areas, and a residual data for a temporally predicted area is obtained by combining the corresponding value of a corresponding area in one or more of the preceding frames (e.g., stored in a temporal buffer) with the value obtained by dequantizing a corresponding quantized coefficient from the encoded data stream, wherein the dequantization process is based on the master step-width for the echelon of residual data modified according to a formula known to both encoder and decoder; conversely, a residual data for an area that is not temporally predicted is obtained by dequantizing a corresponding quantized coefficient from the encoded data stream, wherein the dequantization process is based on a step-width obtained from the master step-width for the echelon of residual data.

In other embodiments, temporally predicted areas are static areas, quasi-static areas or motion-compensated (if a motion compensation algorithm is used, for example) areas. Accordingly, different quantization step-widths can be used for any of the above areas (static, quasi-static, motion-compensated areas and non-temporally-predicted areas), according to formulas that may be known to both encoder and decoder. In a non-limiting example, static, quasi-static or motion-compensated (if present) areas may have a same quantization step-width which is different (e.g., lower) from that used for the non-temporally predicted area. In another non-limited example, each of those four areas (static, quasi-static, motion-compensated (if present), non-temporally predicted) may have a different step-widths. For example, the step-width for the static may be lower than that for quasi-static, and both may be lower than that for motion-compensated areas, whilst all of them being lower than that used for non-temporally-predicted areas. However, it is to be understood that other combinations are possible, and in fact the scheme allows for flexibility in determining which formulas would best work for a specific sequence and/or type of areas.

In some embodiments, the encoder can optionally signal to the decoder a parameter to be used—in lieu of a default parameter—to derive the quantization step-width of non-temporally-predicted areas and/or the quantization step-width of temporally-predicted areas. In some non-limiting embodiments, the quantization step-width of non-temporally-predicted areas is derived from the quantization step-width of temporally predicted areas by means of a linear relationship. In other non-limiting embodiments, the quantization step-width of non-temporally-predicted areas is derived from the quantization step-width of temporally predicted areas by means of a non-linear relationship. In other non-limiting embodiments, the quantization step-width of non-temporally-predicted areas is derived from the quantization step-width of temporally predicted areas by means of a look up table. In some non-limiting embodiments, the quantization step-width of temporally-predicted areas is derived from the quantization step-width of non-temporally predicted areas by means of a linear relationship. In other non-limiting embodiments, the quantization step-width of temporally-predicted areas is derived from the quantization step-width of non-temporally predicted areas by means of a non-linear relationship. In other non-limiting embodiments, the quantization step-width of temporally-predicted areas is derived from the quantization step-width of non-temporally predicted areas by means of a look up table.

According to second non-limiting embodiments, a map of temporal correlation information between an echelon of residual data of the current frame and the corresponding echelon of residual data of the subsequent frame is leveraged in order to increase the quantization step-width for coefficients corresponding to non-temporally predicted (e.g., by way of non-limiting example, non-static) areas of the picture—or, similarly, to decrease the quantization step-width for coefficients corresponding to temporally predicted (e.g., by way of non-limiting example, static or quasi-static) areas of the picture. In a non-limiting embodiment, a temporal data layer signals the areas of the echelon of residual data of a subsequent frame that are generated based at least in part on the content of previous frames (e.g., stored in a temporal buffer) including the current frame. Areas of the echelon of residual data of the current frame ("ephemeral residuals") that correspond to areas of the subsequent frame that will not produce residuals based at least in part on corresponding areas in the current and/or previous frames (e.g., as stored in a temporal buffer) use a different quantization step-width with respect to areas of the echelon of residual data of the current frame ("temporally stable residuals") that correspond to areas of the subsequent frame that will be predicted based on corresponding areas in the current and/or previous frames (e.g., as stored in a temporal buffer, according to a formula for obtaining the quantization step-width for ephemeral residuals (or for temporally stable residuals) from the master step-width for the echelon of residual data that is known to both encoder and decoder.

In some embodiments, an encoder generates signalling information with respect to what areas of an echelon of residual data should be decoded based at least in part on one or more of residual data from previous or subsequent frames (e.g., stored in a temporal buffer). In a non-limiting embodiment, the encoder decides on whether to signal an area of the echelon of residual data as data to be predicted based at least in part on one or more of residual data from previous or subsequent frames (e.g., stored in a temporal buffer) according to a formula assuming that residual data of areas produced based at least in part on one or more of residual data from previous or subsequent frames (e.g., stored in a temporal buffer) are quantized differently from residual data produced independently of the one or more of residual data from previous or subsequent frames (e.g., stored in a temporal buffer). In a non-limiting embodiment, the encoder employs a Rate Distortion Optimization (RDO) formula that for a given master quantization step-width estimates the distortion of the two alternatives (i.e., temporally predicted vs. independently produced) and the rate required by the two alternatives, wherein the rate of the temporally predicted alternative is estimated by means of the given master quantization step-width, while the rate of the independently produced alternative assumes a larger quantization step-width ("intra-residuals quantization step-width"), calculated from the master quantization step-width according to a formula known to both encoder and decoder. In a non-limiting embodiment, the encoder generates a parameter that modulates the formula that produces, based on the given overall quantization step-width, the intra-residuals quantization step-width; the modulation parameter, when different from a default parameter known to the decoder, is signalled to the decoder as decoding meta-data, in order to allow the decoder to produce the correct intra-tile quantization step-width. In a non-limiting embodiment, the encoder generates the modulation parameter based at least in part on the average percentage of the picture that is temporally predicted. In a non-limiting embodiment, the encoder generates the modulation parameter based at least in part on the number of frames that one or more portions of the temporal buffer are estimated to be used. In a non-limiting embodiment, the encoder generates the modulation parameter based at least in part on a saliency map, estimating the relative importance of different areas of the picture.

In some embodiments, the formula used to generate the intra-residuals quantization step-width from the master quantization step-width is linear, as in $$\text{Intra-residuals\_quantization\_step-width} = \text{master\_quantization\_step-width} * (1 + \text{step-width\_modifier}/c)$$

wherein c is a constant dependent on the number of bits used for the parameter step-width_modifier. For instance, for the case in which 8 bits are used for step-width_modifier, c would be equal to the maximum percentage of increase between master quantization step-width and intra-residuals quantization step-width divided by 255. In some non-limiting embodiments, when step-width_modifier is not signalled to the decoder, the decoder uses a default value in its place.

Alternatively, the rate of the independently produced alternative is estimated by means of the given master quantization step-width, while the rate of the temporally predicted alternative assumes a smaller quantization step-width ("inter-residuals quantization step-width"), calculated from the master quantization step-width according to a formula known to both encoder and decoder. In a non-limiting embodiment, the encoder generates a parameter that modulates the formula that produces, based on the given overall quantization step-width, the inter-residuals quantization step-width; the modulation parameter, when different from a default parameter known to the decoder, is signalled to the decoder as decoding meta-data, in order to allow the decoder to produce the correct intra-tile quantization step-width. In a non-limiting embodiment, the encoder generates the modulation parameter based at least in part on the average percentage of the picture that is temporally predicted. In a non-limiting embodiment, the encoder generates the modulation parameter based at least in part on the number of frames that one or more portions of the temporal buffer are estimated to be used. In a non-limiting embodiment, the encoder generates the modulation parameter based at least in part on a saliency map, estimating the relative importance of different areas of the picture.

In some non-limiting embodiment, the formula used to generate the inter-residuals quantization step-width from the master quantization step-width is linear, as in $$\text{Inter-residuals\_quantization\_step-width} = \text{master\_quantization\_step-width}/(1 + \text{step-width\_modifier}/c)$$

wherein c is a constant dependent on the number of bits used for the parameter step-width_modifier.

In other non-limiting embodiments, the formula used to generate the intra-residuals quantization step-width or the inter-residuals quantization step-width is a non-linear formula.

More generally, in some embodiments, the quantization operation is performed based on temporal information associated with the data being quantized, or the set of coefficients. The temporal information may be information for or about the set of coefficients. For instance, temporal information may have been derived for each video frame, using a temporal prediction module for example. An association between the temporal and coefficients may be understood as such in this disclosure. In some examples, temporal information may be obtained, describing temporal predictability of a frame corresponding to a given set of coefficients. The information may indicate which areas of specific frame can be predicted at least in part from one or more other frames (preceding and/or subsequent)—temporal predicted areas—and which areas of a specific frame cannot be predicted at least in part from one or more other frames (preceding and/or subsequent)—non-temporally predicted areas. This information can then be used by a quantizer performing the quantization operation to determine different quantization parameters for the temporally predicted areas and the non-temporally predicted areas.

In some embodiments where the user of temporal information is employed, the method may further comprise deriving one or more quantization parameters based on the temporal information. The method may, additionally or alternatively, comprise determining a first quantization parameter for a first subset of the set of coefficients associated with first temporal information. In such cases, a second quantization parameter may be determined, for a second subset of the set of coefficients associated with second temporal information.

Such implementations may further comprise determining the temporal information associated with the set of coefficients by deriving a correlation between co-located sets of coefficients at different samples. This may be temporal correlation information between one or more preceding frames and a current frame, and used to increase the quantization step-width for coefficients.

In some of these embodiments, the temporal information comprises, or contains an indication of, whether or not the set or subset of coefficients is one of the following: static, quasi-static, and dynamic. Preferably, in some embodiments, a given set or subset of coefficients in a layer is static if a difference with a corresponding co-located set or subset of coefficients in a previous and/or a subsequent sample, that is to say a difference between the given set/subset and the corresponding co-located set/subset, has a substantially zero estimated information entropy; optionally, "substantially zero" means less than zero-value threshold, such that when the difference is below the threshold, the difference is taken to be zero value.

A given set or subset of coefficients in a layer may be quasi-static if the difference with a corresponding co-located set or subset of coefficients in a previous and/or a subsequent sample has a lower estimated information entropy than the estimated information entropy of the given set or subset of coefficients. Accordingly, a given set or subset of coefficients in a layer may be dynamic if the difference with a corresponding co-located set or subset of coefficients in a previous and/or a subsequent sample has substantially same or higher estimated information entropy than the estimated information entropy of the given set or subset of coefficients.

A bin folding process may also be used to enhance the coding efficiency in some embodiments. In particular, in such cases, the quantization operation further comprises applying a bin folding operation to the set of coefficients, the bin folding operation comprising each coefficient that has a value in excess of a predetermined maximum value, the maximum value being defined by an upper limit of a first quantization bin of a plurality of quantization bins having a defined step width, being quantized so as to have a quantized value corresponding to the first quantization bin. This may be performed so as to place all residual or coefficient values that reside above a selected quantization bin into the selected bin. With regard to what may be understood as the endpoints of the range of values involved, the first bin may be considered to correspond to an upper value, or a bin corresponding to the highest (absolute) quantized value. Bin folding may be implemented at either or both of upper and lower endpoints. A similar process may be performed for the negative values in the range. The bin folding may be configured so as to adjust, or reduce, a bit rate based on at least one of network conditions and base stream processing. Thus the bin folding process may itself be configurable, for example with either or both of conditions and base stream processing or parameters derived therefrom being used to configure the bin folding, for example parameters defining the bin folding, in various embodiments. Bin folding may be thought of as clipping, where values above a threshold are set at an upper limit value.

In some embodiments the method may involve a step-width used in the quantization operation being varied in accordance with a stepwidth parameter. In particular, the step width may be varied for each of one or more of the coefficients in the set of coefficients, for instance for different coefficients within a 2×2 or 4×4 block of coefficients. For example, the step width may be varied such that a smaller step width value is used for one or more of the coefficients that are predetermined to influence perception of a decoded signal to a greater degree. The degree of influence is typically experimentally determined, whereby information may be obtained indicating which coefficients more heavily influence perception, to a viewer, of a decoded signal.

The step width is typically assigned a default value in accordance with a base stepwidth parameter. One or more modified step widths may be obtained in accordance with the base step width and a stepwidth modifier parameter. For example, this may be performed by the modified step width being obtained according to the formula modified_stepwidth= base_stepwidth*modifier, where the modifier may be set based on a particular coefficient within a block or unit.

In such embodiments, a respective stepwidth modifier parameter may be used to modify the stepwidth used for each of one or more of the coefficients.

A respective step width value can, in some embodiments, be used for, or associated with, each of two or more encoded streams, or levels of enhancement, comprising a base encoded stream and one or more enhancement level encoded stream.

In some embodiments the stepwidth modifier parameter is varied in dependence on a level of enhancement, that is, depending upon a level of enhancement employed. The stepwidth modifier may be varied such that a smaller step width is used for a first level encoded stream and a larger step width is used for a base encoded stream.

In some preferred embodiments the quantization operation uses a quantization matrix defined with a set of stepwidth modifier parameter values for different coefficients and different levels of enhancement. Thus the method may involve respective stepwidth modified parameter values for each coefficient and for each level of enhancement. The quantization matrix may be obtained by the encoder performing the method, and by a decoder performing a corresponding decoding process, by various means in different embodiments. In particular the quantization matrix may be preset at at least one of an encoder and a decoder, or wherein the quantization matrix may be signalled between an encoder and a decoder, and additionally or alternatively constructed dynamically at at least one of the encoder and decoder.

The method may further comprise constructing the quantization matrix as a function at least one of: one or more stored and one or more signalled parameters.

In some embodiments, scaled transform coefficients d[x][y], for x=0 . . . nTbS−1, y=0 . . . nTbS−1, and given quantization matrix qm[x][y], may be derived according to the formula:

d[x][y]=(TransformCoeffQ[x][y]*((qm[x+(levelIdxSwap*nTbS)][y]+stepWidthModifier[x][y])+appliedOffset [x][y]), wherein TransformCoeffQ is an array of size (nTbS)×(nTbS) containing entropy decoded quantized transform coefficients, levelIdx is a variable specifying the index of an enhancement sub-layer, and appliedOffset [x][y] and stepWidthModifier [x][y] are variables. appliedOffset [x][y] may correspond to a dead zone as described elsewhere herein.

For example, levelIdx may be equal to 1 for enhancement sub-layer 1 and be equal to 2 for enhancement sub-layer 2.

Typically, the variable stepWidthModifier [x][y] is derived according to:

if dequant_offset_signalled_flag=0, stepWidthModifier [x][y]=((((Floor(−Cconst*Ln (qm[x+(levelIdxSwap*nTbS)][y])))+Dconst)*(qm[x+(levelIdxSwap*nTbS)][y]2)))/32768), wherein Cconst and Dconst are constants, and may have values or 5242 and 99614 respectively in one example.

The quantization operation may, in some embodiments, comprise quantizing the coefficients using a linear quantizer, with the linear quantizer preferably using a dead zone of variable size. In such embodiments, the size of the dead zone may be set as a predetermined multiple of a stepwidth used in the quantization operation, for example as a linear function of a stepwidth value. Alternatively, a non-linear function of stepwidth value may be used.

The size of a stepwidth used in the quantization operation is variable in some preferred embodiments, and the size of the dead zone is more preferably adapted in accordance with the variable stepwidth.

The size of the dead zone may be set by multiplying a stepwidth used in the quantization operation with a multiplier parameter, and wherein the value of the multiplier parameter is varied based upon data indicating operating conditions, e.g. available bit rates, under which the encoding is being performed. Thus in some embodiments the multiplier may also be adaptive.

The quantization operation is typically performed in accordance with one or more quantization parameters. The one or more quantization parameters are typically set to at least one of: control, and provide a desired bitrate in, one or more encoded streams. That is they may be set to control, and/or provide a desired bitrate in, one or more encoded streams. The desired bitrate is a common bitrate for all streams so as to generate a common encoded stream, or wherein different bitrates are provided for different encoded streams.

In some embodiments, the one or more quantization parameters are set so as to provide a desired quality level, or to maximise a quality level, within a set of pre-defined bit-rate constraints The method may comprise determining quantization parameters by receiving a status of a buffer that receives the one or more encoded streams and the base encoded stream; and using the status to determine the quantization parameters.

The buffer is preferably used to store and/or combine, an encoded base stream and an encoded enhancement stream, and is configured to receive inputs at variable bitrates while the output is read at a constant rate. A rate controller may read the status from the buffer so as to ensure that the buffer does not overflow or get empty, and that data are always available to be read at its output. A status of the buffer may also be used to generate the one or more quantization parameters. The one or more quantization parameters may be controlled based on the amount of data within the buffer.

Typically the values of the quantization parameters are inversely related to the amount of data in the buffer.

In some embodiments quantization parameters are determined for each frame, residual and/or group of residuals, that is, at least one of: each frame, residual, and group of residuals. Typically the quantization parameters for a frame are determined based on a target data size for the frame and a current data size for the frame using a previous set of quantization parameters. In any of these embodiments the quantization parameters may be based on a previous set of quantization parameters.

The method may comprise defining a set of curves to map a normalized size onto the one or more quantization parameters, wherein each curve comprises one or more of a multiplier and an offset that depends upon the properties of a current frame. A set of curves may be defined to map a normalised size onto a quantization parameter. Each curve may have one or more of a multiplier and an offset that may depend on the properties of a current frame (e.g. that may depend on a complexity of information to encode within the frame). The multiplier and the offset may define the shape of the curve. The multiplier may be applied to a size normalisation function that is a function of the quantization parameter Q. In one case, the current size (i.e. the size of frame t encoded with $Q_{t-1}$) and $Q_{t-1}$ may be used to define a point within the space of the set of curves. This point may be used to select a set of closest curves from the set of curves. These may be a curve that is above the point and a curve that is below the point or a highest or lowest curve for the point. The set of closest curves may be used in an interpolation function together with the point to determine a new curve associated with the point.

Once this new curve is determined, a multiplier and an offset for the new curve may be determined. These values may then be used together with the received target size to determine a value for Qt (e.g. the curve may define a function of size and Q). Thus typically the multiplier is applied to a size normalization function that is a function of the quantization parameter Q. The current size of a frame t encoded with $Q_{t-1}$, and $Q_{t-1}$, may be used to define a point within the space of the set of curves, and wherein the point is used to select a set of closest curves from the set of curves. The closest may be a curve that is above the point and a curve that is below the point or a highest or lowest curve for the point.

In such cases, the set of closest curves is typically used in an interpolation function together with the point to determine a new curve associated with the point, and a multiplier and an offset for the determined new curve may be determined, further comprising using the values of the multiplier and the offset for the determined new curve values together with a received target size to determine a value for $Q_t$.

The set of curves may be stored in an accessible memory and updated based on a set of curves determined for a previous frame. In certain cases, adaptive quantization may be applied differently for different coefficient locations within a coding unit or block, e.g. for different elements in an array of 4 or 16 coefficients (for 2×2 or 4×4 transforms for instance).

In some embodiments, the quantization operation is performed using a quantization matrix, the quantization matrix being derived in accordance with an obtained value of a quantization matrix mode parameter. Preferably in such cases the quantization matrix mode parameter specifies the quantization matrix to be used in the encoding process.

Typically a respective, preferably different, quantization matrix is used for each of two or more levels of encoded streams. More preferably, different quantization matrices are used for each encoded stream, wherein a default quantization configuration is predetermined, and variations from the default configuration are signalled between the encoder and a decoder.

In these embodiments the method may comprise causing different quantization matrices are to be used for respective encoded streams by way of at least one of: a default configuration, and causing a common quantization matrix to be used for the respective encoded streams by way of signalling to override the default configuration.

The quantization matrix is, in some embodiments, used only for one of a plurality of levels of enhancement. The quantization matrix is typically indexed by a position of the coefficient within a block in which the coefficients are arranged.

In some embodiments a base quantization matrix is defined with a set of values, and the base quantization matrix is modified in accordance with a scaling factor that is a function of a step width for one or more of the enhancement levels. The scaling factor may be computed as a clamped function of a stepwidth parameter, for example. In some embodiments each entry in the quantization matrix is scaled using an exponential function of the scaling factor.

In accordance with a second aspect there is provided a method of (namely a method for) decoding an encoded stream into a reconstructed output signal, the method comprising: receiving a first output signal decoded from a first base encoded stream according to a first codec; and, combining the set of residuals with an first output video to generate a decoded video, wherein the received encoded stream comprises a group of transform coefficients that have been scaled using a linear quantizer, and the decoding comprises performing a de-quantization operation, which may be understood as applying a de-quantization to quantized data, wherein the linear quantizer uses a non-centred de-quantization offset, wherein the value of the dequantization offset is received from an encoder. The combining may include combining with an upsampled version of the first output signal. The linear quantizer may use a dead zone of a different size with respect to the quantization step and non-centred dequantization offset.

Typically the received offset value offset is added to a received quantized value prior to dequantization based on a stepwidth.

In accordance with a third aspect there is provided a method of (namely a method for) decoding an encoded stream into a reconstructed output signal, the method comprising: receiving a first output signal decoded from a first base encoded stream according to a first codec; and, combining the set of residuals with an first output signal to generate a decoded signal, wherein the received encoded stream comprises a group of transform coefficients that have been scaled using a linear quantizer, and the decoding comprises applying, that is performing, a de-quantization operation, wherein the dequantization operation is performed using a dead zone, wherein the size of the dead zone is obtained in accordance with a step width used in the dequantization operation and quantization parameters received from the encoder. The combining may include combining with an upsampled version of the first output signal.

The method according to either of the second and third aspects may further comprise any of the following implementation details. The method may comprise performing the dequantization operation based on temporal information associated with the encoded stream. The method may further comprise deriving, from the encoded stream, one or more quantization parameters based on temporal information associated with the set of data.

Typically the method further comprises determining a first quantization parameter for a first subset of data associated with a first temporal information.

The method may further comprise determining a second quantization parameter for a second subset of data associated with a second temporal information. The method may further comprise determining the temporal information associated with the set of data. The deriving quantization parameters may further comprise determining from the encoded stream whether or not default values should be used.

Typically, deriving quantization parameters further comprises determining from the encoded stream whether or not signalled values should be used in place of default values.

The dequantization operation may be performed based on one or more quantization parameters, wherein the one or more quantization parameters are generated based on temporal information associated with a set of encoded data/group of transform coefficients, or with the encoded stream.

Furthermore, the method may comprise decoding a layer of data by combining one or more sets of decoded data with corresponding data contained in a temporal buffer, and decoded data that is combined with corresponding data in the temporal buffer may be dequantized with different quantization parameters with respect to decoded data that is not combined with corresponding data in the temporal buffer. This may be understood as decoded data that is combined with corresponding data in the temporal buffer is dequantized with quantization parameters that are different from those used for decoded data that is not combined with corresponding data in the temporal buffer.

In some embodiments a single quantization parameter is received by a decoder for the whole layer of data, and the decoder produces, based at least in part on said single quantization parameter, the different quantization parameters to be used for sets of data to be combined with corresponding data in the temporal buffer and sets of data not to be combined with corresponding data in the temporal buffer. A formula used by the decoder to derive a quantization parameter for sets of data not to be combined with corresponding data in the temporal buffer may be based at least in part on a default parameter, wherein the default parameter is overwritten with a configuration parameter contained in the encoded stream if said configuration parameter is specified.

In accordance with a fourth aspect there is provided an encoder for encoding an input video, the encoder being configured to perform the method according to the first aspect.

In accordance with a fifth aspect there is provided a decoder for decoding an encoded stream into a reconstructed output video, the decoder being configured to perform the method according to any of the second and third aspects.

In accordance with a sixth aspect there is provided a non-transitory computer-readable storage medium storing instructions that, when executed by a processor, cause the processor to perform the method according to any of the first to third aspects.

More generally there is provided a method of encoding an input video into a plurality of encoded streams, wherein the encoded streams may be combined to reconstruct the input video, the method comprising: receiving an input video; downsampling the input video to create a downsampled video; instructing an encoding of the downsampled video using a base encoder to create a base encoded stream, the base encoded stream; instructing a decoding of the base encoded stream using a base decoder to generate a reconstructed video; comparing the reconstructed video to the downsampled video to create a first set of residuals; and, encoding the first set of residuals to create a first level encoded stream, including: applying a transform to the set of residuals to create a set of coefficients; applying a quantization operation to the set of coefficients to create a set of quantized coefficients; and applying an encoding operation to the quantized coefficients. This method may be performed with any of the implementation details described above.

BRIEF DESCRIPTION OF FIGURES

FIGS. 8A-8D show how the quantization in an encoding process may be performed according to specific examples;

DETAILED DESCRIPTION

Figure 1:
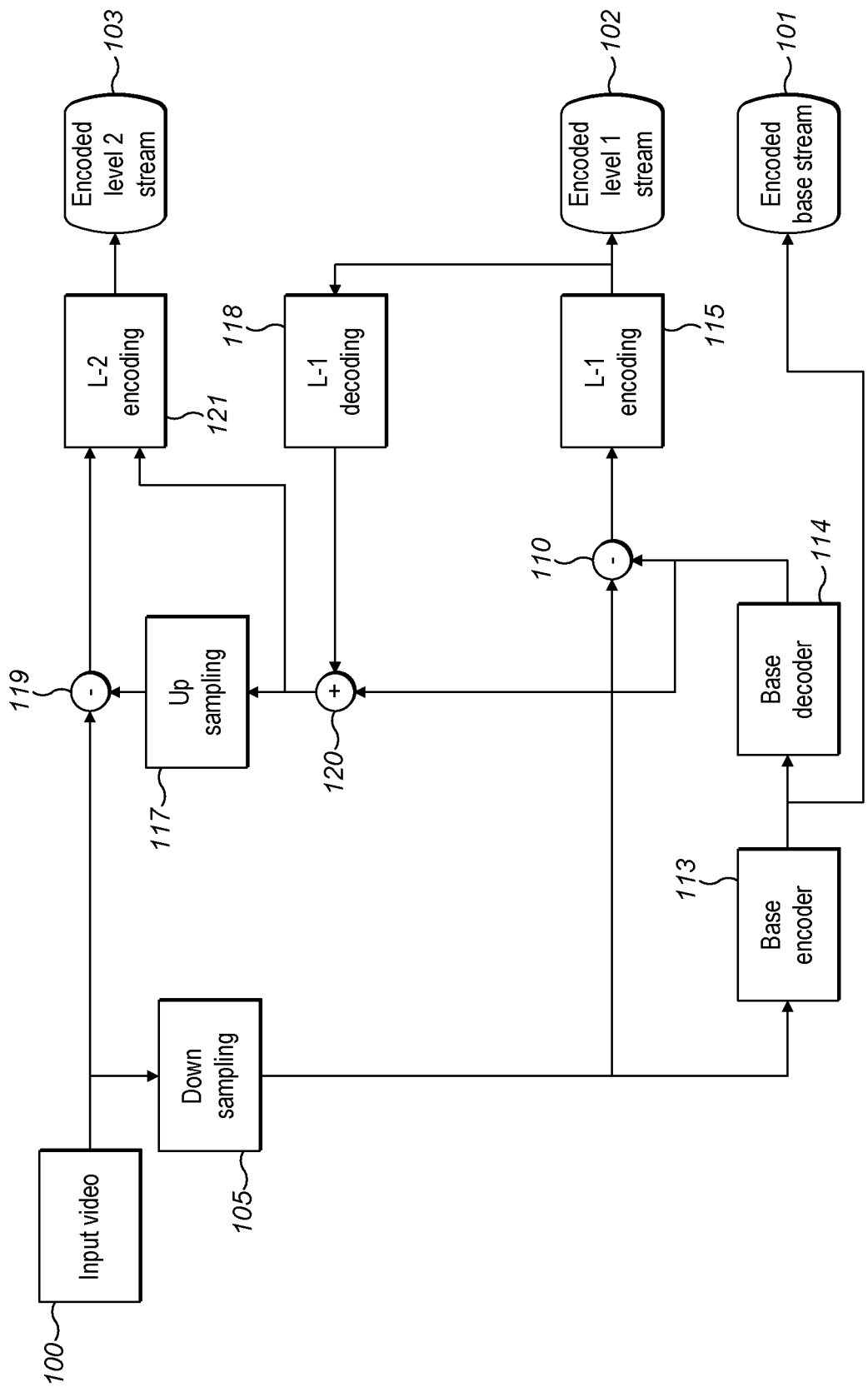
FIG. 1 shows a high-level schematic of an encoding process.

The present invention relates to methods. In particular, the present invention relates to methods for encoding and decoding signals. Processing data may include, but is not limited to, obtaining, deriving, outputting, receiving and reconstructing data.

The coding technology discussed herein is a flexible, adaptable, highly efficient and computationally inexpensive coding format which combines a video coding format, a base codec, (e.g. AVC, HEVC, or any other present or future codec) with an enhancement level of coded data, encoded using a different technique to the base codec. The technology uses a down-sampled source signal encoded using a base codec to form a base stream. An enhancement stream is formed using an encoded set of residuals which correct or enhance the base stream for example by increasing resolution or by increasing frame rate. There may be multiple levels of enhancement data in a hierarchical structure. In certain arrangements, the base stream may be decoded by a hardware decoder while the enhancement stream may be suitable for being processed using a software implementation.

It is important that any optimisation used in the new coding technology is tailored to the specific requirements or constraints of the enhancement stream and is of low complexity. Such requirements or constraints include: the potential reduction in computational capability resulting from the need for software decoding of the enhancement stream; the need for a combination of a decoded set of residuals with a decoded frame; the likely structure of the residual data, i.e. the relatively high proportion of zero values with highly variable data values over a large range; the nuances of a quantized block of coefficients; and, the structure of the enhancement stream being a set of discrete residual frames separated into various components. Note that the constraints placed on the enhancement stream mean that a simple and fast entropy coding operation is essential to enable the enhancement stream to effectively correct or enhance individual frames of the base decoded video. Note that in some scenarios the base stream is also being decoded substantially simultaneously before combination, putting a strain on resources.

In one case, the methods described herein may be applied to so-called planes of data that reflect different colour components of a video signal. For example, the methods described herein may be applied to different planes of YUV or RGB data reflecting different colour channels. Different colour channels may be processed in parallel. Hence, references to sets of residuals as described herein may comprise multiple sets of residuals, where each colour component has a different set of residuals that form part of a combined enhancement stream. The components of each stream may be collated in any logical order, for example, each plane at the same level may be grouped and sent together or, alternatively, the sets of residuals for different levels in each plane may be sent together.

This present document preferably fulfils the requirements of the following ISO/IEC documents: "Call for Proposals for Low Complexity Video Coding Enhancements" ISO/IEC JTC1/ SC29/ WG11 N17944, Macao, CN, Oct. 2018 and "Requirements for Low Complexity Video Coding Enhancements" ISO/IEC JTC1/ SC29/ WG11 N18098, Macao, CN, Oct. 2018 (which are incorporated by reference herein).

The general structure of the proposed encoding scheme in which the presently described techniques can be applied, uses a down-sampled source signal encoded with a base codec, adds a first level of correction data to the decoded output of the base codec to generate a corrected picture, and then adds a further level of enhancement data to an up-sampled version of the corrected picture. Thus, the streams are considered to be a base stream and an enhancement stream. This structure creates a plurality of degrees of freedom that allow great flexibility and adaptability to many situations, thus making the coding format suitable for many use cases including Over-The-Top (OTT) transmission, live streaming, live Ultra High Definition (UHD) broadcast, and so on. Although the decoded output of the base codec is not intended for viewing, it is a fully decoded video at a lower resolution, making the output compatible with existing decoders and, where considered suitable, also usable as a lower resolution output. In certain cases, a base codec may be used to create a base stream. The base codec may comprise an independent codec that is controlled in a modular or "black box" manner. The methods described herein may be implemented by way of computer program code that is executed by a processor and makes function calls upon hardware and/or software implemented base codecs.

In general, the term "residuals" as used herein refers to a difference between a value of a reference array or reference frame and an actual array or frame of data. The array may be a one or two-dimensional array that represents a coding unit. For example, a coding unit may be a 2×2 or 4×4 set of residual values that correspond to similar sized areas of an input video frame. It should be noted that this generalised example is agnostic as to the encoding operations performed and the nature of the input signal. Reference to "residual data" as used herein refers to data derived from a set of residuals, e.g. a set of residuals themselves or an output of a set of data processing operations that are performed on the set of residuals. Throughout the present description, generally a set of residuals includes a plurality of residuals or residual elements, each residual or residual element corresponding to a signal element, that is, an element of the signal or original data. The signal may be an image or video. In these examples, the set of residuals corresponds to an image or frame of the video, with each residual being associated with a pixel of the signal, the pixel being the signal element. Examples disclosed herein describe how these residuals may be modified (i.e. processed) to impact the encoding pipeline or the eventually decoded image while reducing overall data size. Residuals or sets may be processed on a per residual element (or residual) basis, or processed on a group basis such as per tile or per coding unit where a tile or coding unit is a neighbouring subset of the set of residuals. In one case, a tile may comprise a group of smaller coding units. Note that the processing may be performed on each frame of a video or on only a set number of frames in a sequence.

In general, each or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

Returning to the initial process described above, where a base stream is provided along with two levels (or sub-levels) of enhancement within an enhancement stream, an example of a generalised encoding process is depicted in the block diagram of FIG. 1. An input full resolution video 100 is processed to generate various encoded streams 101, 102, 103. A first encoded stream (encoded base stream) is produced by feeding a base codec (e.g., AVC, HEVC, or any other codec) with a down-sampled version of the input video. The encoded base stream may be referred to as the base layer or base level. A second encoded stream (encoded level 1 stream) is produced by processing the residuals obtained by taking the difference between a reconstructed base codec video and the down-sampled version of the input video. A third encoded stream (encoded level 2 stream) is produced by processing the residuals obtained by taking the difference between an up-sampled version of a corrected version of the reconstructed base coded video and the input video. In certain cases, the components of FIG. 1 may provide a general low complexity encoder. In certain cases, the enhancement streams may be generated by encoding processes that form part of the low complexity encoder and the low complexity encoder may be configured to control an independent base encoder and decoder (e.g. as packaged as a base codec). In other cases, the base encoder and decoder may be supplied as part of the low complexity encoder. In one case, the low complexity encoder of FIG. 1 may be seen as a form of wrapper for the base codec, where the functionality of the base codec may be hidden from an entity implementing the low complexity encoder.

A down-sampling operation illustrated by downsampling component 105 may be applied to the input video to produce a down-sampled video to be encoded by a base encoder 113 of a base codec. The down-sampling can be done either in both vertical and horizontal directions, or alternatively only in the horizontal direction. The base encoder 113 and a base decoder 114 may be implemented by a base codec (e.g. as different functions of a common codec). The base codec, and/or one or more of the base encoder 113 and the base decoder 114 may comprise suitably configured electronic circuitry (e.g. a hardware encoder/decoder) and/or computer program code that is executed by a processor.

Each enhancement stream encoding process may not necessarily include an up-sampling step. In FIG. 1 for example, the first enhancement stream is conceptually a correction stream while the second enhancement stream is up-sampled to provide a level of enhancement.

Looking at the process of generating the enhancement streams in more detail, to generate the encoded Level 1 stream, the encoded base stream is decoded by the base decoder 114 (i.e. a decoding operation is applied to the encoded base stream to generate a decoded base stream). Decoding may be performed by a decoding function or mode of a base codec. The difference between the decoded base stream and the down-sampled input video is then created at a level 1 comparator 110 (i.e. a subtraction operation is applied to the down-sampled input video and the decoded base stream to generate a first set of residuals). The output of the comparator 110 may be referred to as a first set of residuals, e.g. a surface or frame of residual data, where a residual value is determined for each picture element at the resolution of the base encoder 113, the base decoder 114 and the output of the downsampling block 105.

The difference is then encoded by a first encoder 115 (i.e. a level 1 encoder) to generate the encoded Level 1 stream 102 (i.e. an encoding operation is applied to the first set of residuals to generate a first enhancement stream).

As noted above, the enhancement stream may comprise a first level of enhancement 102 and a second level of enhancement 103. The first level of enhancement 102 may be considered to be a corrected stream, e.g. a stream that provides a level of correction to the base encoded/decoded video signal at a lower resolution than the input video 100. The second level of enhancement 103 may be considered to be a further level of enhancement that converts the corrected stream to the original input video 100, e.g. that applies a level of enhancement or correction to a signal that is reconstructed from the corrected stream.

In the example of FIG. 1, the second level of enhancement 103 is created by encoding a further set of residuals. The further set of residuals are generated by a level 2 comparator 119. The level 2 comparator 119 determines a difference between an up-sampled version of a decoded level 1 stream, e.g. the output of an upsampling component 117, and the input video 100. The input to the upsampling component 117 is generated by applying a first decoder (i.e. a level 1 decoder) to the output of the first encoder 115. This generates a decoded set of level 1 residuals. These are then combined with the output of the base decoder 114 at summation component 120. This effectively applies the level 1 residuals to the output of the base decoder 114. It allows for losses in the level 1 encoding and decoding process to be corrected by the level 2 residuals. The output of summation component 120 may be seen as a simulated signal that represents an output of applying level 1 processing to the encoded base stream 101 and the encoded level 1 stream 102 at a decoder.

As noted, an up-sampled stream is compared to the input video which creates a further set of residuals (i.e. a difference operation is applied to the up-sampled re-created stream to generate a further set of residuals). The further set of residuals are then encoded by a second encoder 121 (i.e. a level 2 encoder) as the encoded level 2 enhancement stream (i.e. an encoding operation is then applied to the further set of residuals to generate an encoded further enhancement stream).

Thus, as illustrated in FIG. 1 and described above, the output of the encoding process is a base stream 101 and one or more enhancement streams 102, 103 which preferably comprise a first level of enhancement and a further level of enhancement. The three streams 101, 102 and 103 may be combined, with or without additional information such as control headers, to generate a combined stream for the video encoding framework that represents the input video 100. It should be noted that the components shown in FIG. 1 may operate on blocks or coding units of data, e.g. corresponding to 2×2 or 4×4 portions of a frame at a particular level of resolution. The components operate without any inter-block dependencies, hence they may be applied in parallel to multiple blocks or coding units within a frame. This differs from comparative video encoding schemes wherein there are dependencies between blocks (e.g. either spatial dependencies or temporal dependencies). The dependencies of comparative video encoding schemes limit the level of parallelism and require a much higher complexity.

Figure 2:
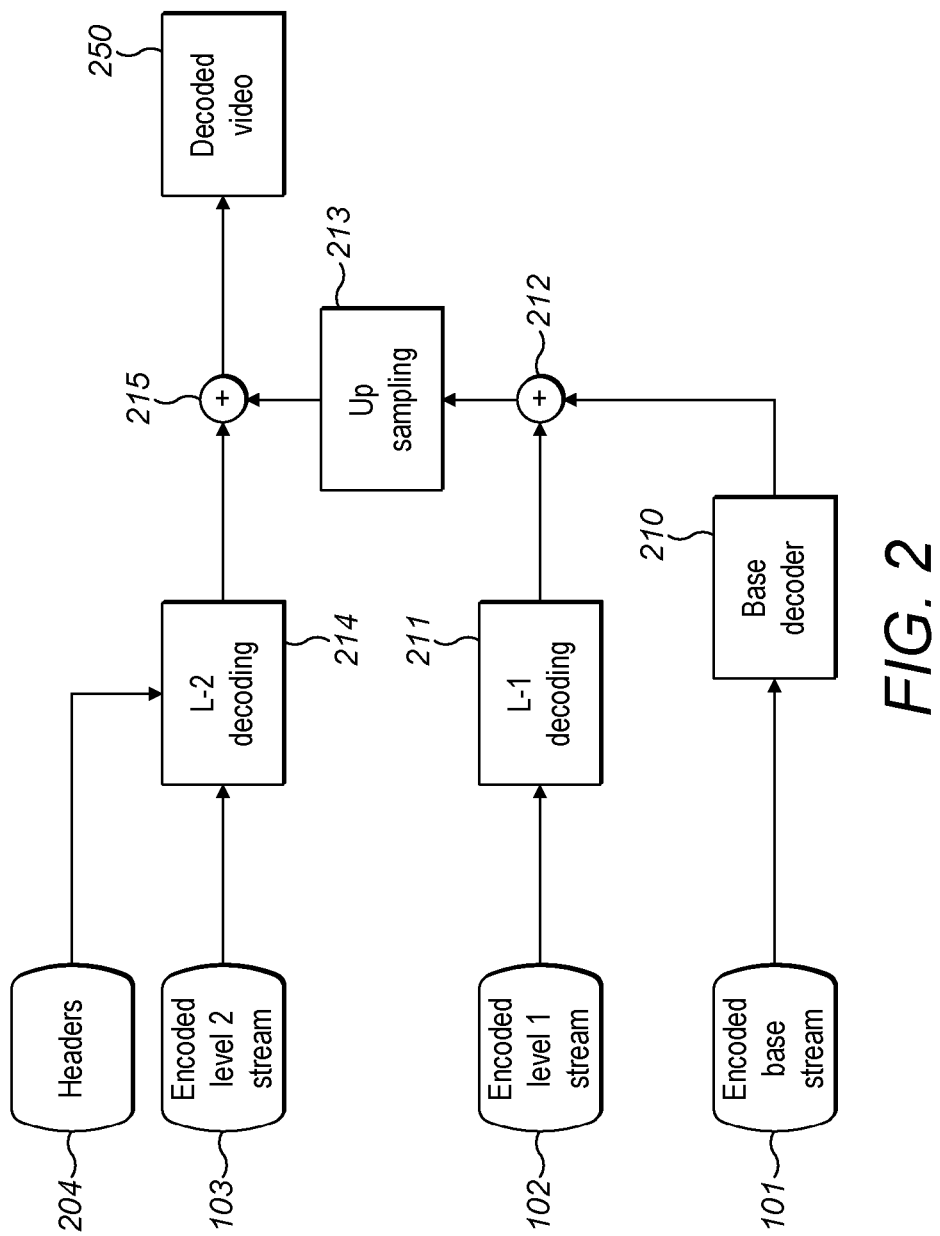
FIG. 2 shows a high-level schematic of a decoding process.

A corresponding generalised decoding process is depicted in the block diagram of FIG. 2. FIG. 2 may be said to show a low complexity decoder that corresponds to the low complexity encoder of FIG. 1. The low complexity decoder receives the three streams 101, 102, 103 generated by the low complexity encoder together with headers 204 containing further decoding information. The encoded base stream 101 is decoded by a base decoder 210 corresponding to the base codec used in the low complexity encoder. The encoded level 1 stream 102 is received by a first decoder 211 (i.e. a level 1 decoder), which decodes a first set of residuals as encoded by the first encoder 115 of FIG. 1. At a first summation component 212, the output of the base decoder 210 is combined with the decoded residuals obtained from the first decoder 211. The combined video, which may be said to be a level 1 reconstructed video signal, is upsampled by upsampling component 213. The encoded level 2 stream 103 is received by a second decoder 214 (i.e. a level 2 decoder). The second decoder 214 decodes a second set of residuals as encoded by the second encoder 121 of FIG. 1. Although the headers 204 are shown in FIG. 2 as being used by the second decoder 214, they may also be used by the first decoder 211 as well as the base decoder 210. The output of the second decoder 214 is a second set of decoded residuals. These may be at a higher resolution to the first set of residuals and the input to the upsampling component 213. At a second summation component 215, the second set of residuals from the second decoder 214 are combined with the output of the upsampling component 213, i.e. an upsampled reconstructed level 1 signal, to reconstruct decoded video 250.

As per the low complexity encoder, the low complexity decoder of FIG. 2 may operate in parallel on different blocks or coding units of a given frame of the video signal. Additionally, decoding by two or more of the base decoder 210, the first decoder 211 and the second decoder 214 may be performed in parallel. This is possible as there are no inter-block dependencies.

In the decoding process, the decoder may parse the headers 204 (which may contain global configuration information, picture or frame configuration information, and data block configuration information) and configure the low complexity decoder based on those headers. In order to re-create the input video, the low complexity decoder may decode each of the base stream, the first enhancement stream and the further or second enhancement stream. The frames of the stream may be synchronised and then combined to derive the decoded video 250. The decoded video 250 may be a lossy or lossless reconstruction of the original input video 100 depending on the configuration of the low complexity encoder and decoder. In many cases, the decoded video 250 may be a lossy reconstruction of the original input video 100 where the losses have a reduced or minimal effect on the perception of the decoded video 250.

In each of FIGS. 1 and 2, the level 2 and level 1 encoding operations may include the steps of transformation, quantization and entropy encoding (e.g. in that order). Similarly, at the decoding stage, the residuals may be passed through an entropy decoder, a de-quantizer and an inverse transform module (e.g. in that order). Any suitable encoding and corresponding decoding operation may be used. Preferably however, the level 2 and level 1 encoding steps may be performed in software (e.g. as executed by one or more central or graphical processing units in an encoding device).

The transform as described herein may use a directional decomposition transform such as a Hadamard-based transform. Both may comprise a small kernel or matrix that is applied to flattened coding units of residuals (i.e. 2×2 or 4×4 blocks of residuals). More details on the transform can be found for example in patent applications PCT/EP2013/059847 or PCT/GB2017/052632, which are incorporated herein by reference. The encoder may select between different transforms to be used, for example between a size of kernel to be applied.

The transform may transform the residual information to four surfaces. For example, the transform may produce the following components: average, vertical, horizontal and diagonal. As alluded to earlier in this disclosure, these components that are output by the transform may be taken in such embodiments as the coefficients to be quantized in accordance with the described methods.

In summary, the methods and apparatuses herein are based on an overall approach which is built over an existing encoding and/or decoding algorithm (such as MPEG standards such as AVC/H.264, HEVC/H.265, etc. as well as non-standard algorithm such as VP9, AV1, and others) which works as a baseline for an enhancement layer which works accordingly to a different encoding and/or decoding approach. The idea behind the overall approach of the examples is to hierarchically encode/decode the video frame as opposed to the use block-based approaches as used in the MPEG family of algorithms. Hierarchically encoding a frame includes generating residuals for the full frame, and then a decimated frame and so on.

The video compression residual data for the full-sized video frame may be referred to as LoQ-2 (e.g. 1920×1080 for an HD video frame or higher for a UHD frame), while that of the decimated frame may be referred to as LoQ-x, where x denotes a number corresponding to a hierarchical decimation. In the described examples of FIGS. 1 and 2, the variable x may have values of 1 and 2 represent the first and second enhancement streams. Hence there are 2 hierarchical levels for which compression residuals will be generated. Other naming schemes for the levels may also be applied without any change in functionality (e.g. the level 1 and level 2 enhancement streams described herein may alternatively be referred to as level 1 and level 2 streams—representing a count down from the highest resolution).

Figure 3:
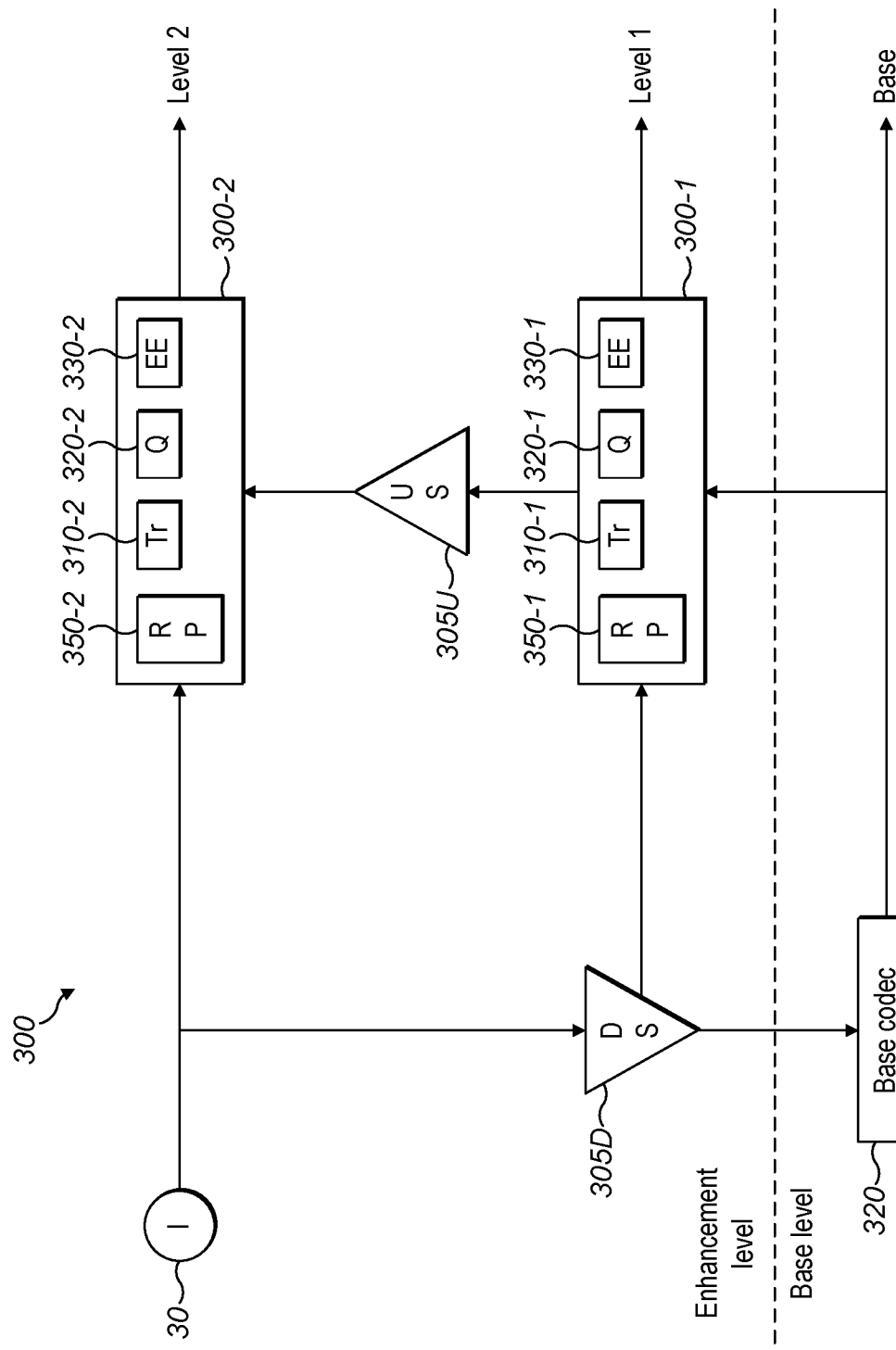
FIG. 3 shows a high-level schematic of an encoding process and specific encoding steps.

A more detailed encoding process is depicted in the block diagram of FIG. 3. The encoding process is split into two halves as shown by the dashed line. Below the dashed line is the base level of an encoder 300, which may usefully be implemented in hardware or software. Above the dashed line is the enhancement level, which may usefully be implemented in software. The encoder 300 may comprise only the enhancement level processes, or a combination of the base level processes and enhancement level processes as needed. The encoder 300 may usefully be implemented in software, especially at the enhancement level. This arrangement allows, for example, a legacy hardware encoder that provides the base level to be upgraded using a firmware (e.g. software) update, where the firmware is configured to provide the enhancement level. In newer devices, both the base level and the enhancement level may be provided in hardware and/or a combination of hardware and software.

The encoder topology at a general level is as follows. The encoder 300 comprises an input I for receiving an input signal 30. The input signal 30 may comprise an input video signal, where the encoder is applied on a frame-by-frame basis. The input I is connected to a down-sampler 305D and processing block 300-2. The down-sampler 305D may correspond to the downsampling component 105 of FIG. 1 and the processing block 300-2 may correspond to the second encoder 121 of FIG. 1, The down-sampler 305D outputs to a base codec 320 at the base level of the encoder 300. The base codec 320 may implement the base encoder 113 and the base decoder 114 of FIG. 1. The down-sampler 305D also outputs to processing block 300-1. The processing block 300-1 may correspond to the first encoder 115 of FIG. 1. Processing block 300-1 passes an output to an up-sampler 305U, which in turn outputs to the processing block 300-2. The upsampler 305U may correspond to the upsampling component 117 of FIG. 1. Each of the processing blocks 300-2 and 300-1 comprise one or more of the following modules: a transform block 310, a quantization block 320, an entropy encoding block 330 and a residual processing block 350. The residual block 350 may occur prior to the transform block 310 and/or control residual processing in the processing blocks 300. The order of processing may be as set out in the Figures.

The input signal 30, such as in this example a full (or highest) resolution video, is processed by the encoder 300 to generate various encoded streams. A base encoded stream is produced by feeding the base codec 320 (e.g., AVC, HEVC, or any other codec) at the base level with a down-sampled version of the input video 30, using the down-sampler 305D. The base encoded stream may comprise the output of a base encoder of the base codec 320. A first encoded stream (an encoded level 1 stream) is created by reconstructing the encoded base stream to create a base reconstruction, and then taking the difference between the base reconstruction and the down-sampled version of the input video 30. Reconstructing the encoded base stream may comprise receiving a decoded base stream from the base codec (i.e. the input to processing block 300-1 comprises a base decoded stream as shown in FIG. 1). The difference signal is then processed at block 300-1 to create the encoded level 1 stream. Block 300-1 comprises a transform block 310-1, a quantization block 320-1 and an entropy encoding block 330-1. A second encoded stream (an encoded level 2 stream) is created by up-sampling a corrected version of the base reconstruction, using the up-sampler 305U, and taking the difference between the corrected version of the base reconstruction and the input signal 30. This difference signal is then processed at block 300-2 to create the encoded level 2 stream. Block 300-2 comprises a transform block 310-2, a quantization block 320-2, an entropy encoding block 330-2 and a residual processing block 350-2. As per processing block 300-1, the blocks may be performed in the order shown in the Figures (e.g. residual processing followed by transformation followed by quantization followed by entropy encoding).

A quantization scheme may be useful to create the residual signals into quanta, so that certain variables can assume only certain discrete magnitudes. In one case quantizing comprises actioning a division by a pre-determined step-width. This may be applied at both levels (1 and 2). For example, quantizing at block 320 may comprise dividing transformed residual values by a step-width (e.g. where an integer quotient is used to generate the quantized value and a remainder is ignored). The step-width may be pre-determined, e.g. selected based on a desired level of quantization. In one case, division by a step-width may be converted to a multiplication by an inverse step-width, which may be more efficiently implemented in hardware. In this case, de-quantizing, such as at block 320, may comprise multiplying by the step-width. Entropy encoding as described herein may comprise run length encoding (RLE), then processing the encoded output is processed using a Huffman encoder. In certain cases, only one of these schemes may be used when entropy encoding is desirable.

The encoded base stream may be referred to as the base level stream.

As described earlier, residuals are computed by comparing an original form of an image signal with a reconstructed form of an image signal. For example, in one case, residuals for an L-2 enhancement stream are determined by subtracting an output of the upsampling from an original form of an image signal (e.g. the input video as indicated in the Figures). The input to the upsampling may be said to be a reconstruction of a signal following a simulated decoding. In another case, residuals for an L-1 enhancement stream are determined by subtracting an image stream output by the base decoder from a downsampled form of the original image signal (e.g. the output of the downsampling).

Figure 4:
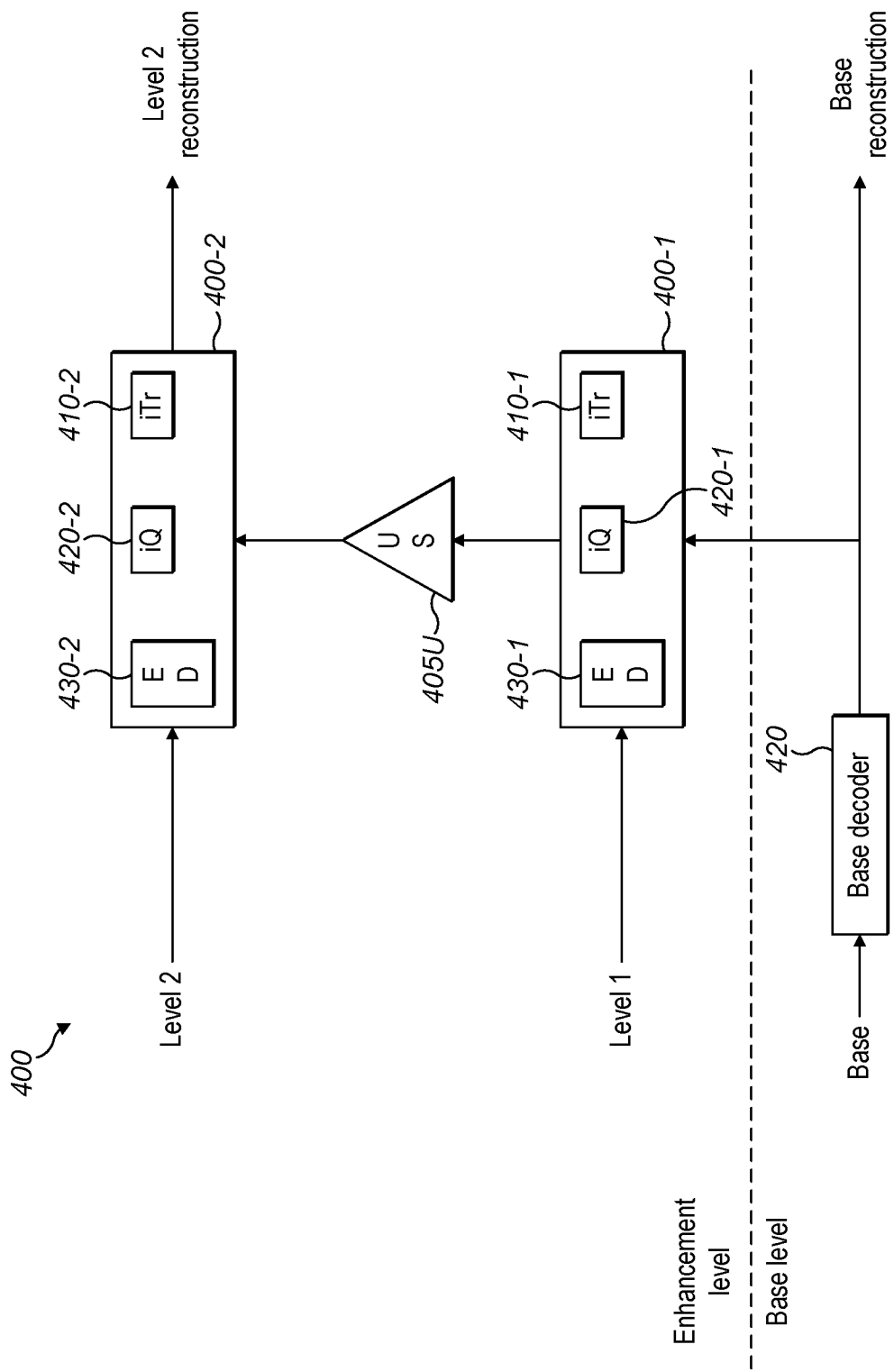
FIG. 4 shows a high-level schematic of a decoding process and specific decoding steps.

A decoder 400 that performs a decoding process corresponding to the encoder of FIG. 3 is depicted in the block diagram of FIG. 4. The decoding process is split into two halves as shown by the dashed line. Below the dashed line is the base level of the decoder 400, which may usefully be implemented in hardware. Above the dashed line is the enhancement level, which may usefully be implemented in software. The decoder 400 may comprise only the enhancement level processes, or a combination of the base level processes and enhancement level processes as needed. The decoder 400 may usefully be implemented in software, especially at the enhancement level, and may suitably sit over legacy decoding technology, particularly legacy hardware technology. By legacy technology, it is meant older technology previously developed and sold which is already in the marketplace, and which would be inconvenient and/or expensive to replace, and which may still serve a purpose for decoding signals. In other cases, the base level may comprise any existing and/or future video encoding tool or technology.

The decoder topology at a general level is as follows. The decoder 400 comprises an input (not shown) for receiving one or more input signals comprising the encoded base stream, the encoded level 1 stream, and the encoded level 2 stream together with optional headers containing further decoding information. The decoder 400 comprises a base decoder 420 at the base level, and processing blocks 400-1 and 400-2 at the enhancement level. An up-sampler 405U is also provided between the processing blocks 400-1 and 400-2 to provide processing block 400-2 with an up-sampled version of a signal output by processing block 400-1. The base decoder 420 may correspond to the base decoder 210 of FIG. 2, the processing block 400-1 may correspond to the first decoder 211 of FIG. 2, the processing block 400-2 may correspond to the second decoder 214 of FIG. 2 and the upsampler 405U may correspond to the upsampler 213 of FIG. 2.

The decoder 400 receives the one or more input signals and directs the three streams generated by the encoder 300. The encoded base stream is directed to and decoded by the base decoder 420, which corresponds to the base codec 420 used in the encoder 300, and which acts to reverse the encoding process at the base level. The encoded level 1 stream is processed by block 400-1 of decoder 400 to recreate the first set of residuals created by encoder 300. Block 400-1 corresponds to the processing block 300-1 in encoder 300, and at a basic level acts to reverse or substantially reverse the processing of block 300-1. The output of the base decoder 420 is combined with the first set of residuals obtained from the encoded level 1 stream. The combined signal is up-sampled by up-sampler 405U. The encoded level 2 stream is processed by block 400-2 to recreate the further residuals created by the encoder 300. Block 400-2 corresponds to the processing block 300-2 of the encoder 300, and at a basic level acts to reverse or substantially reverse the processing of block 300-2. The up-sampled signal from up-sampler 405U is combined with the further residuals obtained from the encoded level 2 stream to create a level 2 reconstruction of the input signal 30. The output of the processing block 400-2 may be seen as decoded video similar to the decoded video 250 of FIG. 2.

As noted above, the enhancement stream may comprise two streams, namely the encoded level 1 stream (a first level of enhancement) and the encoded level 2 stream (a second level of enhancement). The encoded level 1 stream provides a set of correction data which can be combined with a decoded version of the base stream to generate a corrected picture.

Figure 5:
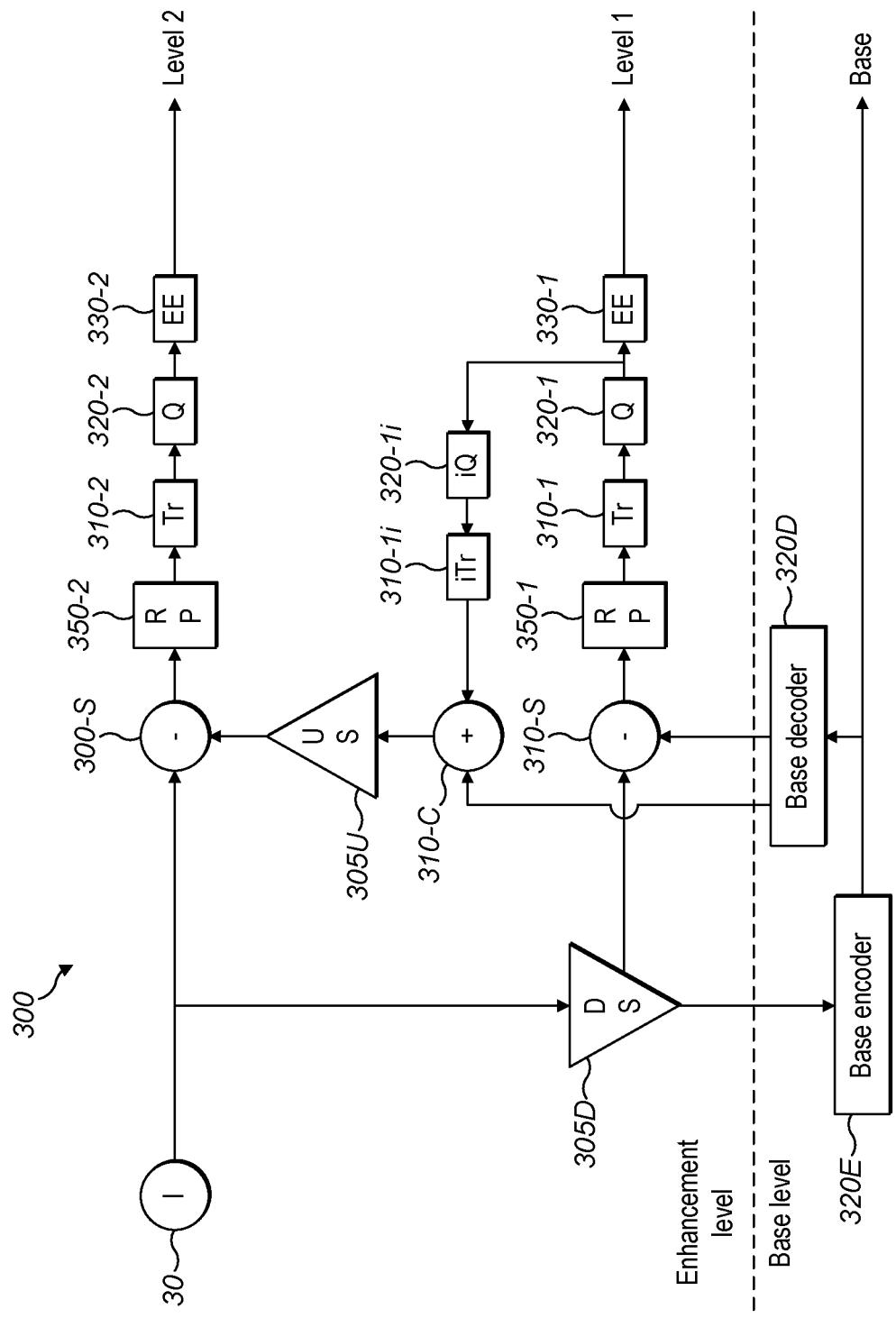
FIG. 5 shows a high-level schematic of an encoding process.

FIG. 5 shows the encoder 300 of FIG. 1 in more detail. The encoded base stream is created directly by the base encoder 320E, and may be quantized and entropy encoded as necessary. In certain cases, these latter processes may be performed as part of the encoding by the base encoder 320E. To generate the encoded level 1 stream, the encoded base stream is decoded at the encoder 300 (i.e. a decoding operation is applied at base decoding block 320D to the encoded base stream). The base decoding block 320D is shown as part of the base level of the encoder 300 and is shown separate from the corresponding base encoding block 320E. For example, the base decoder 320D may be a decoding component that complements an encoding component in the form of the base encoder 320E with a base codec. In other examples, the base decoding block 320D may instead be part of the enhancement level and in particular may be part of processing block 300-1.

Returning to FIG. 5, a difference between the decoded base stream output from the base decoding block 320D and the down-sampled input video is created (i.e. a subtraction operation 310-S is applied to the down-sampled input video and the decoded base stream to generate a first set of residuals). Here the term residuals is used in the same manner as that known in the art; that is, residuals represent the error or differences between a reference signal or frame and a desired signal or frame. Here the reference signal or frame is the decoded base stream and the desired signal or frame is the down-sampled input video. Thus the residuals used in the first enhancement level can be considered as a correction signal as they are able to 'correct' a future decoded base stream to be the or a closer approximation of the down-sampled input video that was used in the base encoding operation. This is useful as this can correct for quirks or other peculiarities of the base codec. These include, amongst others, motion compensation algorithms applied by the base codec, quantization and entropy encoding applied by the base codec, and block adjustments applied by the base codec.

The components of block 300-1 in FIG. 3 are shown in more detail in FIG. 5. In particular, the first set of residuals are transformed, quantized and entropy encoded to produce the encoded level 1 stream. In FIG. 5, a transform operation 310-1 is applied to the first set of residuals; a quantization operation 320-1 is applied to the transformed set of residuals to generate a set of quantized residuals; and, an entropy encoding operation 330-1 is applied to the quantized set of residuals to generate the encoded level 1 stream at the first level of enhancement. However, it should be noted that in other examples only the quantization step 320-1 may be performed, or only the transform step 310-1. Entropy encoding may not be used, or may optionally be used in addition to one or both of the transform step 110-1 and quantization step 320-1. The entropy encoding operation can be any suitable type of entropy encoding, such as a Huffman encoding operation or a run-length encoding (RLE) operation, or a combination of both a Huffman encoding operation and a RLE operation.

The selection of entropy coding schemes such as these may, in combination with the described quantization, have an advantageous effect upon the coding performance. This may be understood in view of the tendency for the application of a high degree of quantization to residual data as described in this disclosure to result in a high proportion of zero values. Run length encoding as mentioned above is particularly suited to the encoding of data having such a distribution, and thus these approaches can synergistically improve the efficiency of the overall process. Likewise, for embodiments wherein quantization is applied with greater step-width values, and the distribution of quantized data is such that a plurality of integer values are present in relatively greater numbers, the efficiency of the encoding process would typically benefit from the use of prefix/Huffman encoding, which is particularly suited to such distributions. This is especially the case given the distributions of residuals wherein higher integer values have lower frequencies. These forms of distributions may be efficiently encoded with Huffman encoding, which works by allotting fewer bits to high-frequency symbols. In this way, the quantization and the entropy encoding operation are complementary.

As noted above, the enhancement stream may comprise the encoded level 1 stream (the first level of enhancement) and the encoded level 2 stream (the second level of enhancement). The first level of enhancement may be considered to enable a corrected video at a base level, that is, for example to correct for encoder and/or decoder artefacts. The second level of enhancement may be considered to be a further level of enhancement that is usable to convert the corrected video to the original input video or a close approximation thereto (e.g. to add detail or sharpness). For example, the second level of enhancement may add fine detail that is lost during the downsampling and/or help correct from errors that are introduced by one or more of the transform operation 310-1 and the quantization operation 320-1.

Referring to FIG. 3 and FIG. 5, to generate the encoded level 2 stream, a further level of enhancement information is created by producing and encoding a further set of residuals at block 300-2. The further set of residuals are the difference between an up-sampled version (via up-sampler 305U) of a corrected version of the decoded base stream (the reference signal or frame), and the input signal 30 (the desired signal or frame).

To achieve a reconstruction of the corrected version of the decoded base stream as would be generated at the decoder 400, at least some of the processing steps of block 300-1 are reversed to mimic the processes of the decoder 200, and to account for at least some losses and quirks of the transform and quantization processes. To this end, block 300-1 comprises an inverse quantize block 320-1$i$ and an inverse transform block 310-1$i$. The quantized first set of residuals are inversely quantized at inverse quantize block 320-1$i$ and are inversely transformed at inverse transform block 310-1$i$ in the encoder 100 to regenerate a decoder-side version of the first set of residuals.

The decoded base stream from decoder 320D is combined with this improved decoder-side version of the first set of residuals (i.e. a summing operation 310-C is performed on the decoded base stream and the decoder-side version of the first set of residuals). Summing operation 310-C generates a reconstruction of the down-sampled version of the input video as would be generated in all likelihood at the decoder—i.e. a reconstructed base codec video). As illustrated in FIG. 3 and FIG. 5, the reconstructed base codec video is then up-sampled by up-sampler 305U.

The up-sampled signal (i.e. reference signal or frame) is then compared to the input signal 30 (i.e. desired signal or frame) to create a second set of residuals (i.e. a difference operation 300-S is applied to the up-sampled re-created stream to generate a further set of residuals). The second set of residuals are then processed at block 300-2 to become the encoded level 2 stream (i.e. an encoding operation is then applied to the further or second set of residuals to generate the encoded further or second enhancement stream).

In particular, the second set of residuals are transformed (i.e. a transform operation 310-2 is performed on the further set of residuals to generate a further transformed set of residuals). The transformed residuals are then quantized and entropy encoded in the manner described above in relation to the first set of residuals (i.e. a quantization operation 320-2 is applied to the transformed set of residuals to generate a further set of quantized residuals; and, an entropy encoding operation 320-2 is applied to the quantized further set of residuals to generate the encoded level 2 stream containing the further level of enhancement information). However, only the quantization step 20-1 may be performed, or only the transform and quantization step. Entropy encoding may optionally be used in addition. Preferably, the entropy encoding operation may be a Huffman encoding operation or a run-length encoding (RLE) operation, or both.

Thus, as illustrated in FIGS. 3 and 5 and described above, the output of the encoding process is a base stream at a base level, and one or more enhancement streams at an enhancement level which preferably comprises a first level of enhancement and a further level of enhancement. As discussed with reference to previous examples, the operations of FIG. 5 may be applied in parallel to coding units or blocks of a colour component of a frame as there are no inter-block dependencies. The encoding of each colour component within a set of colour components may also be performed in parallel (e.g. such that the operations of FIG. 5 are duplicated according to (number of frames)*(number of colour components)*(number of coding units per frame)). It should also be noted that different colour components may have a different number of coding units per frame, e.g. a luma (e.g. Y) component may be processed at a higher resolution than a set of chroma (e.g. U or V) components as human vision may detect lightness changes more than colour changes.

Figure 6:
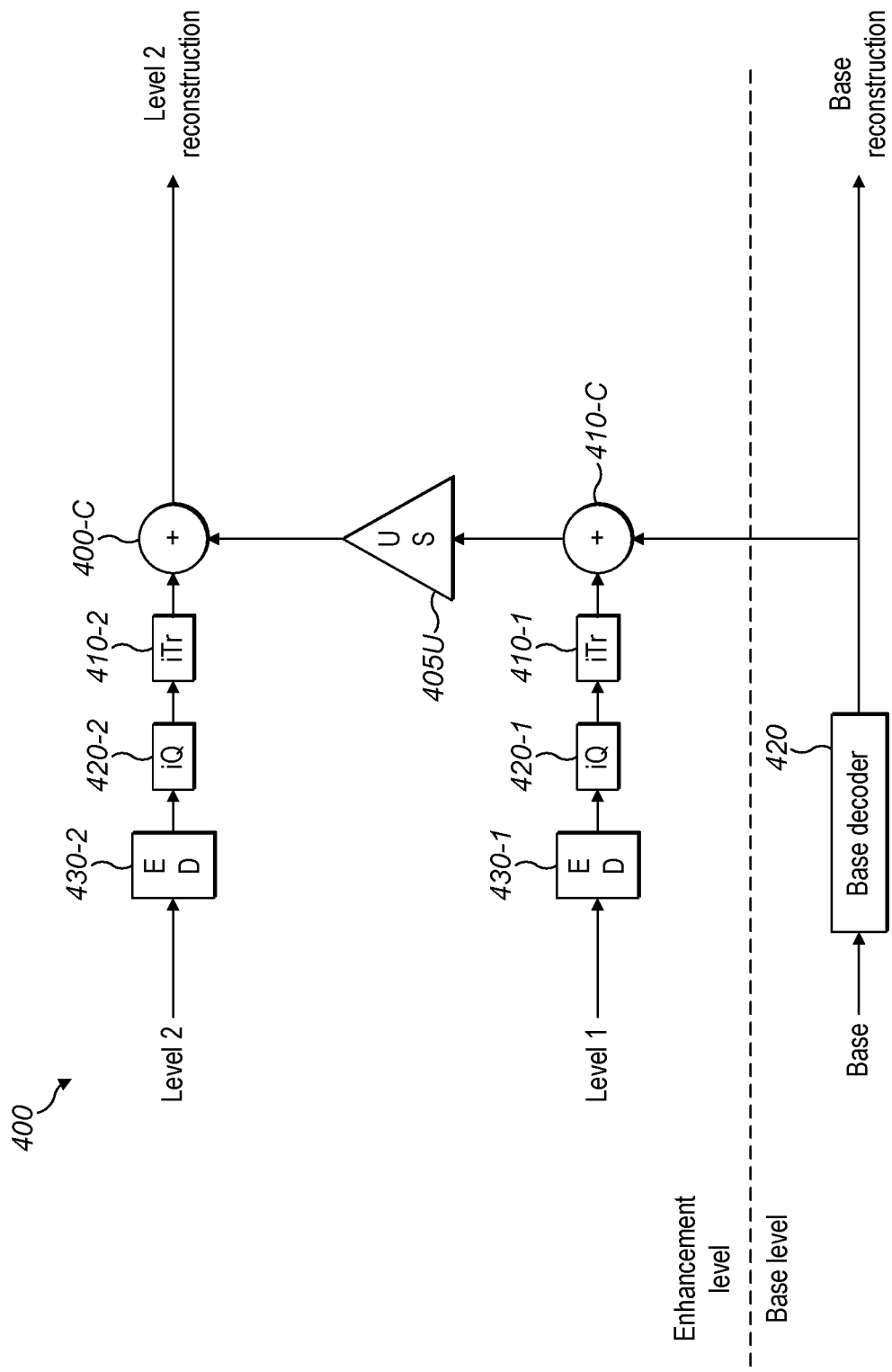
FIG. 6 shows a high-level schematic of a further decoding process.

The encoded base stream and one or more enhancement streams are received at the decoder 400. FIG. 6 shows the decoder of FIG. 4 in more detail.

The encoded base stream is decoded at base decoder 420 in order to produce a base reconstruction of the input signal 30 received at encoder 300. This base reconstruction may be used in practice to provide a viewable rendition of the signal 30 at the lower quality level. However, the primary purpose of this base reconstruction signal is to provide a base for a higher quality rendition of the input signal 30. To this end, the decoded base stream is provided to processing block 400-1. Processing block 400-1 also receives encoded level 1 stream and reverses any encoding, quantization and transforming that has been applied by the encoder 300. Block 400-1 comprises an entropy decoding process 430-1, an inverse quantization process 420-1, and an inverse transform process 410-1. Optionally, only one or more of these steps may be performed depending on the operations carried out at corresponding block 300-1 at the encoder. By performing these corresponding steps, a decoded level 1 stream comprising the first set of residuals is made available at the decoder 400. The first set of residuals is combined with the decoded base stream from base decoder 420 (i.e. a summing operation 410-C is performed on a decoded base stream and the decoded first set of residuals to generate a reconstruction of the down-sampled version of the input video—i.e. the reconstructed base codec video). As illustrated in FIG. 4 and FIG. 6, the reconstructed base codec video is then up-sampled by up-sampler 405U.

Additionally, and optionally in parallel, the encoded level 2 stream is processed at block 400-2 of FIG. 2 in order to produce a decoded further set of residuals. Similar to processing block 300-2, processing block 400-2 comprises an entropy decoding process 430-2, an inverse quantization process 420-2 and an inverse transform process 410-2. Of course, these operations will correspond to those performed at block 300-2 in encoder 300, and one or more of these steps may be omitted as necessary. Block 400-2 produces a decoded level 2 stream comprising the further set of residuals and these are summed at operation 400-C with the output from the up-sampler 405U in order to create a level 2 reconstruction of the input signal 30. The level 2 reconstruction may be viewed as an output decoded video such as 250 in FIG. 2. In certain examples, it may also be possible to obtain and view the reconstructed video that is passed to the upsampler 405U—this will have a first level of enhancement but may be at a lower resolution than the level 2 reconstruction.

Thus, as illustrated and described above, the output of the decoding process is an (optional) base reconstruction, and an original signal reconstruction at a higher level. This example is particularly well-suited to creating encoded and decoded video at different frame resolutions. For example, the input signal 30 may be an HD video signal comprising frames at 1920×1080 resolution. In certain cases, the base reconstruction and the level 2 reconstruction may both be used by a display device. For example, in cases of network traffic, the level 2 stream may be disrupted more than the level 1 and base streams (as it may contain up to 4× the amount of data where downsampling reduces the dimensionality in each direction by 2). In this case, when traffic occurs the display device may revert to displaying the base reconstruction while the level 2 stream is disrupted (e.g. while a level 2 reconstruction is unavailable), and then return to displaying the level 2 reconstruction when network conditions improve. A similar approach may be applied when a decoding device suffers from resource constraints, e.g. a set-top box performing a systems update may have an operation base decoder 220 to output the base reconstruction but may not have processing capacity to compute the level 2 reconstruction.

The encoding arrangement also enables video distributors to distribute video to a set of heterogeneous devices; those with just a base decoder 220 view the base reconstruction, whereas those with the enhancement level may view a higher-quality level 2 reconstruction. In comparative cases, two full video streams at separate resolutions were required to service both sets of devices. As the level 2 and level 1 enhancement streams encode residual data, the level 2 and level 1 enhancement streams may be more efficiently encoded, e.g. distributions of residual data typically have much of their mass around 0 (i.e. where there is no difference) and typically take on a small range of values about 0. This may be particularly the case following quantization. In contrast, full video streams at different resolutions will have different distributions with a non-zero mean or median that require a higher bit rate for transmission to the decoder.

In certain examples, residuals may be considered to be errors or differences at a particular level of quality or resolution. In described examples, there are two levels of quality or resolutions and thus two sets of residuals (L-1 and L-2). Each set of residuals described herein models a different form of error or difference. The L-1 residuals, for example, typically correct for the characteristics of the base encoder, e.g. correct artefacts that are introduced by the base encoder as part of the encoding process. In contrast, the L-2 residuals, for example, typically correct complex effects introduced by the shifting in the levels of quality and differences introduced by the L-1 correction (e.g. artefacts generated over a wider spatial scale, such as areas of 4 or 16 pixels, by the L-1 encoding pipeline). This means it is not obvious that operations performed on one set of residuals will necessarily provide the same effect for another set of residuals, e.g. each set of residuals may have different statistical patterns and sets of correlations.

In the examples described herein residuals are encoded by an encoding pipeline. This may include transformation, quantization and entropy encoding operations.

It may also include residual ranking, weighting and filtering. These pipelines are shown in FIGS. 1 and 3A and 3B. Residuals are then transmitted to a decoder, e.g. as L-1 and L-2 enhancement streams, which may be combined with a base stream as a hybrid stream (or transmitted separately). In one case, a bit rate is set for a hybrid data stream that comprises the base stream and both enhancements streams, and then different adaptive bit rates are applied to the individual streams based on the data being processed to meet the set bit rate (e.g. high-quality video that is perceived with low levels of artefacts may be constructed by adaptively assigning a bit rate to different individual streams, even at a frame by frame level, such that constrained data may be used by the most perceptually influential individual streams, which may change as the image data changes).

The sets of residuals as described herein may be seen as sparse data, e.g. in many cases there is no difference for a given pixel or area and the resultant residual value is zero. When looking at the distribution of residuals much of the probability mass is allocated to small residual values located near zero—e.g. for certain videos values of −2, −1, 0, 1, 2 etc. occur the most frequently. In certain cases, the distribution of residual values is symmetric or near symmetric about 0. In certain test video cases, the distribution of residual values was found to take a shape similar to logarithmic or exponential distributions (e.g. symmetrically or near symmetrically) about 0. The exact distribution of residual values may depend on the content of the input video stream.

Residuals may be treated as a two-dimensional image in themselves, e.g. a delta image of differences. Seen in this manner the sparsity of the data may be seen to relate features like "dots", small "lines", "edges", "corners", etc. that are visible in the residual images. It has been found that these features are typically not fully correlated (e.g. in space and/or in time). They have characteristics that differ from the characteristics of the image data they are derived from (e.g. pixel characteristics of the original video signal).

As the characteristics of residuals differ from the characteristics of the image data they are derived from it is generally not possible to apply standard encoding approaches, e.g. such as those found in traditional Moving Picture Experts Group (MPEG) encoding and decoding standards. For example, many comparative schemes use large transforms (e.g. transforms of large areas of pixels in a normal video frame). Due to the characteristics of residuals, e.g. as described above, it would be very inefficient to use these comparative large transforms on residual images. For example, it would be very hard to encode a small dot in a residual image using a large block designed for an area of a normal image.

Certain examples described herein address these issues by instead using small and simple transform kernels (e.g. 2×2 or 4×4 kernels—the Directional Decomposition and the Directional Decomposition Squared—as presented herein). The transform described herein may be applied using a Hadamard matrix (e.g. a 4×4 matrix for a flattened 2×2 coding block or a 16×16 matrix for a flattened 4×4 coding block). This moves in a different direction from comparative video encoding approaches. Applying these new approaches to blocks of residuals generates compression efficiency. For example, certain transforms generate uncorrelated coefficients (e.g. in space) that may be efficiently compressed. While correlations between coefficients may be exploited, e.g. for lines in residual images, these can lead to encoding complexity, which is difficult to implement on legacy and low-resource devices, and often generates other complex artefacts that need to be corrected. Pre-processing residuals by setting certain residual values to 0 (i.e. not forwarding these for processing) may provide a controllable and flexible way to manage bitrates and stream bandwidths, as well as resource use.

Figure 7:
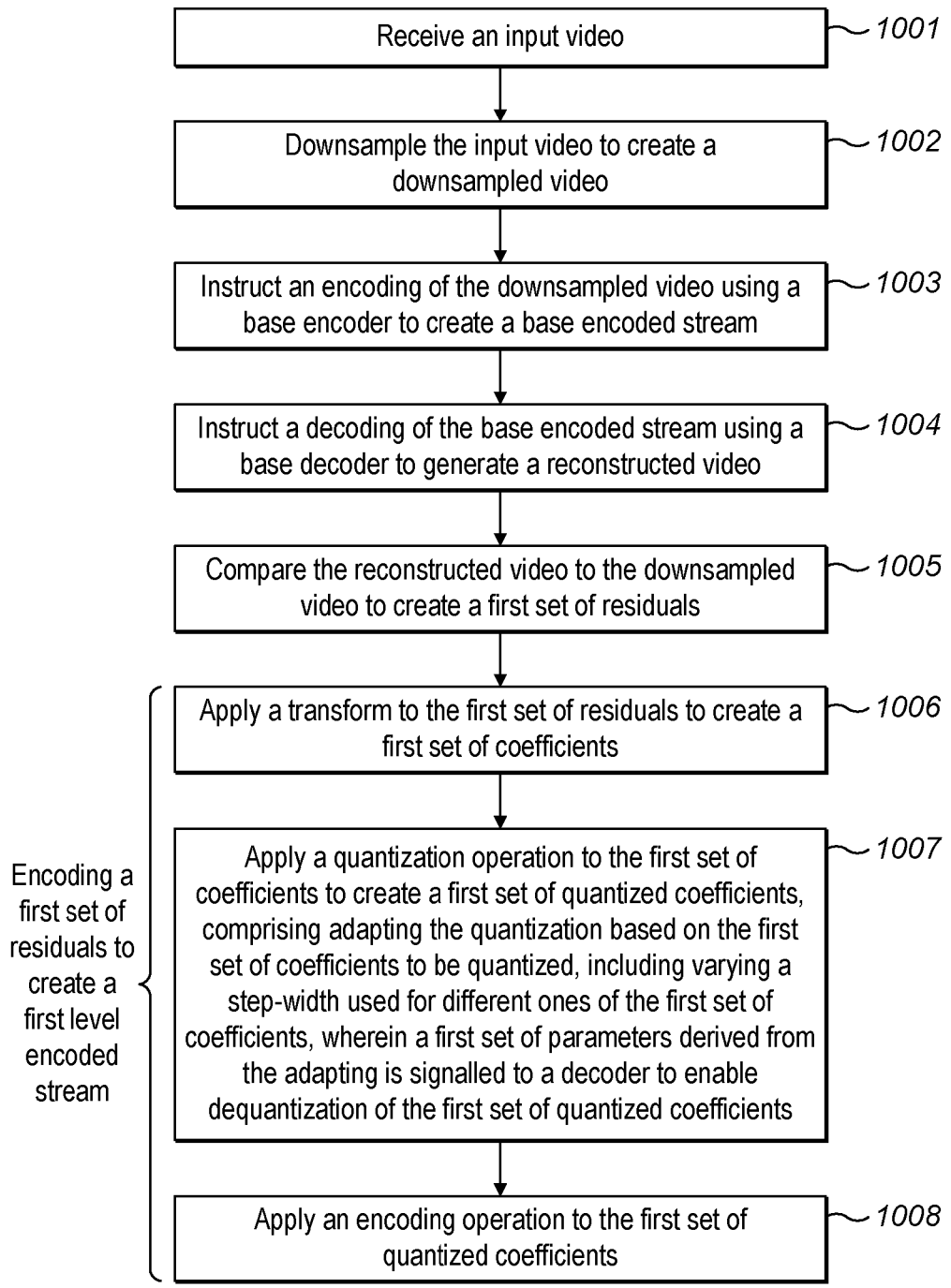
FIG. 7 shows a flowchart of concepts described herein.

For completeness, FIG. 7 illustrates a broad principle of the concept described herein in the form of a flowchart. The method 1000 includes: receiving an input video (step 1001); downsampling the input video to create a downsampled video (step 1002); instructing an encoding of the downsampled video using a base encoder to create a base encoded stream (step 1003); instructing a decoding of the base encoded stream using a base decoder to generate a reconstructed video (step 1004); comparing the reconstructed video to the downsampled video to create a first set of residuals (step 1005); and, encoding the first set of residuals to create a first level encoded stream, including: applying a transform to the first set of residuals to create a first set of coefficients (step 1006); applying a quantization operation to the first set of coefficients to create a first set of quantized coefficients (step 1007); and applying an encoding operation to the first set of quantized coefficients (step 1008), wherein applying the quantization operation comprises: adapting the quantization based on the first set of coefficients to be quantized, including varying a step-width used for different ones of the first set of coefficients, wherein a first set of parameters derived from the adapting is signalled to a decoder to enable dequantization of the first set of quantized coefficients.

FIG. 8A provides an example of how quantization of residuals and/or coefficients (transformed residuals) may be performed based on bins having a defined step width. The x-axis of FIG. 8A represents residual or coefficient values. In this example a number of bins are defined with a stepwidth of 5. The stepwidth may be understood as the quantization step size, as shown in the drawings. The size of the stepwidth may be selectable, e.g. based on a parameter value. In certain cases, the size of the stepwidth may be set dynamically, e.g. based on the rate control examples described above. In FIG. 8A, the stepwidth results in bins corresponding to residual values in the ranges of 0-4, 5-9, 10-14, 15-19 (i.e. 0 to 4 including both 0 and 4). Bin widths may be configured to include or exclude end points as required. In this example, quantization is performed by replacing all values that fall into the bin with an integer value (e.g. residual values of between 0 and 4 inclusive have a quantized value of 1). In FIG. 8A, quantization may be performed by dividing by the stepwidth (e.g. 5), taking the floor of the result (i.e. the nearest integer less than a decimal for positive values) and then adding one (e.g. 3/5=0.6, floor(0.6)=0, 0+1=1; or 16/5=3.2, floor(3.2)=3, 3+1=4). Negative values may be treated in a similar way, e.g. by working on absolute values then converting to negative values following calculation (e.g. abs(−9)=9, 9/5=1.8, floor(1.8)=1, 1+1=2, 2*−1=−2). FIG. 8A shows a case of linear quantization where all bins have a common stepwidth. It should be noted that various different implementations based on this approach may be enacted, for example, a first bin may have a quantized value of 0 instead of 1, or may comprise values from 1 to 5 inclusive. FIG. 8A is simply one illustration of quantization according to bins of a given stepwidth.

FIG. 8B shows how a so-called "deadzone" (DZ) may be implemented. This may be understood as a region around the zero output value of a quantizer, that is a band containing a zero signal and having a size that may be the same as or different from the stepwidth. Thus, for this band of inputs that are close to zero, the signal may effectively be attenuated so that low-level signals, which may typically correspond to noise in visual data, are not allocated data unnecessarily. In FIG. 8B, residuals or coefficients with a value within a pre-defined range are set to 0. In FIG. 8B the pre-defined range is a range around a value of 0. In FIG. 8B, values that are less than 6 and greater than −6 are set to 0. The deadzone may be set as a fixed range (e.g. −6 to 6) or may be set based on the stepwidth. In one case, the deadzone may be set as a predefined multiple of the stepwidth, e.g. as a linear function of a stepwidth value. In the example of FIG. 8B the deadzone is set as 2.4*stepwidth. Hence, with a stepwidth of 5, the deadzone extends from −6 to +6. In other case, the deadzone may be set as a non-linear function of a stepwidth value.

In one case, the deadzone is set based on a dynamic stepwidth, e.g. may be adaptive. In this case, the deadzone may change as the stepwidth changes. For example, if the stepwidth were updated to be 3 instead of 5, a deadzone of 2.4*stepwidth may change from a range of −6 to +6 to a range of −3.6 to 3.6; or, if the stepwidth is updated to be 10, the deadzone may change to extend from −12 to 12. In one case, the multiplier for the stepwidth may range from between 2 and 4. In one case, the multiplier may also be adaptive, e.g. based on operating conditions such as available bit rates.

Having a deadzone may help reduce an amount of data to be transmitted over a network, e.g. help reduce a bit rate. When using a deadzone, residual or coefficient values that fall into the deadzone are effectively ignored. This approach may also help remove low levels of residual noise. Having an adaptive, rather than constant, deadzone means that smaller residual or coefficient values are not overly filtered when the stepwidth decreases (e.g. if more bandwidth is available) and that a bit rate is suitably reduce if the stepwidth is increased. The deadzone need only be enacted at the encoder, the decoder simply receives a quantized value of 0 for any residual or coefficient that falls within the deadzone.

Figure 8C:
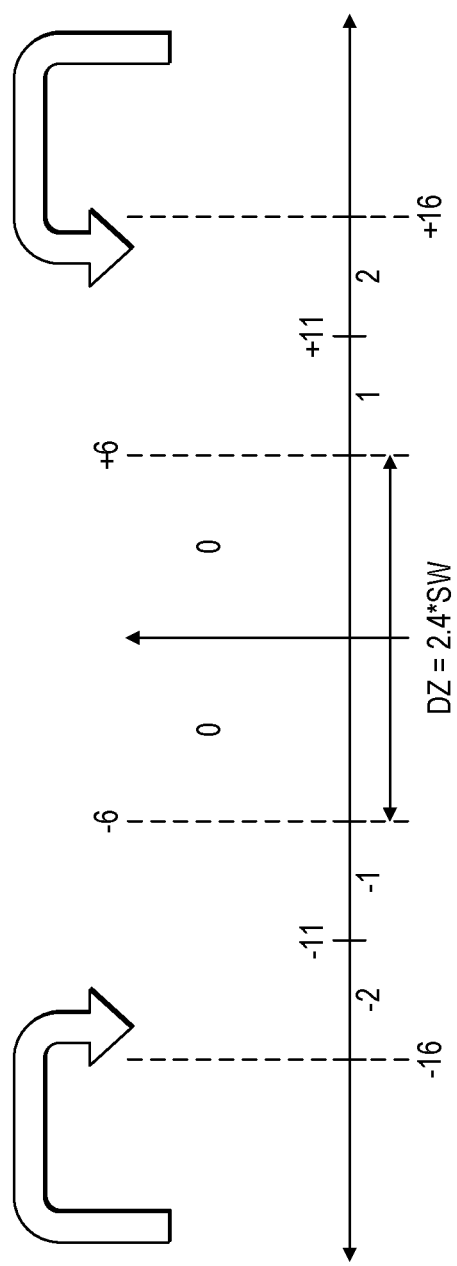

FIG. 8C shows how an approach called bin folding may be applied. In the example of FIG. 8C bin folding is used together with a deadzone, but in other cases it may be used without a deadzone and/or with other quantization approaches. In FIG. 8C, bin folding acts to place all residual or coefficient values that reside above a selected quantization bin into the selected bin. For example, this may be seen as a form of clipping, as alluded to above.

In FIG. 8C, a stepwidth of 5 is again applied. A deadzone with a range of 2.4*stepwidth is also applied, such that values between −6 and 6 are set to 0. This can also be seen as following into a larger first quantization bin (having a value of 0). Two quantization bins with a width of 5 are then defined for positive and negative values. For example, a bin with a quantization value of 1 is defined between 6 and 11 (e.g. having a stepwidth of 5), and a bin with a quantization value of 2 is defined between 11 and 16. In this example, to enact bin folding, all residual or coefficients with a value that would normally fall into a bin above the second bin (e.g. that have a value greater than 16) are "folded" into the second bin, e.g. are clipped to have a quantization value of 2. This may be performed by setting all values greater than a threshold to the maximum bin value (e.g. 2). A similar process occurs for the negative values. This is illustrated in FIG. 8C by the large arrows.

Bin folding may be a selectable processing option at the encoder. It does not need to be enacted during dequantization at the decoder (e.g. "folded" or "clipped" values of 2 are simply dequantized as if they were in the second bin). Bin folding may be enacted to reduce a number of bits that are sent over a network to the decoder. Bin folding may be configurable so as to reduce a bit rate based on network conditions and/or base stream processing.

Figure 8D:
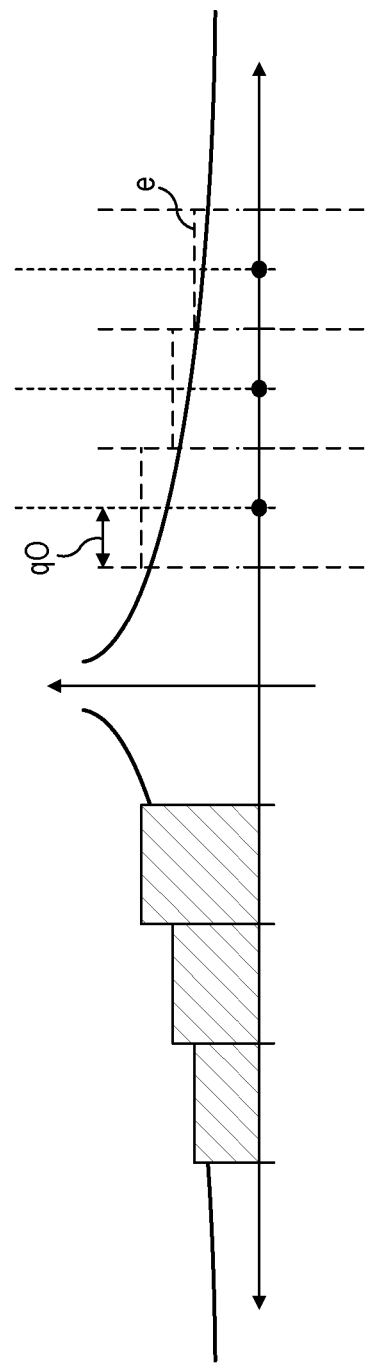

FIG. 8D shows how a quantization offset may be used in certain cases. A quantization offset may be used to shift locations of quantization bins. FIG. 8D shows a line indicating possible real world counts along the x-axis residual or coefficient value range. In this example, many values are near zero, with the count of higher values decreasing as you move away from 0. If a count value is normalised, the line may also indicate a probability distribution for residual or coefficient values.

The left-hand side bars, and the dashed lines on the right-hand side of FIG. 8D, illustrate a histogram that models quantization. For ease of explanation, count values for first to third bins following a deadzone are shown (for both positive and negative values, the latter being striped to illustrate the bars). For example, the bars show counts for quantized values of 1, 2, 3 and −1, −2, −3. Due to the quantization, the distribution modelled by the histogram differs from the actual distribution shown by the line. For example, an error—e—is shown that displays how the bar differs from the line.

To vary the properties of the error, e, a quantization offset-qO—may be applied. A quantization offset may be understood as a parameter the value of which defines whether and by what degree quantization intervals or bins are to be shifted from a predetermined or default location or set of values. For positive values, a positive quantization offset acts to shift each bin to the right and a negative quantization offset acts to shift each bin to the left. A quantization offset may be applied in combination with a deadzone. In one case, a deadzone may be applied based on a first set of thresholds, e.g. all values less than (n*stepwidth)/2 and greater than (n*stepwidth*−1)/2 are set to 0.

In some examples, the quantization offset may be signalled to the decoder for use in dequantization.

In one case, at the encoder, a quantization offset may be subtracted from a residual or coefficient value before quantization based on a stepwidth. Hence, in the decoder, a signalled offset may added to a received quantized value for dequantization based on a stepwidth. In certain cases, the offset may be adjusted based on a sign of the residual or coefficient to allow for symmetrical operations about a 0 value. In one case, use of an offset may be disabled by setting a quantization or dequantization offset value to 0. In one case, an applied quantization offset may be adjusted based on a defined deadzone width. In one case, a deadzone width may be computed at the decoder, e.g. as a function of stepwidth and quantization parameters received from the encoder.

In one case, a stepwidth for quantization may be varied for different coefficients within a 2×2 or 4×4 block of coefficients. For example, a smaller stepwidth may be assigned to coefficients that are experimentally determined to more heavily influence perception of a decoded signal, e.g. in a 2×2 or 4×4 Directional Decomposition (DD-Squared or "DDS") as described above A, H, V and D coefficients may be assigned smaller stepwidths with later coefficients being assigned larger stepwidths. In this case, a base_stepwidth parameter may be defined that sets a default stepwidth and then a modifier may be applied to this to compute a modified_stepwidth to use in quantization (and de-quantization), e.g. modified_stepwidth=base_stepwidth*modifier (where "modifier" may be set based on a particular coefficient within a block or unit and may be derived from signalling such as the variable "qm" described below).

In certain cases, the modifier may also, or alternatively, be dependent on a level of enhancement. For example, a stepwidth may be smaller for the level 1 enhancement stream as it may influence multiple reconstructed pixels at a higher level of quality.

In certain cases, modifiers may be defined based on both a coefficient within a block and a level of enhancement. In one case, a quantization matrix may be defined with a set of modifiers for different coefficients and different levels of enhancement. This quantization matrix may be preset (e.g. at the encoder and/or decoder), signalled between the encoder and decoder, and/or constructed dynamically at the encoder and/or decoder. For example, in the latter case, the quantization matrix may be constructed at the encoder and/or decoder as a function of other stored and/or signalled parameters, e.g. those received via a configuration interface.

In one case, different quantization modes, or different schemes defining the quantization matrix that is to be applied to a given set of coefficients, may be defined. In one mode a common quantization matrix may be used for both levels of enhancement; in another mode, separate matrices may be used for different levels; in yet another mode, a quantization matrix may be used for only one level of enhancement, e.g. just for level 2. The quantization matrix may be indexed by a position of the coefficient within the block (e.g. 0 or 1 in the x direction and 0 or 1 in the y direction for a 2×2 block, or 0 to 3 for a 4×4 block).

In one case, a base quantization matrix may be defined with a set of values. This base quantization matrix may be modified by a scaling factor that is a function of a stepwidth for one or more of the enhancement levels. In one case, a scaling factor may be a clamped function of a stepwidth variable. At the decoder, the stepwidth variable may be received from the encoder for one or more of the level-2 stream and the level-1 stream.

By way of some further examples of processes that involve the above described principles, the advantageous modes of configuring and adapting the quantization in order to improve the encoding and decoding procedures further may be understood in further view of the following. Data block unit enhancement payload semantics may be applied, involving a number of parameters with which properties of the quantization and dequantization steps can be signalled and configured.

In an example, the parameter dequant offset signalled specifies whether the value of the offset parameter to be applied when dequantizing is signalled. In this way, it may be signalled whether the offset is sent. In this example, if the offset is sent, then it is used. If it is not sent, then a default offset, or no offset may be used.

In an example of a method of encoding an input video into a plurality of encoded streams, wherein the encoded streams may be combined to reconstruct the input video, the method may involve receiving an input video, and downsampling the input video to create a downsampled video.

The method typically further includes instructing an encoding of the downsampled video using a base encoder to create a base encoded stream, the base encoded stream; instructing a decoding of the base encoded stream using a base decoder to generate a reconstructed video; comparing the reconstructed video to the downsampled video to create a first set of residuals; and, encoding the first set of residuals to create a first level encoded stream. This preferably includes: applying a transform to the set of residuals to create a set of coefficients; applying a quantization operation to the set of coefficients to create a set of quantized coefficients; and applying an encoding operation to the quantized coefficients, wherein the quantization operation is performed using a quantization matrix, the quantization matrix being derived in accordance with an obtained value of a quantization matrix mode parameter.

As described earlier in this disclosure, a quantization matrix mode parameter can be advantageously used to specify the quantization matrix to be used in the encoding process. In some examples, when the quantization matrix mode parameter value is equal to a predetermined value, for example when it is equal to zero, 0, the methods may involve using a default quantization matrix for each of two levels of quality. These levels are typically, or typically correspond to, level 1 and level 2 enhancement streams. When the quantization matrix mode parameter value is equal to 1, a first quantization matrix may be used for each of the two levels of quality, and the first quantization matrix may be signalled, for example, from the encoder to a decoder or a device to which the encoded stream is to be transmitted. When the quantization matrix mode parameter value is equal to 2, a second quantization matrix can be used for level of quality 2, and the second quantization matrix may be signalled. In this case, no quantization matrix may be used for level of quality 1, or default values may be used for this level. When the quantization matrix mode parameter value is equal to 3, a third quantization matrix is preferably used for level of quality 1, or the first level encoded stream, and the third quantization matrix is signalled. In this case, no quantization matrix may be used for level of quality 2, or default values may be used for this level. When the quantization matrix mode parameter value is equal to 4, a fourth quantization matrix may be used for the first level encoded stream and a fifth quantization matrix may be used for the second level encoded stream (e.g. two matrices may be used), each of which can be equal or unequal to each other and any of the aforementioned first to third matrices. In this fifth mode, the fourth quantization matrix and the fifth quantization matrix may be signalled to a decoder or other device to which the encoded stream is to be transmitted.

In the procedures described in this disclosure, as alluded to above, every group of transform coefficients passed to this process typically belongs to a specific plane and layer. Typically, they have been scaled using a linear quantizer which in some examples uses a non-centred dequantization offset. A scaling process for the transform coefficients may be applied as follows. The process may take location information for a block, together with a set of parameters by which properties of the block, such as its size, the properties of the quantization operation, such as step width and offset value, and the level of enhancement to which it applies, may be indicated. For instance, a location, which may be indicated with a pair of coordinate values, or for example parameters (xTbP, yTbP) specifying the top-left sample of the current luma or chroma transform block relative to the top left luma or chroma sample of the current picture may be used. This can be related to a particular portion of data representative of an image, and may for instance be related either to a luma plane or a chroma plane, depending on the plane to which the transform coefficients belong.

The aforementioned parameter specifying the size of a current transform block, which may be called nTbS in some examples, may have a value that is dependent upon the type of transform, and in particular upon the value of a parameter that defines, the transform used for decoding. This type parameter may be called transform_type in some examples, and in some applications may have a value of 0, 1, or 2-3, respectively corresponding to a 2×2 directional decomposition transform, a 4×4 directional decomposition transform, or a value or parameter specifying that the values are zero as those elements are not used in the bitstream. In some examples this transform_type parameter having a value of 0, may correspond to a number of layers being equal to 4 and if transform_type is equal to 1 the corresponding number of layers value may be 16. The size, nTbS, parameter may have a value of 2 if the transform_type is equal to zero and may have a value of 4 if transform_type is equal to 1.

A further input to the process is typically in the form of an array of entropy decoded quantized coefficients. This may be called TransCoeffQ, and be of a size related to the size parameter noted above, in particular having dimensions (nTbS)×(nTbS), i.e. the array may comprise a coding unit or block as described herein. This array may be called TransCoeffQ. The stepwidth value may be specified with a parameter called stepWidth. The index of the level of enhancement may be specified by a parameter also, and in some examples may be called idxLevel. If a dequantization offset is to be used, this may be specified with a parameter, for example called dQuantOffset. The parameter typically specifies the value of the dequantization offset parameter to be applied. This process typically results in an array of dequantized transform coefficients. This may for example be in the form of an array of dimensions (nTbS)×(nTbS) containing elements d[x][y].

The values in the output array, which may be called d[x][y], are typically derived based upon the stepwidth, as described above for example, and/or any of the index of the level of enhancement, as applied to the quantization matrix, which may be referred to as qm, and the entropy decoded quantized coefficients, which may be named TransCoeffQ [xTbP][yTbP] for the corresponding element. Additionally, the values of the output array elements may be derived by way of additionally applying an offset to the result of the aforementioned operation. For example, a parameter, which may be named appliedOffset, may be added to the value to produce the output element value.

This may therefore involve the following relation to calculate each element d of the array:

$$d[x][y]=(\text{TransCoeffQ}[xTbP][yTbP]*(\text{stepWidth}*qm[yTbP+(\text{idxLevel}*4)][xTbP]))+\text{appliedOffset}$$

In the above calculation, which is one example of how dequantization may be performed at a decoder, idxLevel may be 0 or 1 representing levels 2 and 1 respectively. In the above calculation, and as described in other examples herein, a value from the quantization matrix is selected based on a particular coefficient and a particular level of enhancement.

With regard to the offset that may be applied in some examples, as shown in the relation above, this parameter, which may be called appliedOffset, is typically derived as follows below.

In certain cases, the appliedOffset may be conditionally applied based on whether or not residual filtering is to be applied. This filtering may be applied following the inverse transformation (e.g. 410-1 in FIG. 6) and may be a deblocking filter. In these cases, an offset may only be applied if residual filtering is applied. For example, if a parameter that specifies whether deblocking filter should be applied, which may be named deblocking_signalled, has a particular value, for example is equal to 1, calculating the offset based on the aforementioned parameter specifying the dequantization offset, which may be named dQuantOffset.

The appliedOffset may also be derived from a single value of dQuantOffset and adapted for application to positive and negative coefficient values. For instance, appliedOffset may be configured as a negative or positive value, typically having the same absolute value as the dequantization offset parameter and having a positive or negative sign respectively. This may be applied if the TransCoeffQ value has a value less than zero; otherwise, if the TransCoeffQ value is greater than zero, the applied offset may be assigned a value equal to that of the dequantization offset parameter. If the TransCoeffQ value is equal to zero, then the applied offset may be assigned a zero value also.

Thus, in certain examples, the derivation of the offset that may be added to obtain the output array elements may be derived by (where TransCoeffQ may be an array, typically of size (nTbS)×(nTbS), containing entropy decoded quantized coefficients):

```
If deblocking_signalled is equal to 1
    If TransCoeffQ[ xTbP ][ yTbP ] < 0
        appliedOffset = (dQuantOffset * −1)
    else If TransCoeffQ [ xTbP ][ yTbP ] > 0
        appliedOffset = dQuantOffset
    else
        appliedOffset = 0
else
    appliedOffset = 0
```

By way of an example, a parameter or set of parameters may be signalled as described above and used to specify how the quantization matrix is to be applied to a set of coefficients. This parameter may be a quant_matrix_mode parameter, which specifies which quantization matrix to be used in the decoding process in accordance with Table 1 below. The parameter may be one byte. The quant_matrix_mode parameter may be used to configured how the quantization matrix is derived (e.g. as described later below).

There is a technical benefit that may be achieved by signalling differently and sending a default, in this way. This may be of particular importance as it can allow for repetition over a set of frames or a subset of data. For example, the method may involve signalling a matrix, and then using a default for one frame of that set. These modes can be set on a per-frame or a per-group basis, for example.

TABLE 1

Quantization matrix

| quant_matrix_mode | Value of type |
|---|---|
| 0 | Both levels of quality use default matrices |
| 1 | One matrix of modifiers is signalled and should be used on both levels of quality |
| 2 | One matrix of modifiers is signalled and should be used on level of quality 2 |
| 3 | One matrix of modifiers is signalled and should be used on level of quality 1 |
| 4 | Two matrices of modifiers are signalled - the first one for level of quality 2, the second for level of quality 1 |
| 5-7 | Reserved_zeros |

Quantization matrix data semantics may be applied according to the following specific example. A quantization matrix, which may be referred to as qm [y][x], is derived.

The matix qm may have dimensions k*M by N. That is to say, the matrix may be defined as corresponding to quantization coefficients contained in a M by N matrix, and qm may contain this data in the form of a respective M by N matrix of quantization coefficients for example, for each of k levels of enhancement.

In the present examples, two levels of enhancement are involved, namely levels 1 and 2 as described in this disclosure, and k is equal to 2. The largest transform as described in relation to these procedures is 4×4, and so M and N may each be equal to 4.

In some examples, by defining qm with M and N values that correspond to the largest available transform, which is a 4×4 transform in these examples as alluded to above, thus comprising 16 coefficients, the application of the quantization matrix where a smaller transform is employed may be performed by reading from qm, and applying, a subset of the coefficients in the respective M by N matrix.

In a specific example, if the value of the quantization matrix mode parameter is equal to zero, namely if quant matrix mode is equal to 0, then the following default quantization matrix is used in the quantization operation:

qm[y][x]=
{0.500 0.500 0.500 0.617}
{0.862 0.610 1.064 0.781}
{0.500 0.500 0.500 0.617}
{3.125 1.851 1.851 1.316}
{0.500 0.500 0.500 0.617}
{0.862 0.610 1.064 0.781}
{0.862 1.064 0.610 0.781}
{3.125 1.851 1.851 1.316},
wherein y=0 . . . 3 are coefficients to be used for the level 2 of the enhancement and y=4 . . . 7 are coefficients to be used for the level 1 of the enhancement; and if the value of the quantization matrix mode parameter is equal to 1, one matrix of modifiers is signalled is used on both levels of enhancement. A matrix may be built by way of an integrative process in some applications. Thus qm[x][y] values may be obtained row-by-row, whereby for each row, with a value in that row and for each column of the matrix is populated as the row is processed. A stepwidth modifier parameter may be used in obtaining these matrix values, as described below. In the present example, the number of rows to be populated may be 8, with the number of columns being equal to 4, as described above in connection with the matrix dimensions in this specific example. In particular, the iterative process for this example may be written as:

for (y=0; y<8; y++)
    for (x=0; x<4; x++)
        qm[y][x]=step_width_modifier_2[x+y*4], wherein stepwidth modifier parameter, which may be called step width_modifier 2 in this example, is a parameter specifying the values of level 2 enhancement 16 coefficients to be applied at the different layers of the transform coefficients; and if the value of the quantization matrix mode parameter is equal to 2, one matrix of modifiers is signalled and is used on level of enhancement 2. Likewise an iterative procedure corresponding to that described above may be used, in particular:

for (y=0; y<4; y++)
    for (x=0; x<4; x<4)
        qm[y][x]=step_width_modifier_2[x+y*4]; and if the value of the quantization matrix mode parameter is equal to 3, one matrix of modifiers is signalled and is used on level of enhancement 1:

for (y=0; y<4; y++)
  for (x=0; x<4; x<4)
    qm[y+4][x]=step_width_modifier_2[x+y*4]; and if the value of the quantization matrix mode parameter is equal to 4, two matrixes of modifiers are signalled, the first one for level of enhancement 2, the second for level of enhancement 1:

for (y=0; y<4; y++)
  for (x=0; x<4; x<4)
    qm[y][x]=step_width_modifier 2[x+y*4]
for (y=0; y<4; y++)
  for (x=0; x<4; x<4)
    qm[y][x]=step_width_modifier_1[x+y*4], wherein step_width_modifier_1 is a parameter specifying the values of level 1 enhancement 16 coefficients to be applied at the different layers of the transform coefficients.

As described above, the values of d[x][y] in the matrix may be calculated for example as the product of the respective transform coefficient at the relevant element in the matrix and a sum of the corresponding quantization matrix element value at a column identified by a product of a parameter specifying the size of a current transform block and a levelIdxSwap parameter, and in the corresponding row, and the stepwidth modifier parameter value corresponding to that element, with the above described offset typically being additively applied to that product also.

The above described dequantization process may be performed in accordance with the following ordered steps. The dequantization process as per the aforementioned examples may be invoked with the luma location (xTbY, yTbY), the transform size set equal to nTbS, namely the size of a current transform block, the array TransCoeffQ, as described above, of a size (nTbS)×(nTbS), and the step width parameter as inputs. The output may then be an array of dequantized coefficients (e.g. dequantized transformed residuals) of dimensions (nTbS)×(nTbS), which may be referred to a dequantCoeff in this example.

Adaptive Quantization Based on Temporal Information

As described herein, it is contemplated that quantization may be adapted according to temporal information. For example, a smaller quantization step may be used for static elements. This allows for a finer quantisation of a difference value to ensure that sufficient additional information is provided. If the information becomes more static, then one is able to get closer to what the value should be.

Typically, quantisation is performed irrespective of any temporal information. Typically there is one step width used for a frame but the proposed techniques allow for discrimination between intra-tile and inter-tile. According to techniques proposed herein, the temporal information and quantisation are intertwined whereas in conventional coding techniques, they are kept separate. The proposed technique can be thought of as a change in the stepwidth before quantisation is performed, the decision taken on the step-width change being in relation to temporal information.

Figure 9:
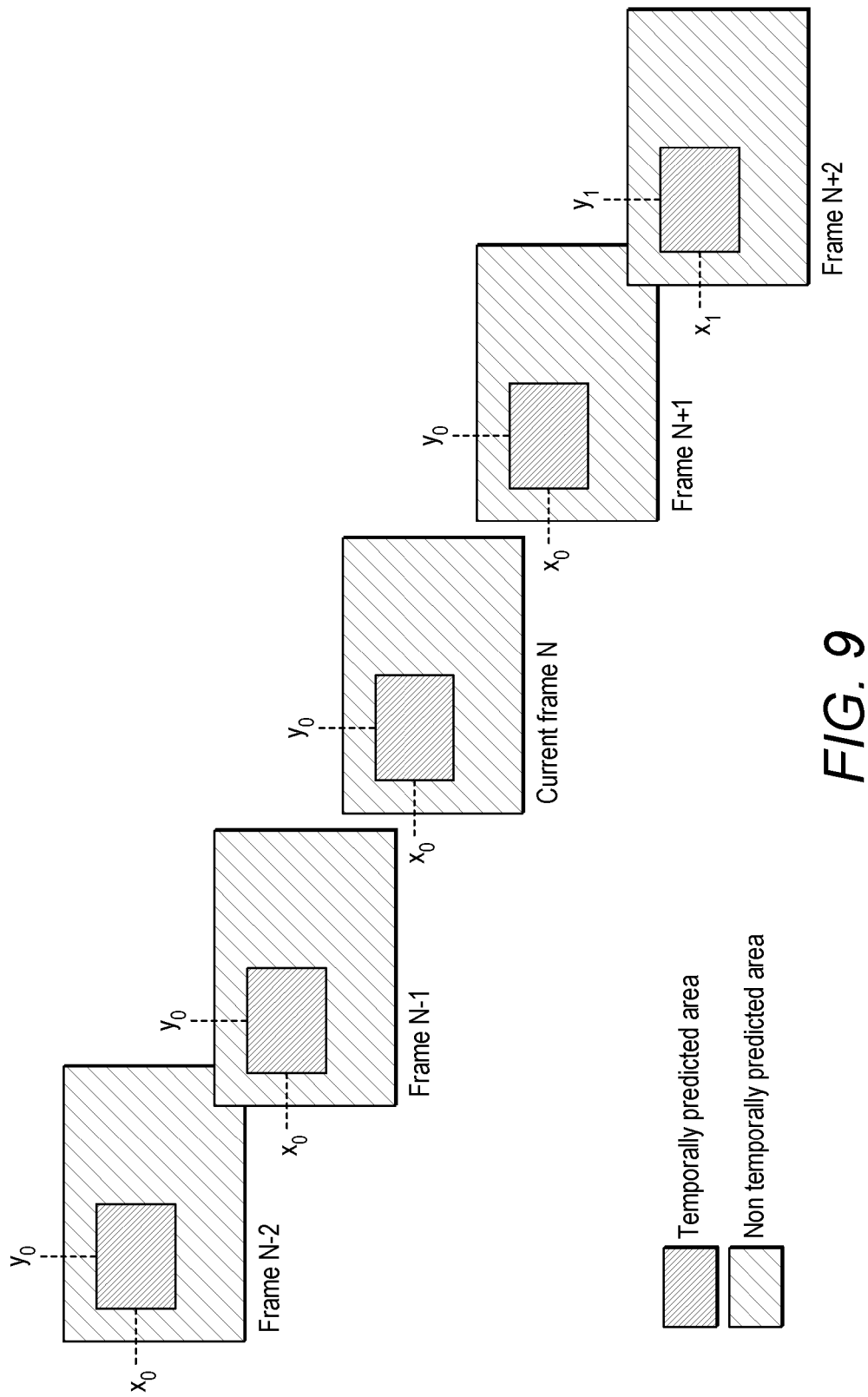
FIG. 9 an exemplary diagram of a sequence of frames in a video sequence according to a further example process.

FIG. 9 illustrates an exemplary sequence of frames in a video sequence, illustrating the use of temporal information in some example methods. In particular, the figure shows five frames in a video sequence, with two frames (frame N−2 and frame N−1) preceding the current frame N and two frames (frame N+1 and frame N+2) following the current frame N. In the example of FIG. 9 it is shown an area of the current frame (dark rectangle) which can be predicted at least in part from corresponding areas in the previous frames and/or from corresponding areas in subsequent frames. In the present example, the area remains with the same coordinates (x0 and y0) within the first four frames and moves to different coordinates (x1 and y1) in the last frame. In this example, the area can be considered to be substantially static in the first four frame, and in the last frame may be motion compensated due to relative movement of the area from frame N+1 and frame N+2. The rest of the frame (shaded areas) cannot be temporally predicted between frames.

Figure 10:
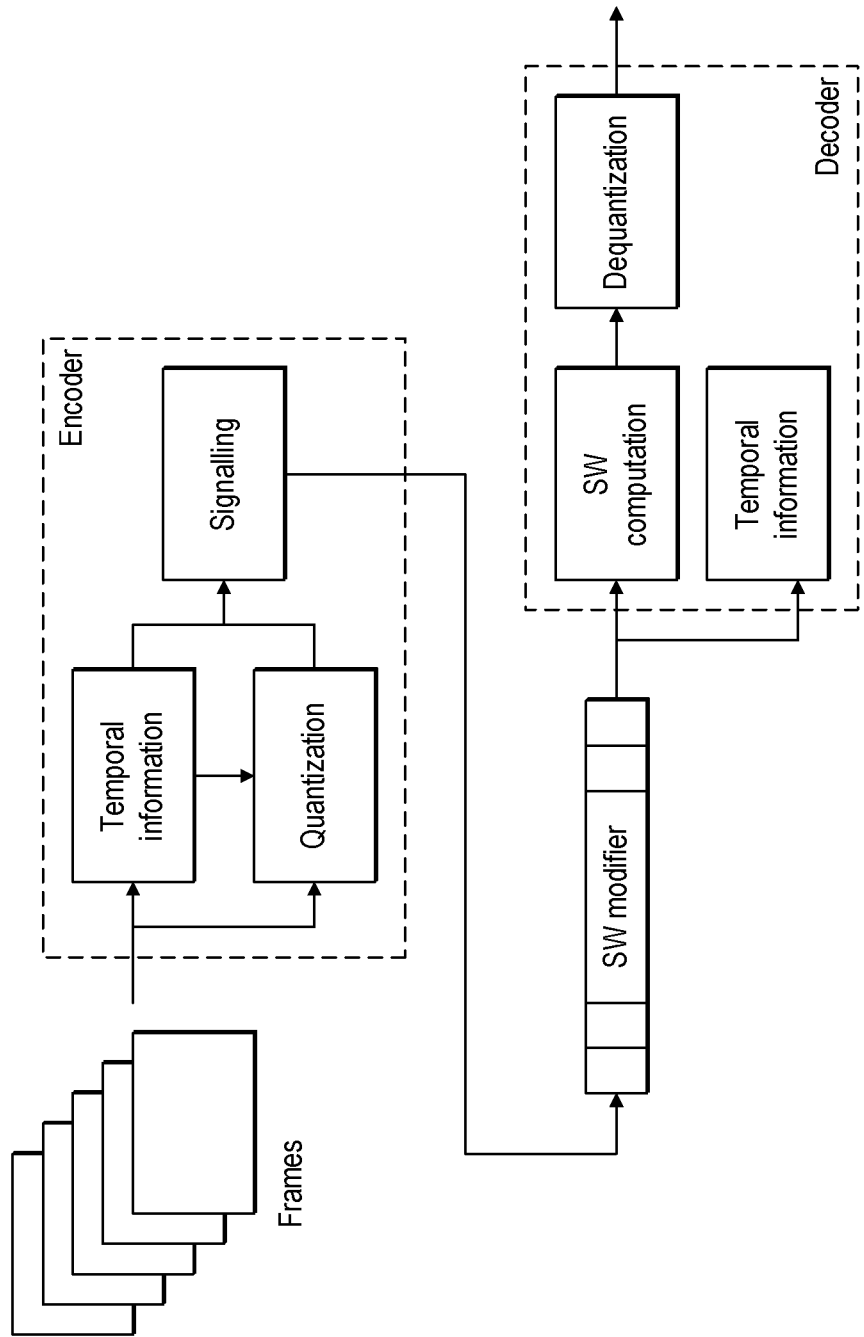
FIG. 10 shows an example encoder and decoder system.

FIG. 10 shows an example of the encoder and decoder system according to the present invention. In particular, an encoder receives a sequence formed of a number of consecutive frames and performs an analysis to derive temporal information for each frame using a temporal prediction module. This temporal information includes determining which areas of a specific frame can be predicted at least in part from one or more other frames (preceding and/or subsequent)—temporal predicted areas—and which areas of a specific frame cannot be predicted at least in part from one or more other frames (preceding and/or subsequent)—non-temporally predicted areas. This information is then used by the quantizer to determine different quantization parameters for the temporally predicted areas and the non-temporally predicted areas. The quantization parameters may be linked by a value (step-width modifier) which allows to derive from one of the quantization parameter the other quantization parameter(s). In one embodiment, the SW modifier may be a default value, in which case it may not be signalled in order to avoid unnecessary signalling. In another embodiment, the SW modifier is signalled to the decoder.

In particular, the signalling may include: one bit to indicate whether a default modifier should be used at the decoder, or whether the default modifier should be modified by a bespoke modifier. In the latter case, a further field (e.g., 8-bit field) could be signalled with the actual value of the bespoke modifier.

At the decoder, there is a module which reads the bitstream and determine the temporal information about each coding unit (e.g., transform block) and another module which reads the bitstream and determine the SW modifier is present. In particular, the temporal information module determines whether a specific coding unit is to be reconstructed based at least in part on temporal information from one or more previous and/or subsequent frames (i.e., inter coding unit to be temporally predicted) or whether is to be independently reconstructed (i.e., intra coding unit not to be temporally predicted). The step-width computation module computes the step-widths to be applied to the inter coding units and to the intra coding units. In particular, the module may first check if the bitstream signals that a different step-width modifier should be used. If the bitstream signals that a different step-width modifier should be used, the module then reads a different field within the bitstream to derive the step-width modifier to be used. If the bitstream does not signal that a different step-width modifier should be used, then a default step-width modifier shall be used. Once the correct step-width modifier has been derived, the module derive the step-width for the intra coding units (intra step-width) and the step-width for the inter coding unit (inter step-width), wherein the step-width modifier is used to derive the intra step-width from the inter step-width and/or vice versa (depending on the relationship defined between the two step-widths). The inter step-width is lower than the intra step-width. The dequantizer module would then use the above information and dequantize the inter coding unit using the inter step-width and the intra coding unit using the intra step-width.

In particular, a non-limiting embodiment of a tier-based enhancement encoder generates signalling information with respect to what areas of an echelon of residual data coefficients should be decoded based at least in part on a temporal buffer containing corresponding residual data coefficients from a previous frame.

The enhancement encoder generates echelons (e.g., layers) of residual data at subsequently higher levels of quality (e.g., resolution), each to be combined with a predicted rendition of the signal at the same level of quality in order to generate a final rendition of the signal at that level quality. When an echelon of residual data has available a temporal buffer, one or more areas (e.g., tiles) of the echelon of residual data are to be decoded based at least in part on the temporal buffer, by combining—for the areas of the picture that are signalled as temporally predicted—the corresponding values contained in the temporal buffer with the values derived from decoding the encoded data stream. Accordingly, the encoder produces signalling information to identify the portions of the echelon that must be decoded based at least in part on the temporal buffer, as well as the encoded residual data for the whole echelon (i.e., for both the portions that are temporally predicted and the portions that are not temporally predicted).

By way of non-limiting example, the embodiment described leverages the relationship:

Intra-residuals_quantization step-width=master_ quantization_ step-width*(1+step-width_modifier/255), wherein step-width_modifier is an 8-bit value optionally signalled among GOP configuration parameters, with default value 128.

For every coding unit (e.g., transform block, although could this be done on units of other sizes or on multiple coding units or multiple blocks, for example tiles) of residual data, the encoder must choose between two options:

Temporally predicted—In this case, residuals contained in the corresponding position of the temporal buffer are subtracted from the residuals prior to being transformed and quantized. The quantization processes is performed by leveraging the master step-width for the frame.

Non temporally predicted—In this case, residuals are transformed and quantized as they are. The quantization process is performed by leveraging an intra-residuals step-width, calculated from the master step-width for the frame according to the formula illustrated above.

For both options residuals are reconstructed and distortion D is calculated as a difference between the original residuals and the reconstructed residuals (i.e., post dequantization and inverse transform).

Per option we then calculate an estimated cost C:

$$C=D+lambda*R$$

Where R is a parameter estimating the Rate requirements of each option in terms of encoded bits, and lambda is a Lagrange parameter calculated as a function of the step-width (e.g., in a non-limiting embodiment, lambda=1.84* step-width).

The rationale for the above process is that if a residual in the current frame is similar to the corresponding one in the previous frame, the estimated cost C will be smaller for the temporally predicted option. At the same time, it is reasonable to expect that if an area of the picture is currently static (e.g., for the current frame the encoder selects the temporally predicted option), it may be static also in the near future, and so it will be efficient to use finer quantization for the temporally-predicted-option vs. the non temporally-predicted option.

In a non-limiting embodiment, the encoder identifies cases where it is more efficient to signal to the decoder the parameter step-width_modifier rather than using the default value.

Termporal Information in a Tiered Coding Scheme

The following describes an implementation of a temporal buffer in a tiered coding scheme, in the context of FIGS. 11-16. Only variations to the schematics and processes described above are described in the following. As will be understood the below is provided to illustrate the context of the adaptive quantization described herein to a tiered coding scheme utilising a temporal buffer.

Figure 11:
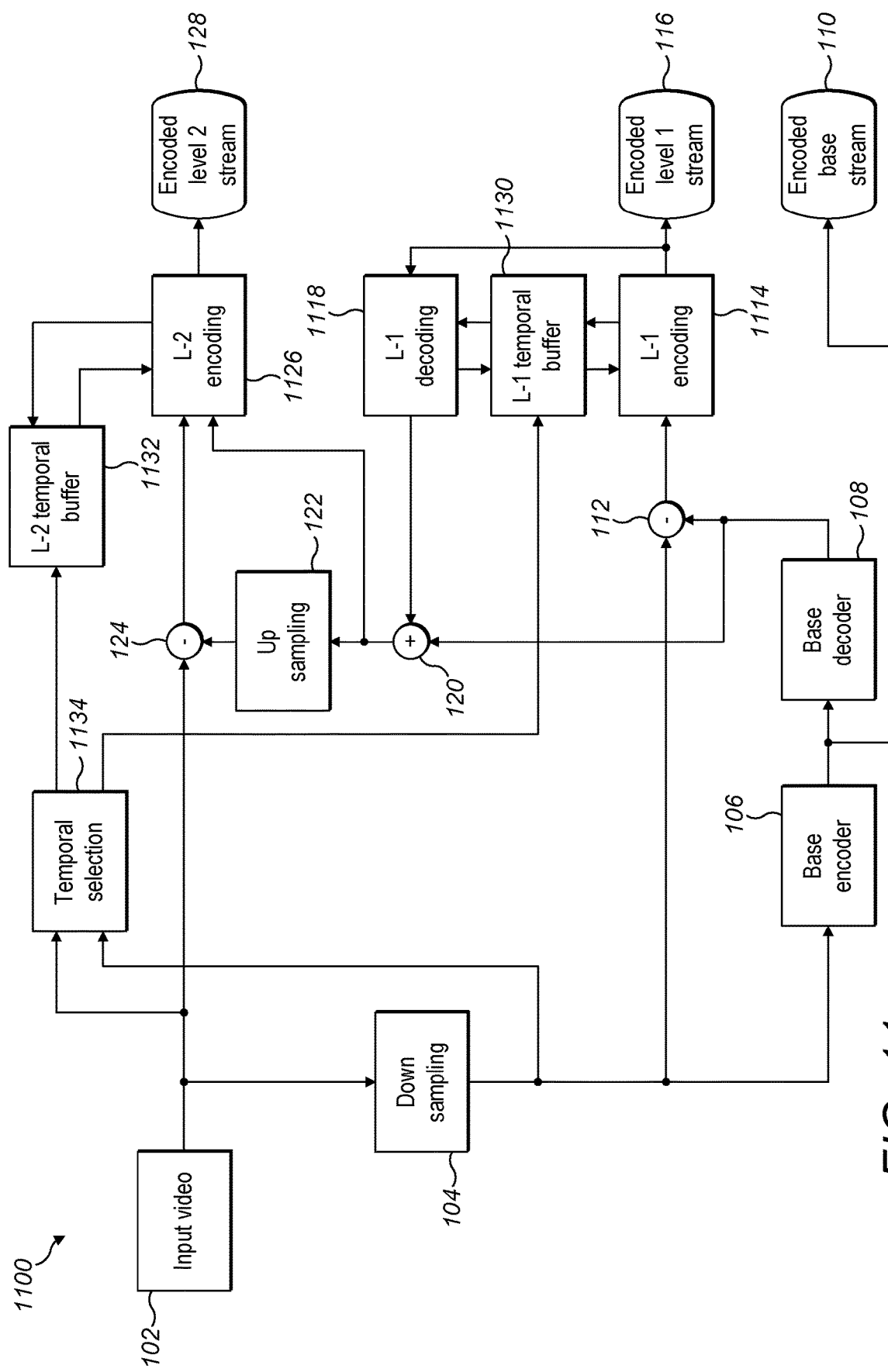
FIG. 11 is a schematic diagram illustrating an encoding process according to examples herein.
Figure 12:
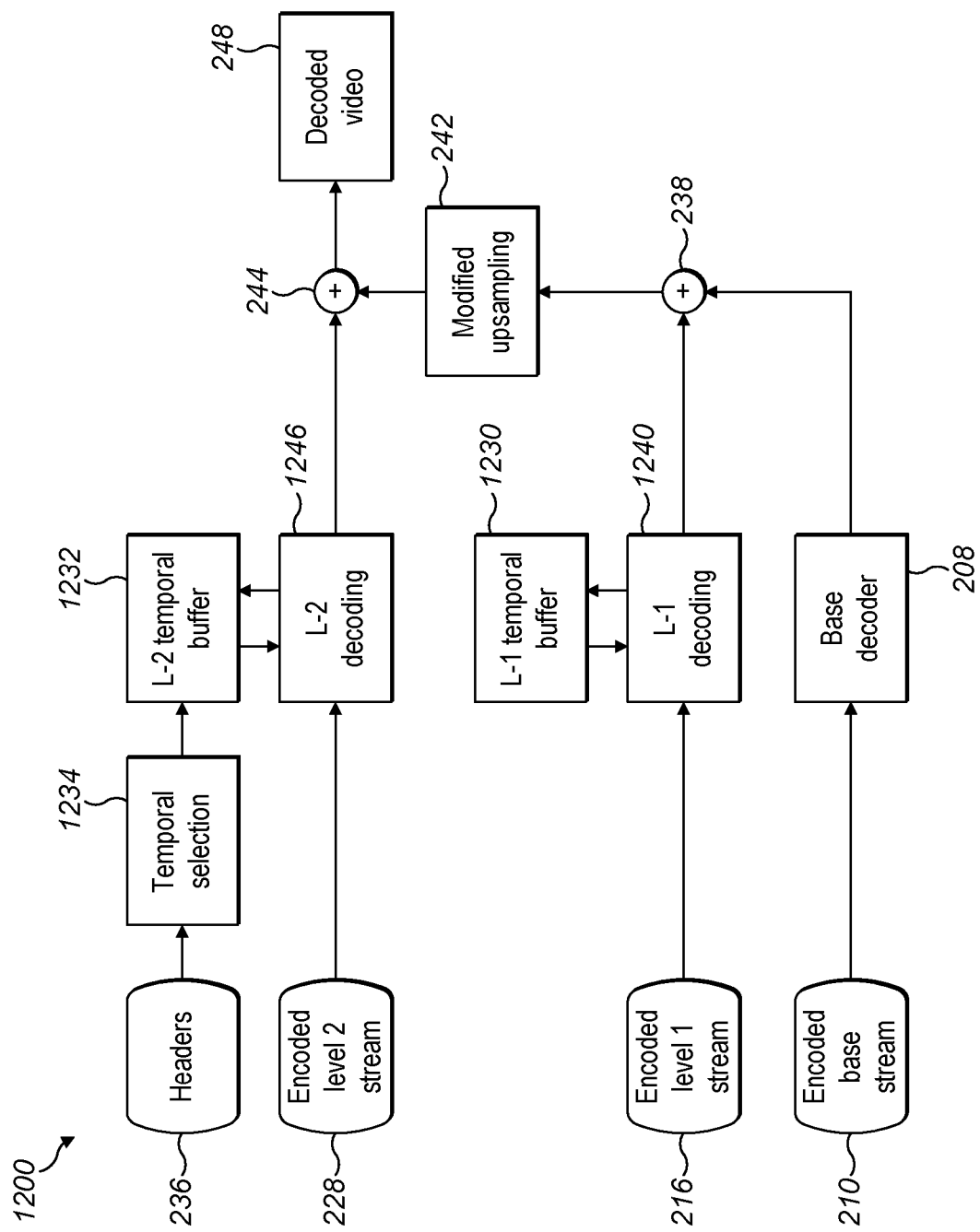
FIG. 12 is a schematic diagram illustrating a decoding process according to examples herein.

FIG. 11 shows a first example encoder 100. The illustrated components may also be implemented as steps of a corresponding encoding process. The level 1 encoding operation 1114 operates with an optional level 1 temporal buffer 1130, which may be used to apply temporal processing as described further below. The level 2 encoding operation 1126 also operates with an optional level 2 temporal buffer 1132, which may be used to apply temporal processing as described further below. The level 1 temporal buffer 1130 and the level 2 temporal buffer 1132 may operate under the control of a temporal selection component 1134. The temporal selection component 1134 may receive one or more of the input video 102 and the output of the downsampling 1104 to select a temporal mode. This is explained in more detail in later examples. FIG. 12 shows a first example decoder 1200.

Figure 13A:
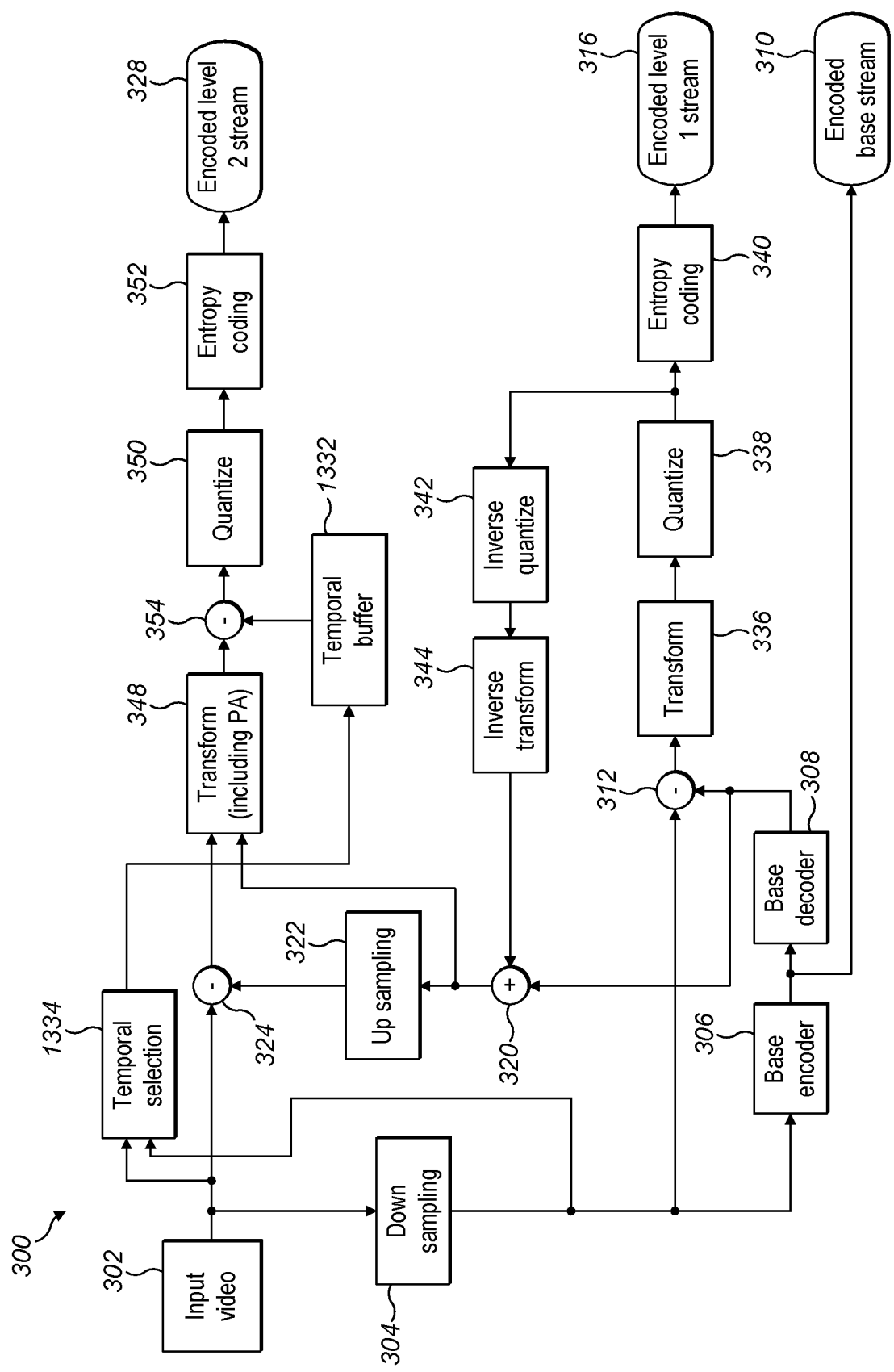
FIGS. 13A and 13B are schematic diagrams each illustrating an encoding process according to examples herein.
Figure 13B:
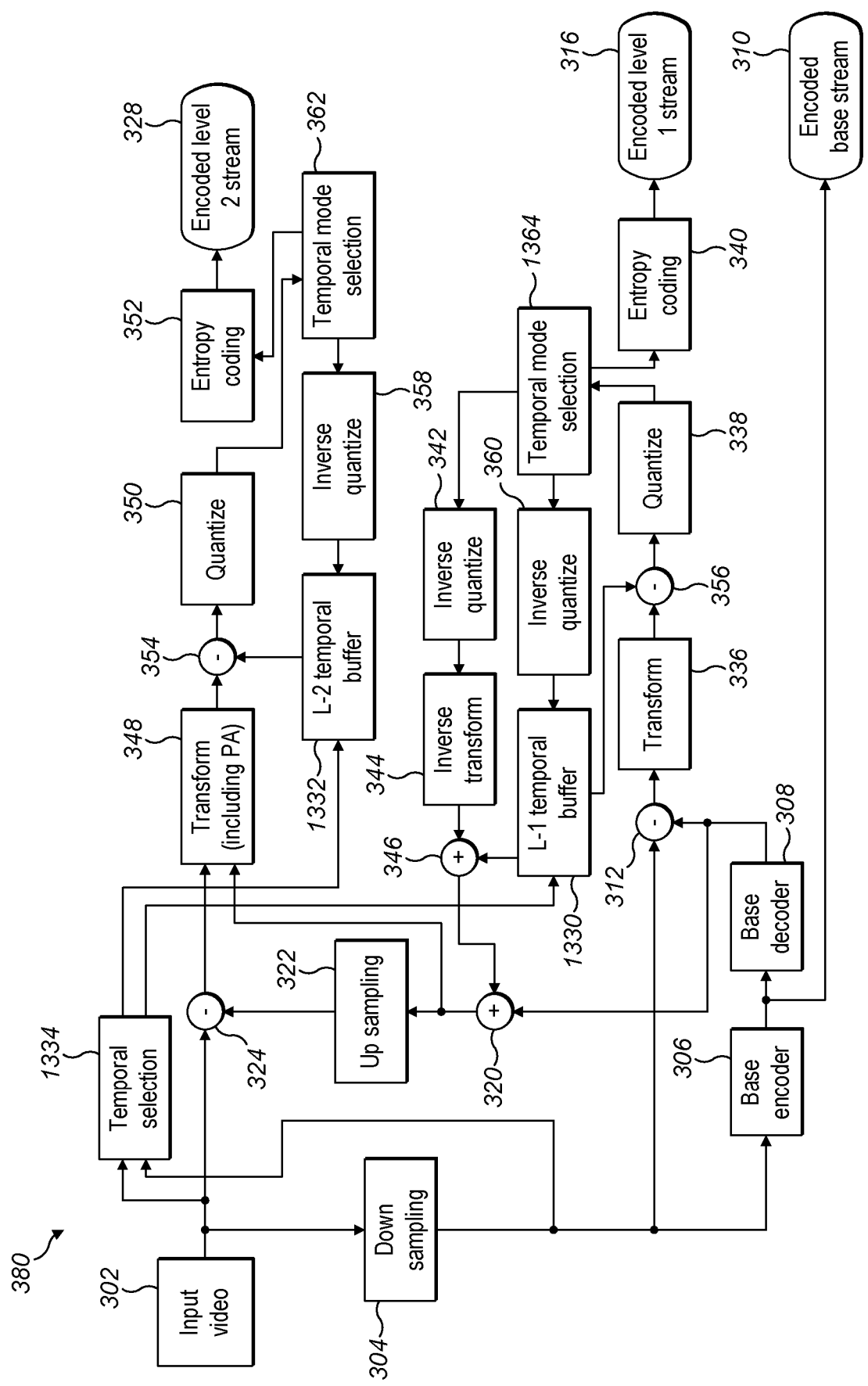

FIGS. 13A and 13B show different variations of a second example encoder 1300, 1380. The second example encoder 1300, 1380 may comprise an implementation of the first example encoder 1100 of FIG. 1. In the examples of FIGS. 13A and 13B, the encoding steps of the stream are expanded in more detail to provide an example of how the steps may be performed. FIG. 13A illustrates a first variation with temporal prediction provided only in the second level of the enhancement process, i.e. with respect to the level 2 encoding. FIG. 13B illustrates a second variation with temporal prediction performed in both levels of enhancement (i.e. levels 1 and 2).

FIG. 13A shows a variation of the second example encoder 1300 where temporal prediction is performed as part of the level 2 encoding process. Temporal prediction is performed using the temporal selection component 1334 and the level 2 temporal buffer 1332. The temporal selection component 1334 may determine a temporal processing mode as described in more detail below and control the use of the level 2 temporal buffer 1332 accordingly. For example, if no temporal processing is to be performed the temporal selection component 1334 may indicate that the contents of the level 2 temporal buffer 1332 are to be set to 0. FIG. 13B shows a variation of the second example encoder 1380 where temporal prediction is performed as part of both the level 1 and the level 2 encoding process. In FIG. 13B, a level 1 temporal buffer 1330 is provided in addition to the level 2 temporal buffer 1332. Although not shown, further variations where temporal processing is performed at level 1 but not level 2 are also possible.

When temporal prediction is selected, the second example encoder 1300, 1380 of FIG. 3A or 3B may further modify the coefficients (i.e. the transformed residuals output by a transform component) by subtracting a corresponding set of coefficients derived from an appropriate temporal buffer. The corresponding set of coefficients may comprise a set of coefficients for a same spatial area (e.g. a same coding unit as located within a frame) that are derived from a previous frame (e.g.

coefficients for the same area for a previous frame). These coefficients may be derived or otherwise obtained from a temporal buffer. Coefficients obtained from a temporal buffer may be referred to herein as temporal coefficients. The subtraction may be applied by a subtraction component such as the third subtraction components (for respective levels 2 and 1). In summary, when temporal prediction is applied, the encoded coefficients correspond to a difference between the frame and another frame of the stream. The other frame may be an earlier or later frame (or block in the frame) in the stream. Thus, instead of encoding the residuals between the up-sampled re-created stream and the input video, the encoding process may encode the difference between a transformed frame in the stream and the transformed residuals of the frame. Thus, the entropy may be reduced. Temporal prediction may be applied selectively for groups of coding units (referred to herein as "tiles") based on control information and the application of temporal prediction at a decoder may be applied by sending additional control information along with the encoded streams (e.g. within headers or as a further surface).

As shown in FIGS. 13A and 13B, when temporal prediction is active, each transformed coefficient may be:

$$\Delta = F\text{current} - F\text{buffer}$$

where the temporal buffer may store data associated with a previous frame. Temporal prediction may be performed for one colour plane or for multiple colour planes. In general, the subtraction may be applied as an element wise subtraction for a "frame" of video where the elements of the frame represent transformed coefficients, where the transform is applied with respect to a particular n by n coding unit size (e.g. 2×2 or 4×4). The difference that results from the temporal prediction (e.g. the delta above may be stored in the buffer for use for a subsequent frame. Hence, in effect, the residual that results to the temporal prediction is a coefficient residual with respect to the buffer.

Although FIGS. 13A and 13B show temporal prediction being performed after the transform operation, it may also be performed after the quantize operation. This may avoid the need to apply the level 2 inverse quantization component and/or the level 1 inverse quantize component 360. Thus, as illustrated in FIGS. 13A and 13B and described above, the output of the second example encoders after performing an encoding process is an encoded base stream and one or more enhancement streams which preferably comprise an encoded level 1 stream for a first level of enhancement and an encoded level 2 stream for a further or second level of enhancement.

Figure 14A:
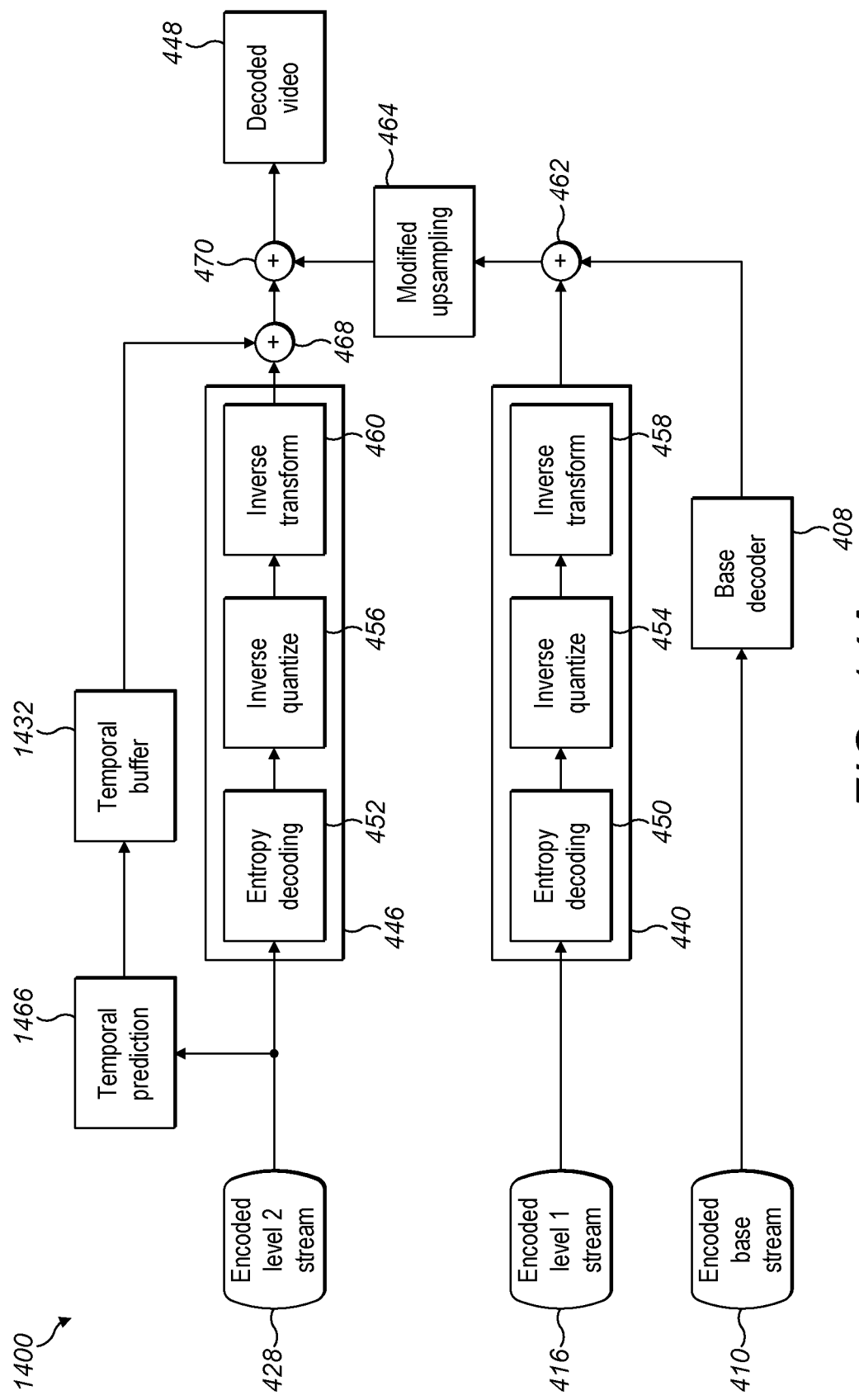
FIGS. 14A and 14B are schematic diagrams each illustrating a decoding process according to examples herein.
Figure 14B:
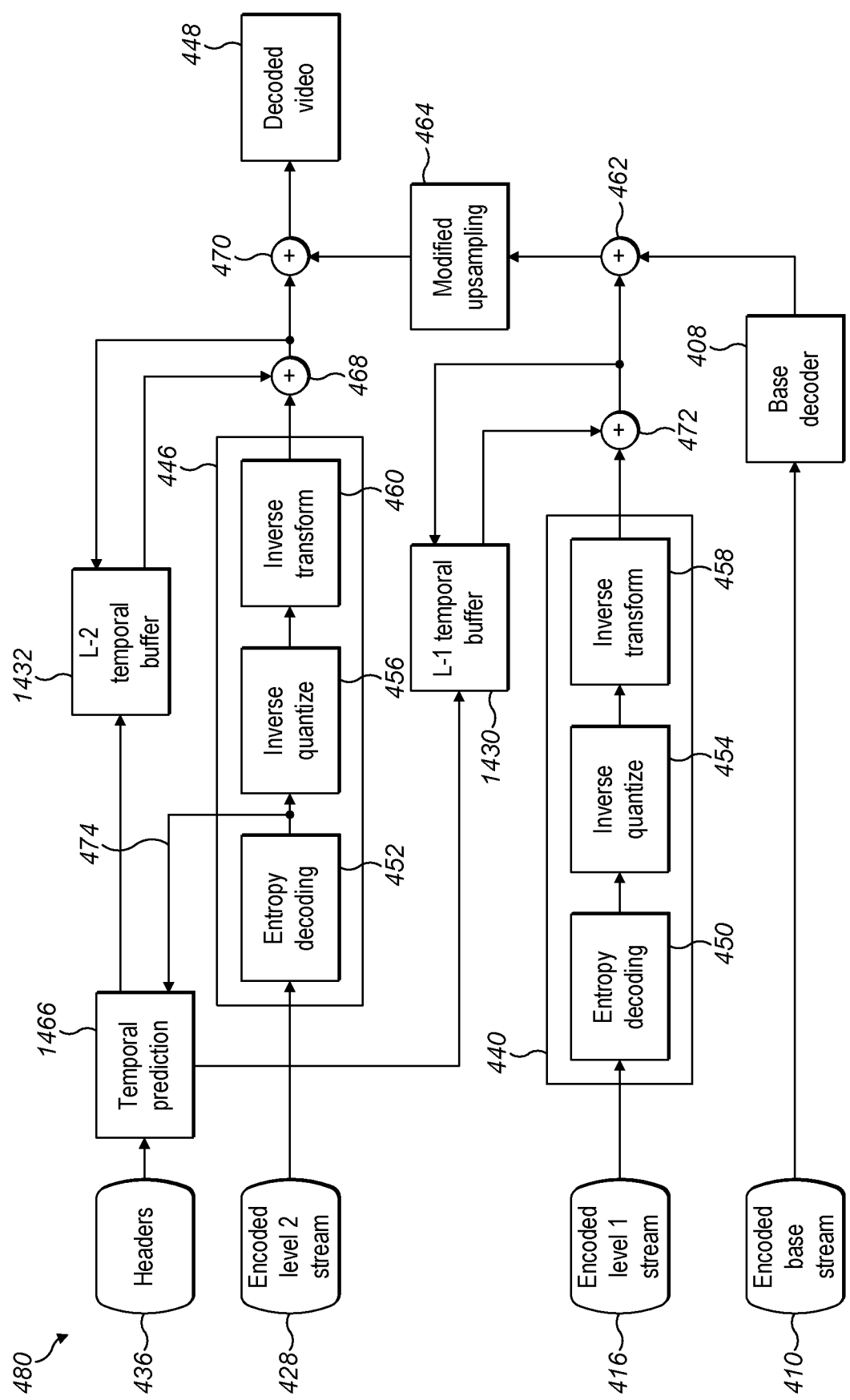

FIGS. 14A and 14B illustrate respective variations of a second example decoder 1400, 1480. As is clearly identifiable, the decoding steps and components are expanded in more detail to provide an example of how the decoding may be performed. As with FIGS. 13A and 13B, FIG. 14A illustrates a variation where temporal prediction is used only for the second level (i.e. level 2) and FIG. 14B illustrates a variation in which temporal prediction is used in both levels (i.e. levels 1 and 2). As before, further variations are envisaged (e.g. level 1 but not level 2), where the form of the configuration may be controlled using signalling information. In FIG. 14A, temporal prediction is applied during the level 2 decoding. In the example of FIG. 14A, the temporal prediction is controlled by a temporal prediction component 1466. In this variation, control information for the temporal prediction is extracted from the encoded level 2 stream, as indicated by the arrow from the stream to the temporal prediction component 1466. In other implementations, such as those shown in FIG. 14B, control information for the temporal prediction may be sent separately from the encoded level 2 stream, e.g. in the headers. The temporal prediction component 1466 controls the use of the level 2 temporal buffer 1432, e.g. it may determine a temporal mode and control temporal refresh as described with reference to later examples. The contents of the temporal buffer 1432 may be updated based on data for a previous frame of residuals. When the temporal buffer 1432 is applied, the contents of the buffer are added 1468 to the second set of residuals. In FIG. 14A, the contents of the temporal buffer 1432 are added to the output of a level 2 decoding component 1446 (which in FIG. 14A implements the entropy decoding, the inverse quantization and the inverse transform). In other examples, the contents of the temporal buffer may represent any set of intermediate decoding data and as such the addition 468 may be moved appropriately to apply the contents of the temporal buffer at an appropriate stage (e.g. if the temporal buffer is applied at the dequantized coefficient stage, the addition may be located before the inverse transform). The temporal-corrected second set of residuals are then combined with the output of the up-sampling to generate the decoded video. The decoded video is at a level 2 spatial resolution, which may be higher than a level 1 spatial resolution. The second set of residuals apply a correction to the (viewable) upsampled reconstructed video, where the correction adds back in fine detail and improves the sharpness of lines and features.

FIG. 14B shows a variation of the second example decoder. In this case, temporal prediction control data is received by a temporal prediction component from headers. The temporal prediction component controls both the level 1 and level 2 temporal prediction, but in other examples separate control components may be provided for both levels if desired. FIG. 14B shows how the reconstructed second set of residuals that are added to the output of the level 2 decoding component may be fed back to be stored in the level 2 temporal buffer 432 for a next frame (the feedback is omitted from FIG. 14A for clarity). A level 1 temporal buffer 1430 is also shown that operates in a similar manner to the level 2 temporal buffer 1432 described above and the feedback loop for the buffer is shown in this Figure. The contents of the level 1 temporal buffer 1430 are added into the level 1 residual processing pipeline via a summation. Again, the position of this summation may vary along the level 1 residual processing pipeline depending on where the temporal prediction is applied (e.g. if it is applied in transformed coefficient space, it may be located before the level 1 inverse transform component).

FIG. 14B shows two ways in which temporal control information may be signalled to the decoder. A first way is via headers 436 as described above. A second way, which may be used as an alternative or additional signalling pathway is via data encoded within the residuals themselves. FIG. 14B shows a case whereby data may be encoded into an HH transformed coefficient and so may be extracted following entropy decoding. This data may be extracted from the level 2 residual processing pipeline and passed to the temporal prediction component 1466.

In certain examples, there may be at least two temporal modes:

A first temporal mode that does not use the temporal buffer or that uses the temporal buffer with all zero values. The first temporal mode may be seen as an intra-frame mode as it only uses information from within a current frame. In the first temporal mode, following any applied ranking and transformation, coefficients may be quantized without modification based on information from one or more previous frames.

A second temporal mode that makes use of the temporal buffer, e.g. that uses a temporal buffer with possible non-zero values. The second temporal mode may be seen as an inter-frame mode as it uses information from outside a current frame, e.g. from multiple frames. In the second temporal mode, following any applied ranking and transformation, previous frame dequantized coefficients may be subtracted from the coefficients to be quantized—Cx,y,n, inter=Cx,y,n−dqCx,y,n−1.

In one case, a first temporal mode may be applied by performing a subtraction with a set of zeroed temporal coefficients. In another case, the subtraction may be performed selectively based on temporal signalling data.

Figure 15A:
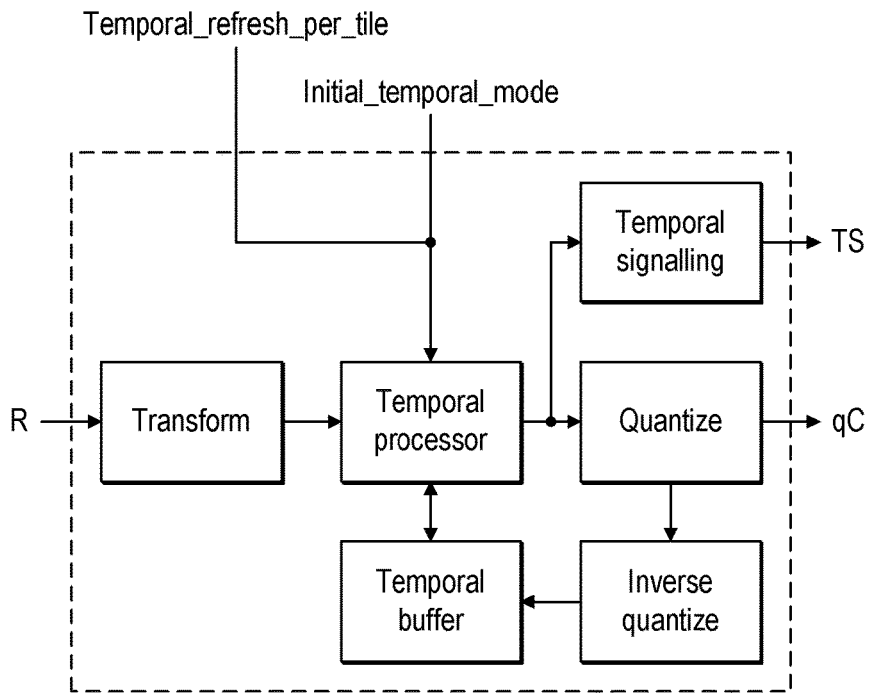
FIGS. 15A and 15B are schematic diagrams illustrating various features of a temporal prediction process according to examples herein.
Figure 15B:
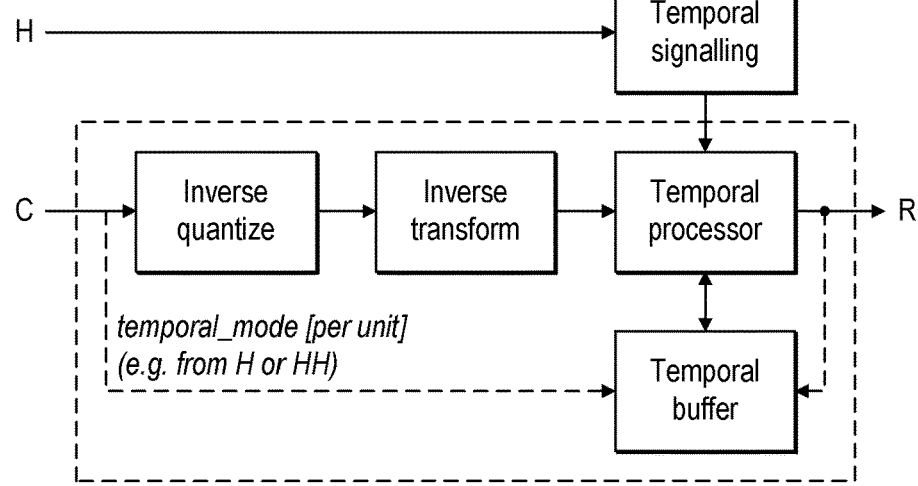

FIG. 15A shows an example of temporal processing that may be performed at the encoder. FIG. 15A shows a temporal processing subunit of an example encoder. The temporal processing subunit receives a set of residuals indicated as R. The temporal processing subunit outputs a set of quantized coefficients, indicated as qC, In the present example, the temporal processing subunit also outputs temporal signalling data, indicated as TS, for communication to the decoder. FIG. 15B shows a corresponding example decoder where the decoder receives a temporal_refresh bit per frame and a temporal_mode bit per coding unit. In the example decoder of FIG. 15B, a temporal processing subunit is provided at the decoder.

Further Implementation

In certain embodiments as described herein, in an example implementation, it should be noted that for lossless compression, the following may be implemented:

Where, if stepWidth>16, deadZoneWidthOffset is derived as follows:

deadZoneWidthOffset [$x$][$y$]=(((1«16)−((Aconst*(qm[$x$+(levelIdxSwap*nTbs)][$y$]+stepWidthModifier[$x$][$y$]))+Bconst)»1)*(qm[$x$+(levelIdxSwap*nTbs)][$y$]+stepWidthModifier[$x$][$y$]))»16

Where, if stepWidth <=16, deadZoneWidthOffset is derived as follows:

deadZoneWidthOffset [$x$][$y$]=stepWidth»1

That is, where the stepwidth is less than 16, a deadzone-widthoffset is not dependent on the matrix of parameters.

Adaptive Quantisation Implementation

In a specific implementation, if a first variable flag, e.g. temporal enabled flag is equal to 1, a second variable flag, e.g. temporal refresh bit flag is equal to 0 and a third variable flag, e.g. temporal_tile_intra_signalling_enabled_flag is equal to 1 and a variable based on an entropy decoded temporal signal coefficient group, e.g. TransformTempSig, is equal to 0 then the variable stepWidth is modified to Floor(stepWidth*(1−(Clip3(0, 0.5, (temporal_step_width_modifier/255)))))

where temporal_step_width_modifier specifies the value used to calculate a variable step width modifier for transforms that use temporal prediction. If temporal_step_width_modifier_signalled_flag is equal to 0, temporal_step_width_modifier may be set to 48.

Further Example Implementation

The attached appendix below, provides an example, non-limiting, implementation embodying the principles described elsewhere herein. This example can be used to provide context for the features described.

Further Example Encoder and Decoder

FIGS. 25 and 26 respectively show variations of the encoder architecture of FIGS. 1, 3A and 3B and the decoder architecture of FIGS. 2, 5A and 5B.

Figure 16:
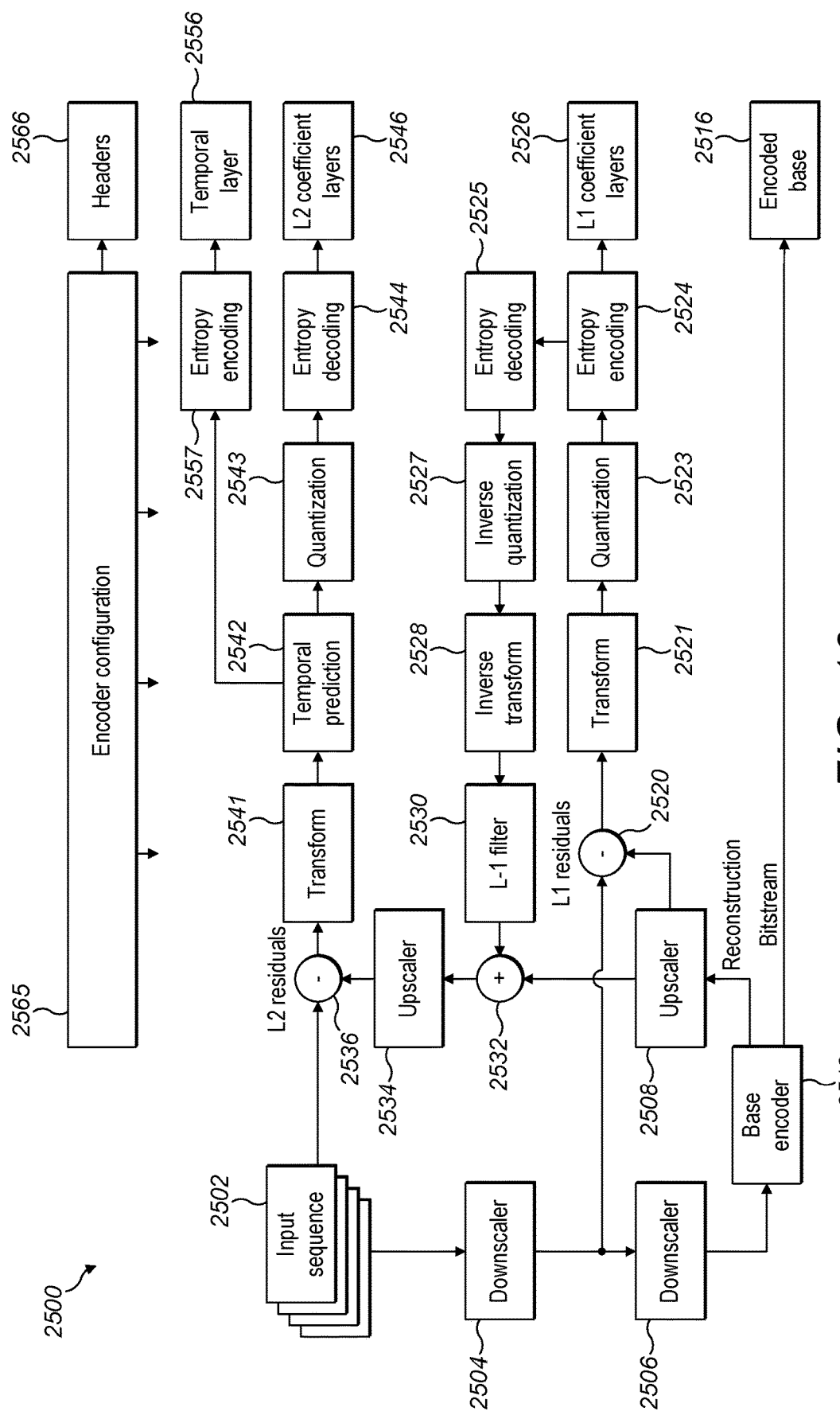
FIG. 16 is a schematic illustration of an encoder.

The encoding process 2500 to create a bitstream is shown in FIG. 16. Firstly, the input sequence 2502 is fed into a first down-sampler 2504, then a second down-sampler 2506 (i.e. consecutive down-samplers that are called down-scalers in the Figure) and is processed according to a chosen scaling mode. The variation of FIG. 16 differs from that of previous examples in that there are additional down-sampling and up-sampling stages prior to the base layer, e.g. an additional down-sampling stage shown as second down-scaler 2506 is possible prior to passing data to a base encoder 2512 and an additional up-sampling stage (shown an as first up-scaler 2508 in FIG. 16) is possible following receipt of decoded data from the base layer. In certain examples, a given scaling mode may be used to turn on and off the down-scaler and up-scaler pairs at each stage. In one case, the scaling mode may indicate a direction of scaling, e.g. as per the horizontal only down-sampling/up-sampling described herein. If the second down-scaler 2506 and the first up-scaler 2508 are turned off, then the spatial scaling resembles that of FIGS. 1, 3A and 3B.

In FIG. 16, as per the previous examples, a base codec is used that produces a base bitstream 2516 according to its own specification. This encoded base may be included as part of a combined bitstream for the present video coding framework.

With or without additional upscaling, a reconstructed base picture, e.g. a decoded version of a base encoded frame, is subtracted at first subtraction component 2520 from a first-order downscaled input sequence in order to generate the sub-layer 1 residuals (the level 1 residual data as descried herein). These residuals form the starting point for the encoding process of the first enhancement layer. Transform component 2521, quantization component 2523 and entropy encoding component 2524 (amongst others) as described herein process the first set of (level 1) residuals to generate (level 1) entropy encoded quantized transform coefficients 2526.

In FIG. 16, as per previous examples, the entropy encoded quantized transform coefficients from sub-layer 1 are processed by an in-loop decoder that performs inverse or decoding operations. These operations simulate a decoding process for the first set of residuals that would be performed at a decoder. In the example of FIG. 16, these comprise an entropy decoding component 2525, an inverse quantization component 2527, an inverse transform component 2528 and a level 1 filter 2530. These may be similar to previously described components. The processed or "decoded" first set of residuals are added to data derived from the output of the base encoder (e.g. as decoded and optionally upscaled) at summation component 2532 to generate a reconstructed frame. In FIG. 16, the reconstructed frame is processed by a second up-scaler 2534. The use of the up-scaler may again depend on a chosen scaling mode. Finally, the residuals for a second sub-layer 2 (which may also be called a L2 layer) are calculated at a second subtraction component 2536 by a subtraction of the input sequence and the upscaled reconstruction. These form a second set of (level 2) residuals and these residuals are also processed by a set of coding components or tools, which include a transform component

2541, a temporal prediction component 2542, a quantization component 2543 and an entropy encoding component 2544. The output is a set of level 2 coefficient layers 2546. As described in other examples, if a temporal mode is activated, an additional temporal prediction may be applied by the temporal prediction component 2542 on the transform coefficients in order to remove certain temporally redundant information and reduce the energy of the level 2 residual stream (e.g. the number of values and the number of non-zero residual values). The entropy encoded quantized transform coefficients of sub-layer 2 as well as a temporal layer 2556 specifying the use of the temporal prediction on a block basis are included in the enhancement bitstream. The temporal layer 2556 may comprise the temporal signalling described with reference to previous examples. It may be entropy encoded by an entropy encoding component 2557. The entropy encoding component 2557 may apply at least run length encoding as discussed with reference to the examples.

The encoder 2500 may be configured with a set of encoder configuration information 2565, e.g. as described with reference to the examples of FIGS. 14A to 14C. This information may be transmitted to a decoder as a set of headers 2566 for the output bitstream. In FIG. 16, a combined bitstream for the encoder may comprise headers 2566, a temporal layer 2556, level 2 (L2) encoded coefficients 2546, level 1 (L1) encoded coefficients 2526 and an encoded base stream 2516.

Figure 17:
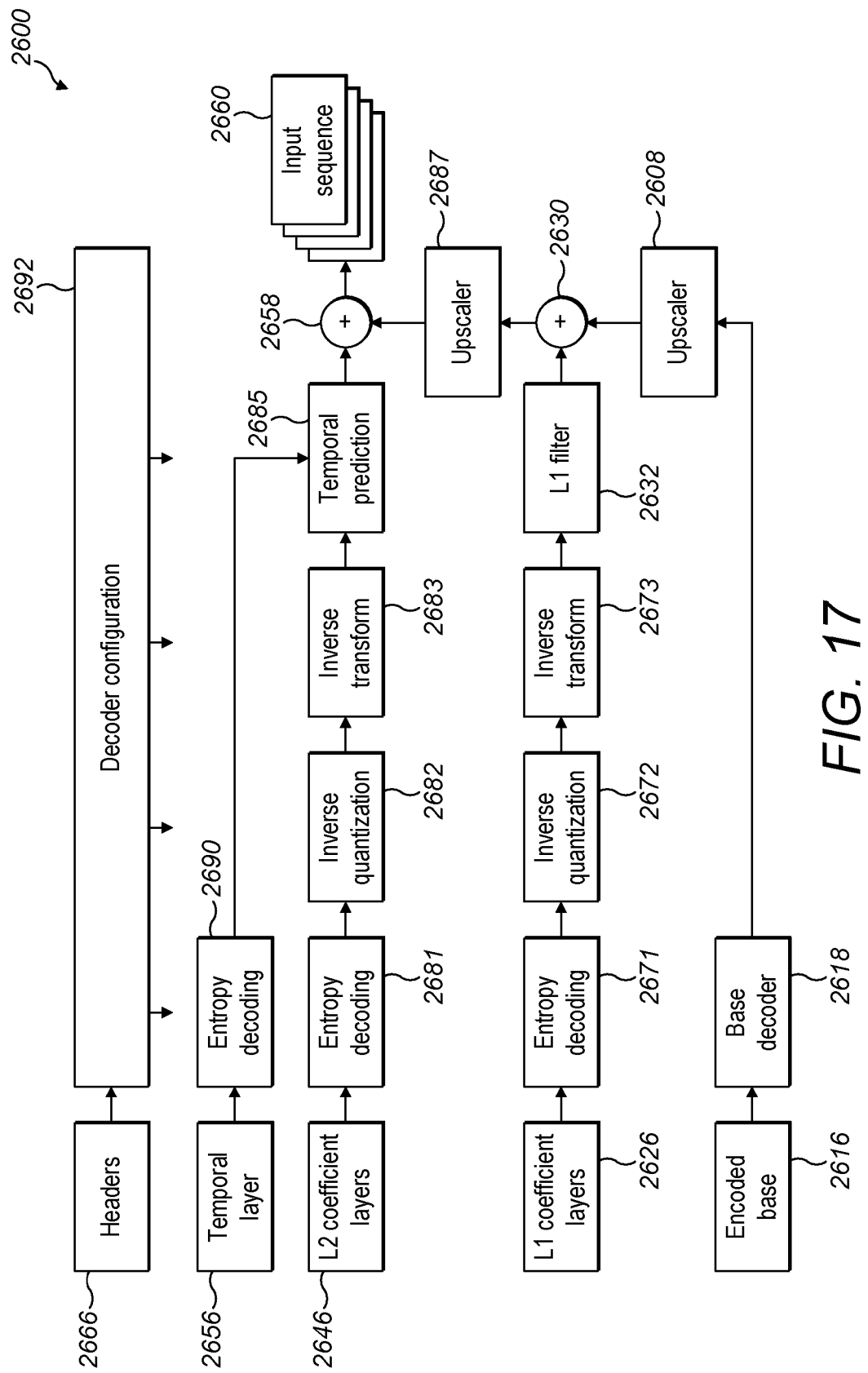
FIG. 17 is a schematic illustration of a decoder.

FIG. 17 shows a variation of a decoder 2600 according to an example. The decoder may comprise a variation of the decoder shown in any one of the other figures herein. The decoder of FIG. 17 may be used together with the encoder of FIG. 16.

First, for the creation of an output sequence of frames, the decoder 2600 analyses the bitstream. As can be seen in FIG. 17, the process can again be divided into three parts.

In order to generate a decoded base picture (e.g. at Layer 0), a base decoder 2618 is fed with the extracted base bitstream 2616. According to the chosen scaling mode, this reconstructed picture may be upscaled by an additional first up-scaler 2608 prior to a summation component 2630 that adds a first set of (level 1) residuals. The input to the summation component 2630 from the first up-scaler 2608 may be referred to as a preliminary intermediate picture.

Following (or in parallel with) the base layer decoding, the enhancement layer bitstream (including the two sublayers of residuals) needs to be decoded. Firstly, the coefficients 2626 belonging to sub-layer 1 (L1) are decoded using inverse versions of the coding components or tools used during the encoding process. Hence, the level 1 coefficient layers 2626 are processed, in turn, by an entropy decoding component 2671, a inverse quantization component 2672, and an inverse transform component 2673. Additionally, a sub-layer 1 (L1) filter 2632 might be applied in order to smooth the boundaries of the transform block (i.e. the coding unit). The output of the sub-layer 1 (L1) decoding process may be referred to as an enhancement sub-layer 1 output. This enhancement sub-layer 1 output is added to the preliminary intermediate picture at the first (lower) summation component 2630, which results in a combined intermediate picture. Again, depending on the scaling mode, a second up-scaler 2687 may be applied and the resulting preliminary output picture produced. The preliminary output picture is provided to the second upper summation component 2658. It has the same dimensions as the overall output picture.

As a final step, the encoded coefficients 2646 for the second enhancement sub-layer 2 are decoded. Again, this uses a set of inverse coding components or tools as described in other examples herein. In FIG. 17, these components include an entropy decoding component 2681, an inverse quantization component 2682, and an inverse transform component 2683. If a temporal mode is activated, then a temporal prediction component 2685 may apply temporal prediction. Temporal prediction may be applied at any point within the second enhancement sub-layer 2. In one case, it is applied to the quantized transform coefficients. Temporal prediction may be applied based on signalling received as the temporal layer 2656. In FIG. 17, the temporal layer 2656 is decoded by an entropy decoding component 2690 (e.g. may be run-length decoded). The output of the temporal prediction is provided into the second upper summation component 2658 as an enhancement sub-layer 2 output. It is then added to the preliminary output picture by said summation component 2658 to form a combined output picture 2660 as a final output of the decoding process.

Again, the decoding process may be controlled according to a decoder configuration 2692 as transmitted within headers 2666 of the bit stream.

As described with reference to the above examples, unlike comparative scalable codecs, the new approaches described herein may be completely agnostic of the codec used to encode the lower layer. This is because the upper layer is decodable without any information about the lower layer. As shown in FIG. 17, a decoder receives multiple streams generated by the encoder. These may be five or so streams that include: a first encoded stream (encoded base) that is produced by feeding a base codec (e.g., AVC, HEVC, or any other codec) with a down-sampled version of the input video; a second encoded stream (level 1 coefficient layers) that is produced by processing the residuals obtained by taking the difference between the reconstructed base codec video and the down-sampled version of the input video (level 1 residuals); a third encoded stream (level 2 coefficient layers) that is produced by processing the residuals obtained by taking the difference between an up-sampled version of a corrected version of the reconstructed base coded video and the input video (level 2 residuals); a fourth encoded stream (e.g. in the form of a temporal layer) that is produced from the temporal processing to instruct the decoder; and a fifth stream (headers) that are produced for configuring the decoder. The encoded base stream is decoded by a base decoder implementing a decoding algorithm corresponding to the encoding algorithm implemented by the base codec used in the encoder, and the output of this is a decoded base. Separately, and independently, the level 1 coefficient groups are decoded in order to obtain level 1 residual data. Further, separately and independently, the level 2 coefficient groups are decoded in order to obtain level 2 residual data. The decoded base, the level 1 residual data and the level 2 residual data are then combined. In particular, the decoded base is combined with the level 1 residuals data to generate an intermediate picture. The intermediate picture may be then up-sampled and further combined with the level 2 residual data.

Moreover, the new approach uses an encoding and decoding process which processes the picture without using any inter-block prediction. Rather, it processes the picture by transforming an N×N block of picture elements (e.g., 2×2 or 4×4) and processing the blocks independently from each other. This results in efficient processing as well as in no-dependency from neighbouring blocks, thus allowing the processing of the picture to be parallelised.

In general summary, with reference to FIG. 17, there is shown there is shown a non-limiting exemplary embodiment. In FIG. 17, an exemplary decoding module 2600 is depicted. The decoding module 2600 receives a plurality of input bitstreams, comprising encoded base 2616, level 1 coefficient groups 2626, level 2 coefficient groups 2646, a temporal coefficient group 2656 and headers 2666.

In general, the decoding module 2600 processes two layers of data. A first layer, namely the base layer, comprises a received data stream 2616 which includes the encoded base. The encoded base 2616 is then sent to a base decoding module 2618, which decodes the encoded base 2616 to produce a decoded base picture. The base decoding may be a decoder implementing any existing base codec algorithm, such as AVC, HEVC, AV1, VVC, EVC, VC-6, VP9, etc. depending on the encoded format of the encoded base.

A second layer, namely the enhancement layer, is further composed of two enhancement sublayers. The decoding module receives a first group of coefficients, namely level 1 coefficient groups 2626, which are then passed to an entropy decoding module 2671 to generate decoded coefficient groups. These are then passed to an inverse quantization module 2672, which uses one or more dequantization parameters to generate dequantized coefficient groups. These are then passed to an inverse transform module 2673 which performs an inverse transform on the dequantized coefficient groups to generate residuals at enhancement sublayer 1 (level 1 residuals). The residuals may then be filtered by a smoothing filter 2632. The level 1 residuals (i.e., the decoded first enhancement sublayer) is applied to a processed output of the base picture.

The decoding module receives a second group of coefficients, namely level 2 coefficient groups 2646, which are then passed to an entropy decoding module 2681 to generate decoded coefficient groups. These are then passed to an inverse quantization module 2682, which uses one or more dequantization parameters to generate dequantized coefficient groups. The dequantization parameters used for the enhancement sublayer 2 may be different from the dequantization parameters used for the enhancement sublayer 1. The dequantized coefficient groups are then passed to an inverse transform module 2683 which performs an inverse transform on the dequantized coefficient groups to generate residuals at enhancement sublayer 2 (level 2 residuals).

Implementation

At both the encoder and decoder, for example implemented in a streaming server or client device or client device decoding from a data store, methods and processes described herein can be embodied as code (e.g., software code) and/or data. The encoder and decoder may be implemented in hardware or software as is well-known in the art of data compression. For example, hardware acceleration using a specifically programmed Graphical Processing Unit (GPU) or a specifically designed Field Programmable Gate Array (FPGA) may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

APPENDIX

The following sets out an example, non-limiting, implementation embodying the principles described elsewhere herein. This example can be used to provide context for the features described.

SYNTAX AND SEMANTICS

The syntax tables specify a superset of the syntax of all allowed bitstreams. Additional constraints on the syntax may be specified, either directly or indirectly, as appropriate.

NOTE An actual decoder should implement some means for identifying entry points into the bitstream and some means to identify and handle non-conforming bitstreams. The methods for identifying and handling errors and other such Process Payload—Picture Configuration

|  | Descriptor |
|---|---|
| Syntax | |
| process_payload_picture_config(payload_size) { | |
|   no_enhancement_bit_flag | u(1) |
|   if (no_enhancement_bit_flag == 0) { | |
|     quant_matrix_mode | u(3) |
|     dequant_offset_signalled_flag | u(1) |
|     picture_type_bit_flag | u(1) |
|     temporal_refresh_bit_flag | u(1) |
|     step_width_level1_enabled_flag | u(1) |
|     step_width_level2 | u(15) |
|     dithering_control_flag | u(1) |
|   } else { | |
|     reserved_zeros_4bit | u(4) |
|     picture_type_bit_flag | u(1) |
|     temporal_refresh_bit_flag | u(1) |
|     temporal_signalling_present_flag | u(1) |
| Syntax | |
|   } | |
|   if (picture_type_bit_flag == 1) { | |
|     field_type_bit_flag | u(1) |
|     reserved_zeros_7bit | u(7) |
|   } | |
|   if (step_width_level1_enabled_flag == 1) { | |
|     step_width_level1 | u(15) |
|     level1_filtering_enabled_flag | u(1) |
|   } | |
|   if (quant_matrix_mode == 2 \|\| | |
|   quant_matrix_mode == 3 \|\| | |
| quant_matrix_mode == 5) { | |
|     for(layerIdx = 0; layerIdx < nLayers; layerIdx++) | |
|   { | |
|       qm_coefficient_0[layerIdx] | u(8) |
|     } | |
|   } | |
|   if (quant_matrix_mode == 4 \|\| quant_matrix_mode == 5) | |
| { | |
|     for(layerIdx = 0; layerIdx < nLayers; layerIdx++) | |

| | Descriptor |
|---|---|
| {
    qm_coefficient_1[layerIdx] | u(8) |
  }
}
if (dequant_offset_signalled_flag) {
    dequant_offset_mode_flag | u(1) |
    dequant_offset | u(7) |
}
if (dithering_control_flag == 1) {
    dithering_type | u(2) |
    reserverd_zero | u(1) |
    if (dithering_type != 0) {
Syntax
        dithering_strength | u(5) |
    } else {
        reserved_zeros_5bit | u(5) |
    }
  }
} | |

Data Block Unit Picture Configuration Semantics no_enhancement_bit_flag specifies that there are no enhancement data for all layerIdx<nLayers in the picture.

quant_matrix_mode specifies which quantization matrix to be used in the decoding process in accordance with the table below. When quant_matrix_mode is not present, it is inferred to be equal to 0.

Quantization Matrix

| quant_matrix_mode | Value of type |
|---|---|
| 0 | each enhancement sub-layer uses the matrices used for the previous frame, unless the current picture is an IDR picture, in which case both enhancement sub-layers use default matrices |
| 1 | both enhancement sub-layers use default matrices |
| 2 | one matrix of modifiers is signalled and should be used on both residual plane |
| 3 | one matrix of modifiers is signalled and should be used on enhancement sub-layer 2 residual plane |
| 4 | one matrix of modifiers is signalled and should be used on enhancement sub-layer 1 residual plane |
| 5 | two matrices of modifiers are signalled - the first one for enhancement sub-layer 2 residual plane, the second for enhancement sub-layer 1 residual plane |
| 6-7 | Reserved | dequant_offset_signalled_flag specifies if the offset method and the value of the offset parameter to be applied when dequantizing is signalled. If equal to 1, the method for dequantization offset and the value of the dequantization offset parameter are signalled. When dequant_offset_signalled_flag is not present, it is inferred to be equal to 0.

picture_type_bit_flag specifies whether the encoded data are sent on a frame basis (e.g., progressive mode or interlaced mode) or on a field basis (e.g., interlaced mode) in accordance with the table below.

Picture Type

| picture_type_bit_flag | Value of type |
|---|---|
| 0 | Frame |
| 1 | Field | field_type_bit_flag specifies, if picture_type is equal to 1, whether the data sent are for top or bottom field in accordance with the table below. Field type

| field_type_bit_flag | Value of type |
|---|---|
| 0 | Top |
| 1 | Bottom | temporal_refresh_bit_flag specifies whether the temporal buffer should be refreshed for the picture. If equal to 1, the temporal buffer should be refreshed. For an IDR picture, temporal_refresh_bit_flag shall be set to 1.

temporal_signalling_present_flag specifies whether the temporal signalling coefficient group is present in the bitstream. When temporal_signalling_present_flag is not present, it is inferred to be equal to 1 if temporal_enabled_flag is equal to 1 and temporal_refresh_bit_flag is equal to 0, otherwise it is inferred to be equal to 0.

step_width_level 2 specifies the value of the stepwidth value to be used when decoding the encoded residuals in enhancement sub-layer 2 for the luma plane.

The stepwidth value to be used when decoding the encoded residuals in enhancement sub-layer 2 for the chroma planes shall be computed as Clip3(1, 32,767, ((step_width_level2*chroma_step_width_multiplier)»6)).

step_width_level1_enabled_flag specifies whether the value of the stepwidth to be used when decoding the encoded residuals in the enhancement sub-layer 1 is a default value or is signalled. It should be either 0 (default value) or 1 (value signalled by step_width_level1). The default value is 32,767. When step_width_level1_enabled_flag is not present, it is inferred to be equal to 0.

dithering_control_flag specifies whether dithering should be applied. It should be either 0 (dithering disabled) or 1 (dithering enabled). When dithering_control_flag is not present, it is inferred to be equal to 0.

step_width_level1 specifies the value of the stepwidth value to be used when decoding the encoded residuals in enhancement sub-layer 1.

level1_filtering_enabled_flag specifies whether the level1 deblocking filter should be used. It should be either 0 (filtering disabled) or 1 (filtering enabled). When level1_filtering_enabled_flag is not present, it is inferred to be equal to 0.

qm_coefficient_0[layerIdx] specifies the values of the quantization matrix scaling parameter when quant_matrix_mode is equal to 2, 3 or 5.

qm_coefficient_1[layerIdx] specifies the values of the quantization matrix scaling parameter for when quant_matrix_mode is equal to 4 or 5.

dequant_offset_mode_flag specifies the method for applying dequantization offset. If equal to 0, the default method applies, using the signalled dequant_offset as parameter. If equal to 1, the constant-offset method applies, using the signalled dequant_offset parameter.

dequant_offset specifies the value of the dequantization offset parameter to be applied. The value of the dequantization offset parameter should be between 0 and 127, inclusive.

dithering_type specifies what type of dithering is applied to the final reconstructed picture according to the table below.

Dithering

| dithering_type | Value of type |
|---|---|
| 0 | None |
| 1 | Uniform |
| 2-3 | reserved | dithering_strength specifies a value between 0 and 31.

Decoding Process

The decoding process is specified such that all decoders that conform to a specified profile and level will produce numerically identical cropped decoded output pictures when invoking the decoding process associated with that profile for a bitstream conforming to that profile and level. Any decoding process that produces identical cropped decoded output pictures to those produced by the process described herein (with the correct output order or output timing, as specified) conforms to the decoding process requirements.

General Decoding Process for an L-2 Encoded Data Block

Inputs to this Process Are:

a sample location (xTb0, yTb0) specifying the top-left sample of the current transform block relative to the top-left sample of the current picture, a variable nTbS specifying the size of the current transform block derived from the value of variable transform_type (nTbS=2 if transform_type is equal to 0 and nTbS=4 if transform_type is equal to 1), a variable temporal_enabled_flag as derived elsewhere and a variable temporal_refresh_bit_flag as derived elsewhere, a variable temporal_signalling_present_flag as derived in elsewhere and temporal_step_width_modifier as specified elsewhere an array recL2ModifiedUpsampledSamples of a size (nTbS)×(nTbS) specifying the upsampled reconstructed samples resulting from process specified elsewhere of the current block, an array TransformCoeffQ of a size (nTbS)×(nTbS) specifying L-2 entropy decoded quantized transform coefficient, if variable temporal_signalling_present_flag is equal to 1 and temporal_tile_intra_signalling_enabled_flag is equal to 1, a variable TransformTempSig corresponding to the value in TempSigSurface at the position (xTb0»nTbs, yTb0»nTbs) and if in addition temporal_tile_intra_signalling_enabled_flag is set to 1, a variable TileTempSig corresponding to the value in TempSigSurface at the position ((xTb0%32)*32, (yTb0%32)*32), stepWidth value derived elsewhere from the value of variable step_width_level2, a variable IdxPlanes specifying to which plane the transform coeffiencients are belonging to.

Output to this process is the (nTbS)×(nTbS) array of L-2 residuals resL2Residuals with elements resL2Residuals[x][y].

The sample location (xTbP, yTbP) specifying the top-left sample of the current transform block relative to the top-left sample of the current picture is derived as follows:

(xTbP, yTbP)=(IdxPlanes==0)?(xTb0, yTb0):
(xTb0»ShiftWidthC, yTb0»ShiftHeightC)

P can be related to either luma or chroma plane depending to which plane the transform coefficients belong. Where ShiftWidthC and ShiftHeightC are specified elsewhere.

If no_enhancement_bit_flag is set to 0, then the following ordered steps apply:

If variable temporal_enabled_flag is equal to 1 and temporal_refresh_bit_flag is equal to 0 the temporal prediction process as specified elsewhere is invoked with the luma location (xTbY, yTbY), the transform size set equal to nTbS, a variable TransformTempSig and a variable TileTempSig as inputs and the output is an array tempPredL2Residuals of a size (nTbS)×(nTbS).

If variable temporal_enabled_flag is equal to 1 and temporal_refresh_bit_flag is equal to 1 the array tempPredL2Residuals of a size (nTbS)×(nTbS) is set to contain only zeros.

If variable temporal_enabled_flag is equal to 1, temporal_refresh_bit_flag is equal to 0 and temporal_tile_intra_signalling_enabled_flag is equal to 1 (subclause 0) and TransformTempSig is equal to 0 the variable stepWidth is modified to Floor(stepWidth*(1−(Clip3(0, 0.5, (temporal_step_width_modifier/255))))).

The dequantization process as specified elsewhere is invoked with the transform size set equal to nTbS, the array TransformCoeffQ of a size (nTbS)×(nTbS), and the variable stepWidth as inputs, and the output is an (nTbS)×(nTbS) array dequantCoeff.

The transformation process as specified elsewhere is invoked with the luma location (xTbY, yTbY), the transform size set equal to nTbS, the array dequantCoeff of a size (nTbS)×(nTbS) as inputs, and the output is an (nTbS)×(nTbS) array resL2Residuals.

If variable temporal_enabled_flag is equal to 1 the array of tempPredL2Residuals of a size (nTbS)×(nTbS) is added to the (nTbS)×(nTbS) array resL2Residuals and resL2Residuals array is stored to the temporalBuffer at the luma location (xTbY, yTbY).

If no_enhancement_bit_flag is set to 1, the following ordered steps apply:

If variable temporal_enabled_flag is equal to 1, temporal_refresh_bit_flag is equal to 0 and variable temporal_signalling_present_flag is equal to 1, the temporal prediction process as specified elsewhere is invoked with the luma location (xTbY, yTbY), the transform size set equal to nTbS, a variable TransformTempSig and a variable TileTempSig as inputs and the output is an array tempPredL2Residuals of a size (nTbS)×(nTbS).

If variable temporal_enabled_flag is equal to 1, temporal_refresh_bit_flag is equal to 0 and variable temporal_signalling_present_flag is equal to 0, the temporal prediction process as specified elsewhere is invoked with the luma location (xTbY, yTbY), the transform size set equal to nTbS, a variable TransformTempSig set equal to 0 and a variable TileTempSig set equal to 0 as inputs and the output is an array tempPredL2Residuals of a size (nTbS)×(nTbS).

If variable temporal_enabled_flag is equal to 1 and temporal_refresh_bit_flag is equal to 1 the array tempPredL2Residuals of a size (nTbS)×(nTbS) is set to contain only zeros.

If variable temporal_enabled_flag is equal to 1 the array of tempPredL2Residuals of a size (nTbS)×(nTbS) is stored in the (nTbS)×(nTbS) array resL2Residuals and resL2Residuals array is stored to the temporalBuffer at the luma location (xTbY, yTbY).

Else, the array resL2Residuals of a size (nTbS)×(nTbS) is set to contain only zeros.

The picture reconstruction process for each plane is invoked with the transform block location (xTb0, yTb0), the transform block size nTbS, the variable IdxPlanes, the (nTbS)×(nTbS) array resL2Residuals, and the (xTbY)×(yTbY) recL2ModifiedUpsampledSamples as inputs.

Decoding Process for the Dequantization

Every group of transform coefficient passed to this process belongs to a specific plane and enhancement sub-layer.

They have been scaled using a uniform quantizer with deadzone. The quantizer can use a non-centered dequantization offset.

Scaling Process for Transform Coefficients

Inputs to this Process Are:

a variable nTbS specifying the size of the current transform block (nTbS=2 if transform_type is equal to zero and nTbS=4 if transform_type is equal to 1), an array TransformCoeffQ of size (nTbS)×(nTbS) containing entropy decoded quantized transform coefficient, a variable stepWidth specifying the step width value parameter, a variable levelIdx specifying the index of the enhancement sub-layer (with levelIdx=1 for enhancement sub-layer 1 and levelIdx=2 for enhancement sub-layer 2), a variable dQuantOffset specifying the dequantization offset and variable dequant_offset), if quant_matrix_mode is different from 0, an array QmCoeff0 of size 1×nTbS2 (equal to array variable qm_coefficient_0) and further, if quant_matrix_mode is equal to 4, an array QmCoeff1 of size 1×nTbS2 (equal to array qm_coefficient_1), if nTbS==2, an array QuantScalerDDBuffer of size (3*nTbS)×(nTbS) containing the scaling parameters array used in the previous picture;

if nTbS==4, an array QuantScalerDDSBuffer of size (3*nTbS)×(nTbS) containing the scaling parameters array used in the previous picture. Output of this process is the (nTbS)×(nTbS) array d of dequantized transform coefficients with elements d[x][y] and the updated array QuantMatrixBuffer.

For the derivation of the scaled transform coefficients d[x][y] with x=0 . . . nTbS−1, y=0 . . . nTbS−1, and given matrix qm[x][y] as specified in subclause 8.6.2, the following formula is used:

$$d[x][y]=(\text{TransformCoeffQ}[x][y]*((qm[x+(\text{levelIdxSwap}*nTbS)][y]+\text{stepWidthModifier}[x][y])+\text{appliedOffset}[x][y]) \quad (1)$$

Derivation of Dequantization Offset and Stepwidth Modifier

The variables appliedOffset [x][y] and stepWidthModifier [x][y] are derived as follows:

```
if (dequant_offset_signalled_flag == 0) {
  stepWidthModifier [x][y] = ((((Floor(-Cconst * Ln (qm[x +
  (levelIdxSwap *
  nTbS)][y]))) + Dconst) *
  (qm[x + (levelIdxSwap * nTbS)][y]2))) / 32768) >> 16
  if (TransformCoeffQ[x][y] < 0)
    appliedOffset [x][y] = (−1 * (−deadZoneWidthOffset [x][y]))
  else if (TransformCoeffQ [x][y] > 0)
    appliedOffset [x][y] = −deadZoneWidthOffset [x][y]
  else
    appliedOffset [x][y] = 0
} else if (dequant_offset_signalled_flag == 1) &&
(dequant_offset_mode_flag ==1)
{
  stepWidthModifier [x][y] = 0
  if (TransformCoeffQ[x][y] < 0)
    appliedOffset = (−1 * (dQuantOffsetActual [x][y] −
deadZoneWidthOffset [x][y]))
    else if (TransformCoeffQ [x][y] > 0)
      appliedOffset [x][y] = dQuantOffsetActual [x][y] −
deadZoneWidthOffset [x][y]
    else
      appliedOffset [x][y] = 0}
} else if (dequant_offset_signalled_flag == 1) &&
(dequant_offset_mode_flag ==
0) {
  stepWidthModifier [x][y] = (Floor((dQuantOffsetActual [x][y]) *
  (qm[x +
  (levelIdxSwap * nTbS)][y]))
```

```
 / 32768)
  if (TransformCoeffQ[x][y] < 0)
    appliedOffset = (−1 * (−deadZoneWidthOffset [x][y]))
  else if (TransformCoeffQ [x][y] > 0)
    appliedOffset [x][y] = −deadZoneWidthOffset [x][y]
  else
    appliedOffset [x][y] = 0
}
```

Where, if stepWidth>16, deadZoneWidthOffset is derived as follows:

deadZoneWidthOffset [x][y]=(((1«16)−((Aconst*(qm[x+(levelIdxSwap*nTbs)][y]+stepWidthModifier [x][y]))+Bconst)»1)*(qm[x+(levelIdxSwap*nTbs)][y]+stepWidthModifier [x][y]))»16

Where, if stepWidth<=16, deadZoneWidthOffset is derived as follows: deadZoneWidthOffset [x][y]=stepWidth»1

Where:
Aconst=39
Bconst=126484
Cconst=5242
Dconst=99614

Where dQuantOffsetActual [x][y] is computed as follows:

```
if (dequant_offset == 0)
  dQuantOffsetActual [x][y] = dQuantOffset
else {
  if (dequant_offset_mode_flag == 1)
    dQuantOffsetActual [x][y] = ((Floor(-Cconst * Ln(qm[x +
(levelIdxSwap * nTbs)][y]) +
      (dQuantOffset << 9) + Floor(Cconst * Ln(StepWidth)))) *
(qm[x + (levelIdxSwap * nTbs)][y])) >> 16
  else if (dequant_offset_mode_flag == 0)
    dQuantOffsetActual [x][y] = ((Floor(-Cconst * Ln(qm[x +
(levelIdxSwap * nTbs)][y]) +
      (dQuantOffset << 11) + Floor(Cconst * Ln(StepWidth))))
* (qm[x + (levelIdxSwap * nTbs)][y]))
      >>16
}
```

Where levelIdxSwap is derived as follows:

```
if (levelIdx == 2)
  levelIdxSwap = 0
else
  levelIdxSwap = 1
```

Derivation of Quantization Matrix

The quantization matrix qm [x][y] contains the actual quantization step widths to be used to decode each coefficient group.

```
if (levelIdx == 2) {
  if (scaling_mode_level2 == 1) {
    for (x = 0; x < nTbS; x++) {
      for (y = 0; y < nTbs; y++)
        qm [x][y] = qm_p [x][y]
    }
  } else {
    for (x = 0; x < nTbS; x++) {
      for (y = 0; y < nTbS; y++)
        qm [x][y] = qm_p [x + nTbS][y]
    }
  } else {
    for (x = 0; x < nTbS; x++) {
      for (y = 0; y < nTbs; y++)
```

-continued

```
    qm [x][y] = qm_p [x + (2 * nTbS)][y]
  }
}
```

Where qm_p[x][y] is computed as follows:

```
if (nTbs == 2) {
  for (x = 0; x < 6; x++) {
    for (y = 0; y < nTbs; y++)
      qm_p[x][y] = (Clip3 (0, (3 << 16),[(QuantScalerDDBuffer
  [x][y] * stepWidth) + (1 << 16)]) *
        stepWidth) >> 16
  }
} else {
  for (y = 0; y < 12; y++) {
    for (x = 0; x < nTbs; x++)
      qm_p[x][y] = (Clip3 (0, (3 <<
  16),[(QuantScalerDDSBuffer [x][y] * stepWidth) + (1 << 16)]) *
        stepWidth) >> 16
  }
}
```

And where QuantScalerDDBuffer [x][y] is derived elsewhere and QuantScalerDDSBuffer [x][y] is derived elsewhere.

Derivation of Scaling Parameters for 2×2 transform

If the variable nTbS is equal to 2, the default scaling parameters are as follows:

```
default_scaling_dd[x][y] =
{
  { 0, 2 }
  { 0, 0 }
  { 32, 3 )
  { 0, 32 }
  { 0, 3 }
  { 0, 32 }
}
```

As a first step, the array QuantScalerDDBuffer[x][y] is initialized as follows:

If the current picture is an IDR picture, QuantScalerDDBuffer[x][y] is initialized to be equal to default_scaling_dd[x][y]. If the current picture is not an IDR picture, the QuantScalerDDBuffer[x][y] matrix is left unchanged.

Following initialization, based on the value of quant_matrix_mode the array QuantScalerDDBuffer[x][y] is processed as follows:

If the quant_matrix_mode is equal to 0 and the current picture is not an IDR picture, the QuantScalerDDBuffer[x][y] is left unchanged.

If quant_matrix_mode is equal to 1, the QuantScalerDDBuffer[x][y] is equal to the default_scaling_dd[x][y].

If quant_matrix_mode is equal to 2, the QuantScalerDDBuffer[x][y] is modified as follows:

for (Mldx=0; Mldx<3; Mldx++)
  for (x=0; x<2; x++)
    for (y=0; y<2; y++)
      QuantScalerDDBuffer [x+(Mldx*2)][y]=QmCoeff0 [(x*2)+y]

If quant_matrix_mode is equal to 3, the QuantScalerDDBuffer[x][y] is modified as follows:

for (Mldx=0; Mldx<2; Mldx++)
  for (x=0; x<2; x++)
    for (y=0; y<2; y++)
      QuantScalerDDBuffer [x+(Mldx*2)][y]=QmCoeff0 [(x*2)+y]

If quant_matrix_mode is equal to 4, the QuantScalerDDBuffer[x][y] is modified as follows:

for (x=0; x<2; x++)
  for (y=0; y<2; y++)
    QuantScalerDDBuffer [x+4][y]=QmCoeff1 [(x*2)+y]

If quant_matrix_mode is equal to 5, the QuantScalerDDBuffer is modified as follows:

for (Mldx=0; Mldx<2; Mldx++)
  for (x=0; x<2; x++)
    for (y=0; y<2; y++)
      QuantScalerDDBuffer [x+(Mldx*2)][y]=QmCoeff0 [(x*2)+y]

for (x=4, x<6; x++)
  for (y=0; y<2; y++)
    QuantScalerDDBuffer [x][y]=QmCoeff1[(x*2)+y]

Derivation of Scaling Parameters for 4×4 Transform

If the variable nTbS is equal to 4, the default scaling parameters are as follows:

```
default_scaling_dds[x][y] =
{
  { 13, 26, 19, 32 }
  { 52, 1, 78, 9 }
  { 13, 26, 19, 32 }
  { 150, 91, 91, 19 }
  { 13, 26, 19, 32 }
  { 52, 1, 78, 9 }
  { 26, 72, 0, 3 }
  { 150, 91, 91, 19 }
  { 0, 0, 0, 2 }
  { 52, 1, 78, 9 }
  { 26, 72, 0, 3 }
  { 150, 91, 91, 19 }
}
```

As a first step, the array QuantScalerDDSBuffer[ ][ ] is initialized as follows:

If the current picture is an IDR picture, QuantScalerDDSBuffer[x][y] is initialized to be equal to default_scaling_dds[x][y]. If the current picture is not an IDR picture, the QuantScalerDDSBuffer[x][y] matrix is left unchanged.

Following initialization, based on the value of quant_matrix_mode the array QuantScalerDDSBuffer[x][y] is processed as follows:

If the quant_matrix_mode is equal to 0 and the current picture is not an IDR picture, the QuantScalerDDSBuffer is left unchanged.

If quant_matrix_mode is equal to 1, the QuantScalerDDSBuffer is equal to the default_scaling_dds[x][y].

If quant_matrix_mode is equal to 2, the QuantScalerDDSBuffer is modified as follows:

for (Mldx=0; Mldx<3; Mldx++)
  for (x=0; x<4; x++)
    for (y=0; y<4; y++)
      QuantScalerDDSBuffer [x+(Mldx*4)][y]=QmCoeff0[(x*4)+y]

If quant_matrix_mode is equal to 3, the QuantScalerDDSBuffer is modified as follows:

for (Mldx=0; Mldx<2; Mldx++)
  for (x=0; x<4; x++)
    for (y=0; y<4; y++)
      QuantScalerDDSBuffer [x+(Mldx*4)][y]=QmCoeff0[(x*4)+y]

If quant_matrix_mode is equal to 4, the QuantScalerDDS-Buffer is modified as follows:
    for (x=0; x<4; x++)
        for (y=0; y<4; y++)
            QuantScalerDDSBuffer [x +8][y]=QmCoeff1[(x*4)+y]

If quant_matrix_mode is equal to 5, the QuantScalerDDS-Buffer is modified as follows:
    for (Mldx=0; Mldx<2; Mldx++)
        for (x=0; x<4; x++)
            for (y=0; y<4; y++)
                QuantScalerDDSBuffer [x+(Mldx*4)][y]=QmCoeff0[(x*4)+y]
    for (x=8, x<12; x++)
        for (y=0; y<4; y++)
            QuantScalerDDSBuffer [x][y]=qm_coefficient_1[(x*4)+y]

The invention claimed is:

1. A method of encoding an input signal, the method comprising:
quantizing a set of data based on temporal information associated with said set of data, the set of data comprising coefficients corresponding to a frame of the input signal, the temporal information comprising an indication of those portions of the frame which are static and/or quasi-static with respect to one or more previous frames, the quantizing comprising:
determining a first quantization parameter for a first subset of data and a second quantization parameter for a second subset of data, the first subset of data and the second subset of data being subsets of the set of data selected in accordance with the temporal information, wherein the first quantization parameter and the second quantization parameter are different and are related according to a predefined formula,
wherein said quantizing includes subtracting a quantization offset value from a value associated with one coefficient included among the coefficients, and
wherein the quantization offset value is adjusted based on a sign of the one coefficient, said adjustment being performed to facilitate symmetrical operations about a zero value for the one coefficient.

2. The method of claim 1, further comprising:
determining the temporal information associated with the set of data, wherein the input signal is comprised of a sequence of samples, and wherein determining the temporal information comprises:
deriving a correlation between co-located set of data at different samples.

3. The method of claim 1, wherein the temporal information comprises whether the set or subset of data is one of the following: static, quasi-static, dynamic.

4. The method of claim 3, wherein a given set of data, or subset of data, in a layer of data is static if the difference with a corresponding co-located set of data, or co-located subset of data, in a previous and/or a subsequent sample has a substantially zero estimated information entropy.

5. The method of claim 3, wherein a set of data, or a subset of data, in a layer of data is quasi-static if the difference with a corresponding co-located set of data, or co-located subset of data, in a previous and/or a subsequent sample has a lower estimated information entropy than the estimated information entropy of the given set of data.

6. The method of claim 3, wherein a given set of data, or a subset of data, in a layer of data is dynamic if the difference with a corresponding co-located set of data, or co-located subset of data in a previous and/or a subsequent sample has substantially same or higher estimated information entropy than the estimated information entropy of the given set of data.

7. The method of claim 1, wherein:
the encoded data represents an echelon of residual data at a given level of quality in a tiered hierarchy,
the signal is reconstructed by:
reconstructing a rendition of the signal at a lower level of quality;
producing a predicted rendition of the signal at the given level of quality; and
combining the predicted rendition of the signal at the given level of quality with said echelon of residual data to obtain a rendition of the signal at the given level of quality.

8. A method of decoding an encoded signal, the method comprising:
dequantizing a set of encoded data within the encoded signal based on one or more quantization parameters, said one or more quantization parameters generated based on temporal information associated with the set of encoded data,
wherein:
the set of encoded data includes coefficients corresponding to a frame of the encoded signal,
the temporal information comprises an indication of those portions of the frame that are static and/or quasi-static with respect to one or more previous frames,
said one or more quantization parameters comprise a first quantization parameter for a first subset of data and a second quantization parameter for a second subset of data,
the first subset of data and the second subset of data are subsets of the set of encoded data selected in accordance with the temporal information,
the first quantization parameter and second quantization parameter are different and related according to a predefined formula,
one of the coefficients, during quantization of that one coefficient, is subjected to a subtraction operation in which a quantization offset value is subtracted from a value associated with the one coefficient, and
the quantization offset value is adjusted based on a sign of the one coefficient, said adjustment being performed to facilitate symmetrical operations about a zero value for the one coefficient.

9. The method as in claim 8, wherein the method comprises:
decoding a layer of data by combining one or more sets of decoded data with corresponding data contained in a temporal buffer,
wherein decoded data that is combined with corresponding data in the temporal buffer is dequantized with different quantization parameters with respect to decoded data that is not combined with corresponding data in the temporal buffer.

10. The method as in claim 9, wherein:
a single quantization parameter is received by the decoder for a whole layer of data, and
the decoder produces based at least in part on said single quantization parameter the different quantization parameters to use for sets of data to be combined with corresponding data in the temporal buffer and sets of data not to be combined with corresponding data in the temporal buffer.

11. The method as in claim 10, wherein the formula used by the decoder to derive a quantization parameter for sets of data not to be combined with corresponding data in the temporal buffer is based at least in part on a default parameter, said default parameter being overwritten with a configuration parameter contained in the data stream if said configuration parameter is specified.

12. The method as in claim 10, wherein:
the decoded data represents an echelon of residual data at a given level of quality in a tiered hierarchy, and
the signal is reconstructed by:
reconstructing a rendition of the signal at a lower level of quality;
producing a predicted rendition of the signal at the given level of quality; and
combining the predicted rendition of the signal at the given level of quality with said echelon of residual data to obtain a rendition of the signal at the given level of quality.

13. The method as in claim 12, wherein:
a first level of quality of the signal is encoded according to a first encoding format,
one or more of the echelons of data required to decode the signal at a second level of quality are encoded according to a second encoding format, which is different from the first, and
the resulting encoded data streams are produced so as to allow coordinated decoding of the two elementary encoded streams into a combined rendition of the signal at the second level of quality.

14. The method of claim 10, further comprising:
deriving from a bitstream associated with the set of encoded data the one or more quantization parameters based on temporal information associated with the set of data.

15. The method of claim 14, wherein deriving quantization parameters further comprises determining, from the bitstream, whether or not default values should be used.

16. The method of claim 14, wherein deriving quantization parameters further comprises determining from the bitstream whether or not signalled values should be used in place of default values.

17. An encoder for encoding an input signal, the encoder being configured to:
quantize a set of data based on temporal information associated with said set of data, wherein the set of data comprises coefficients corresponding to a frame of the input signal, wherein the temporal information comprises an indication of those portions of the frame that are static and/or quasi-static with respect to one or more previous frames, the quantizing comprising:
determining a first quantization parameter for a first subset of data and a second quantization parameter for a second subset of data, wherein the first subset of data and second subset of data are subsets of the set of data selected in accordance with the temporal information, and wherein the first quantization parameter and second quantization parameter are different and related according to a predefined formula,
wherein said quantizing includes subtracting a quantization offset value from a value associated with one coefficient included among the coefficients, and
wherein the quantization offset value is adjusted based on a sign of the one coefficient, said adjustment being performed to facilitate symmetrical operations about a zero value for the one coefficient.

18. A decoder for decoding an encoded stream into a reconstructed output signal, the decoder being configured to:
receive a base bitstream;
receive an enhancement bitstream, which encapsulates an enhancement stream via a set of one or more network abstraction layer units (NALUs), wherein the enhancement bitstream is synchronized with the base bitstream using one or more reference indexes that are included in the set of one or more NALUs, the one or more reference indexes identifying the base bitstream, to which the enhancement bitstream is to be applied; and
dequantize a set of encoded data within the encoded signal based on one or more quantization parameters, said one or more quantization parameters generated based on temporal information associated with the set of encoded data,
wherein:
the set of encoded data includes coefficients corresponding to a frame of the encoded signal,
one of the coefficients, during quantization of that one coefficient, is subjected to a subtraction operation in which a quantization offset value is subtracted from a value associated with the one coefficient, and
the quantization offset value is adjusted based on a sign of the one coefficient, said adjustment being performed to facilitate symmetrical operations about a zero value for the one coefficient.

* * * * *